(12) United States Patent
Nguyen

(10) Patent No.: US 9,908,748 B1
(45) Date of Patent: Mar. 6, 2018

(54) CLAMPING DEVICE WITH METAL CORES

(71) Applicant: Hoa Nhon Nguyen, Bankstown (AU)

(72) Inventor: Hoa Nhon Nguyen, Bankstown (AU)

( * ) Notice: Subject to any disclaimer, the term of this patent is extended or adjusted under 35 U.S.C. 154(b) by 0 days.

(21) Appl. No.: 15/479,283

(22) Filed: Apr. 5, 2017

(51) Int. Cl.
B25B 1/00 (2006.01)
B66C 1/42 (2006.01)
B65G 7/12 (2006.01)

(52) U.S. Cl.
CPC ............... B66C 1/422 (2013.01); B65G 7/12 (2013.01)

(58) Field of Classification Search
CPC .. B25B 1/00; B25B 1/102; B25B 3/00; B25B 5/00; B25B 5/02; B25B 5/101
See application file for complete search history.

(56) References Cited

U.S. PATENT DOCUMENTS

| | | | | |
|---|---|---|---|---|
| 2004/0140602 A1* | 7/2004 | Gerritsen | ................ | B25B 5/068 269/6 |
| 2006/0091596 A1* | 5/2006 | Marusiak | ................ | B25B 5/068 269/6 |
| 2006/0108729 A1* | 5/2006 | Siegel | ....................... | B25B 1/08 269/266 |
| 2011/0024962 A1* | 2/2011 | Zhang | ....................... | B25B 5/06 269/107 |
| 2013/0134642 A1* | 5/2013 | Chen | ....................... | B25B 5/006 269/6 |
| 2015/0343606 A1* | 12/2015 | Lin | ....................... | B25B 1/2478 269/153 |
| 2016/0067845 A1* | 3/2016 | Quaiz | .................... | B25B 5/006 29/559 |

* cited by examiner

*Primary Examiner* — Lee D Wilson
(74) *Attorney, Agent, or Firm* — Tue Nguyen

(57) ABSTRACT

A clamping device for lifting and transferring objects can employ slanting interfaces to convert a pulling action on the clamping device to a clamping action on the object. Components of the clamping device can include a metal core embedded in a body of a different material. The embedded core construction can allow a simplified fabrication of the clamping device for high stresses, high forces, high durability and high reliability.

16 Claims, 33 Drawing Sheets

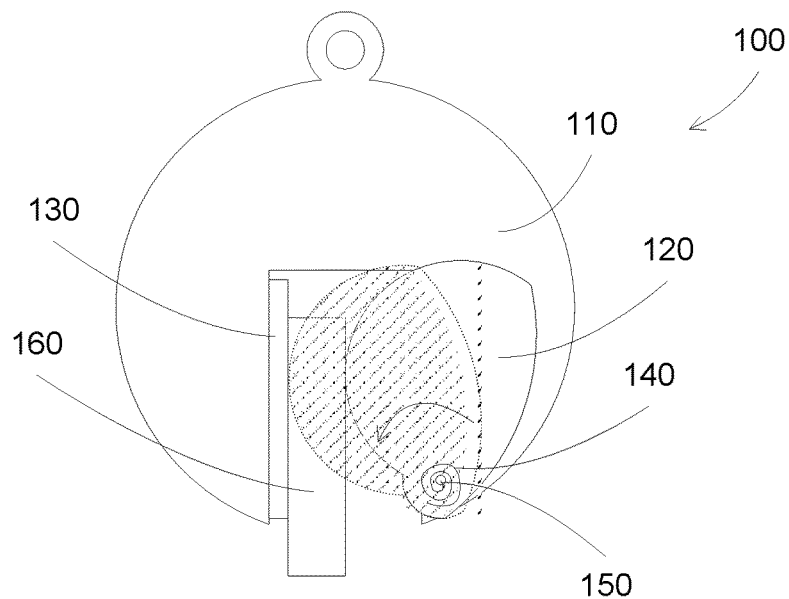
Fig. 1A
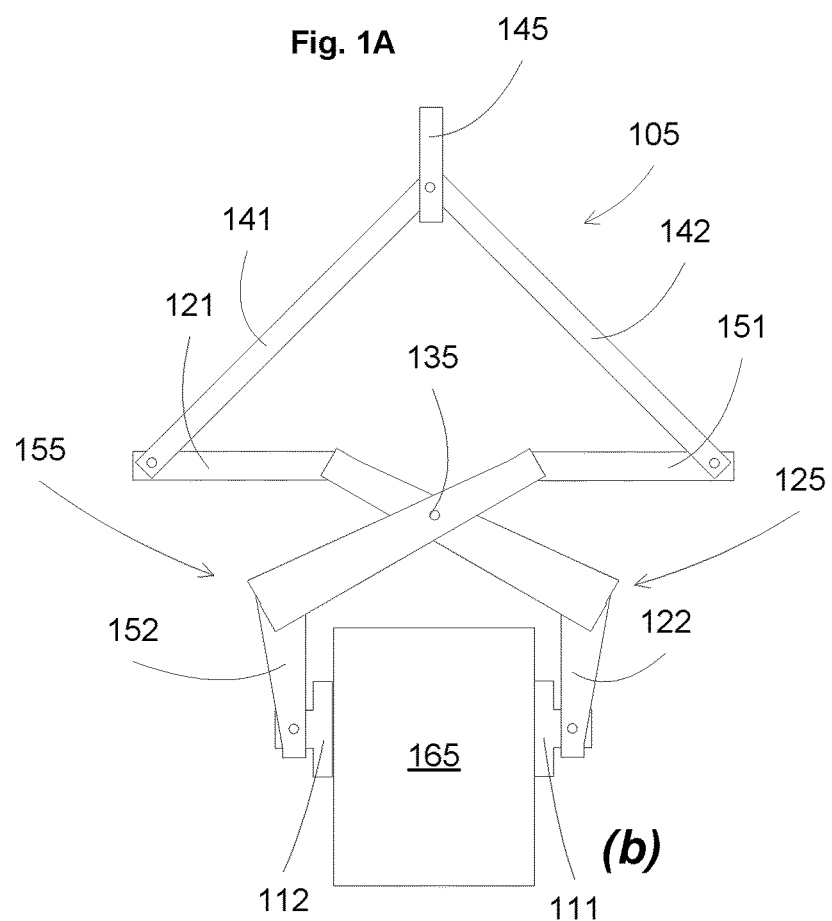
Fig. 1B
FIG. 1 (Prior Art)

Forming a clamping device, wherein the clamping device comprises a jaw and a jaw support, wherein the jaw and the jaw support is coupled with a slanting angle, wherein the slanting angle is configured so that when the jaw moves down, the jaw also moves toward an object
300

FIG. 3A

Forming a clamping device, wherein the clamping device comprises a clamp bar, a first jaw fixedly coupled to the clamp bar, and a jaw support assembly movably fixedly coupled to the clamp bar, wherein the jaw support assembly comprises a second jaw and a jaw support, wherein the second jaw and the jaw support is coupled with a slanting angle, wherein the slanting angle is configured so that when the second jaw moves down, the second jaw also moves toward an object supported between the first and second jaw for keeping the object in place
320

FIG. 3B

Placing an object between a first jaw and a second jaw of a clamping device, wherein the second jaw is coupled to a jaw support with a slanting angle, wherein the slanting angle is configured so that when the object moves down, the object makes the second jaw moving toward the object for keeping the object in place
340

Lifting the clamping device to move the object
350

FIG. 3C

Forming a clamping device, wherein the clamping device comprises a first jaw fixedly coupled to a clamp bar, and a second jaw assembly fixedly coupled to the clamp bar, wherein the second jaw assembly comprises a second jaw and a jaw support, together with a pulling element disposed between the second jaw and the jaw support, wherein there is at least a slanting interface coupling between the pulling element and the second jaw or between the pulling element and the jaw support, wherein the slanting interface is configured so that when the pulling element moves up, the second jaw moves toward an object for keeping the object in place
500

*FIG. 5A*

Selecting a clamping device suitable for clamping on an object, wherein the clamping device comprises two jaw assemblies, wherein a first jaw assembly comprises a first jaw, wherein a second jaw assembly comprises a second jaw and a jaw support facing each other, wherein a pulling element is disposed between the second jaw and the jaw support, wherein there is at least a slanting interface coupling between the pulling element and the second jaw or between the pulling element and the jaw support
520

Placing the object between the first jaw and the second jaw
530

Lifting the pulling element which moves the second jaw toward the object, since the slanting interface is configured so that when the pulling element moves up, the second jaw moves toward the object
540

*FIG. 5B*

Forming a clamping device, wherein the clamping device comprises a first jaw coupled to a clamp bar, and a second jaw assembly coupled to the clamp bar, wherein the second jaw assembly comprises at least two components coupled through a slanting surface interface, wherein the slanting surface is configured so that when one component moves down, it also moves toward an object disposed between the first jaw and the second jaw assembly, wherein the slanting surface comprises a rolling friction
700

*FIG. 7A*

Selecting a clamping device suitable for clamping on an object, wherein the clamping device comprises two jaw assemblies, wherein a first jaw assembly comprises a first jaw, wherein a second jaw assembly comprises a second jaw and a jaw support facing each other, wherein a pulling element is disposed between the second jaw and the jaw support, wherein there is at least a slanting interface coupling between the pulling element and the second jaw or between the pulling element and the jaw support, wherein the slanting surface comprises a rolling friction
720

Placing the object between the first jaw and the second jaw
730

Lifting the pulling element which moves the second jaw toward the object, since the slanting surface interface comprises a rolling friction, the second jaw moves toward the object when the pulling element moves up
740

*FIG. 7B*

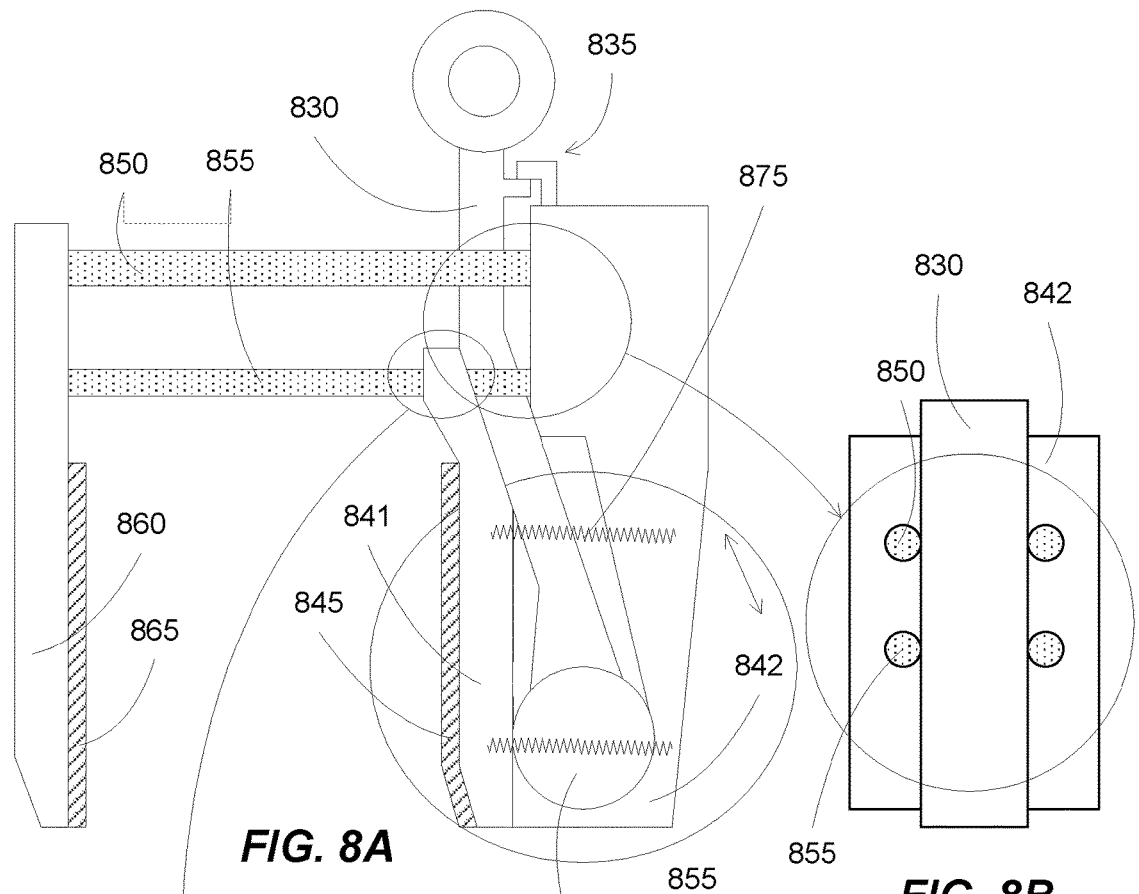
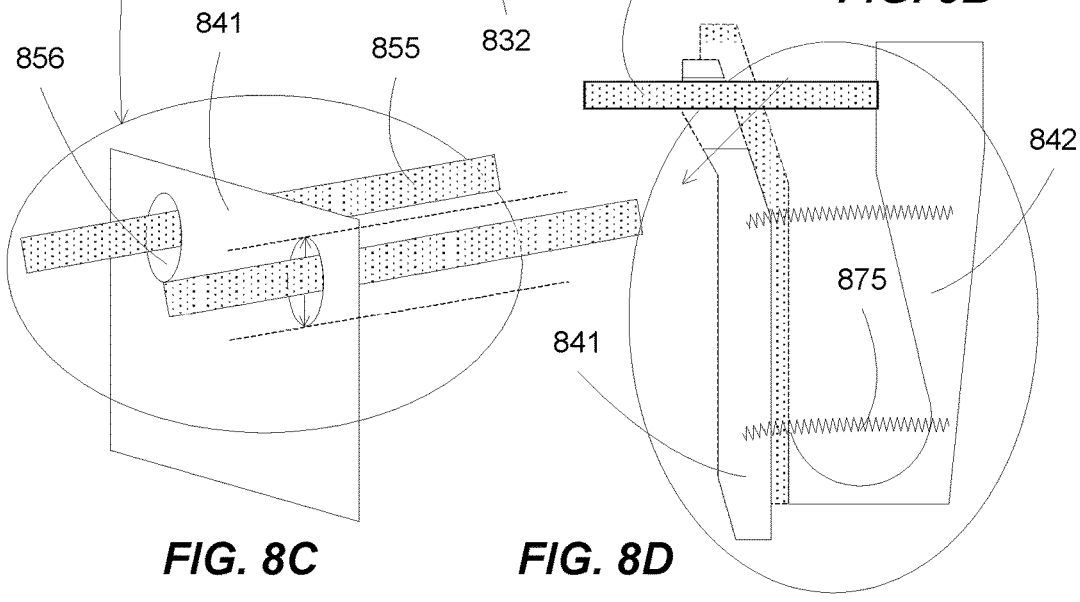
FIG. 8A  FIG. 8B
FIG. 8C  FIG. 8D

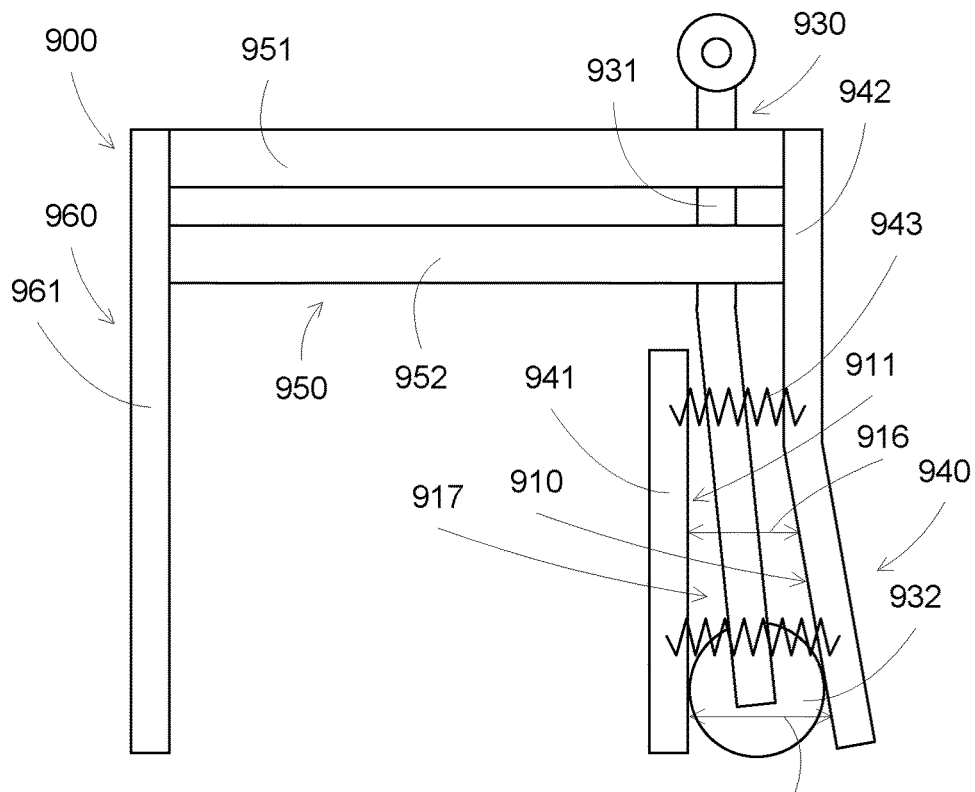
FIG. 9A
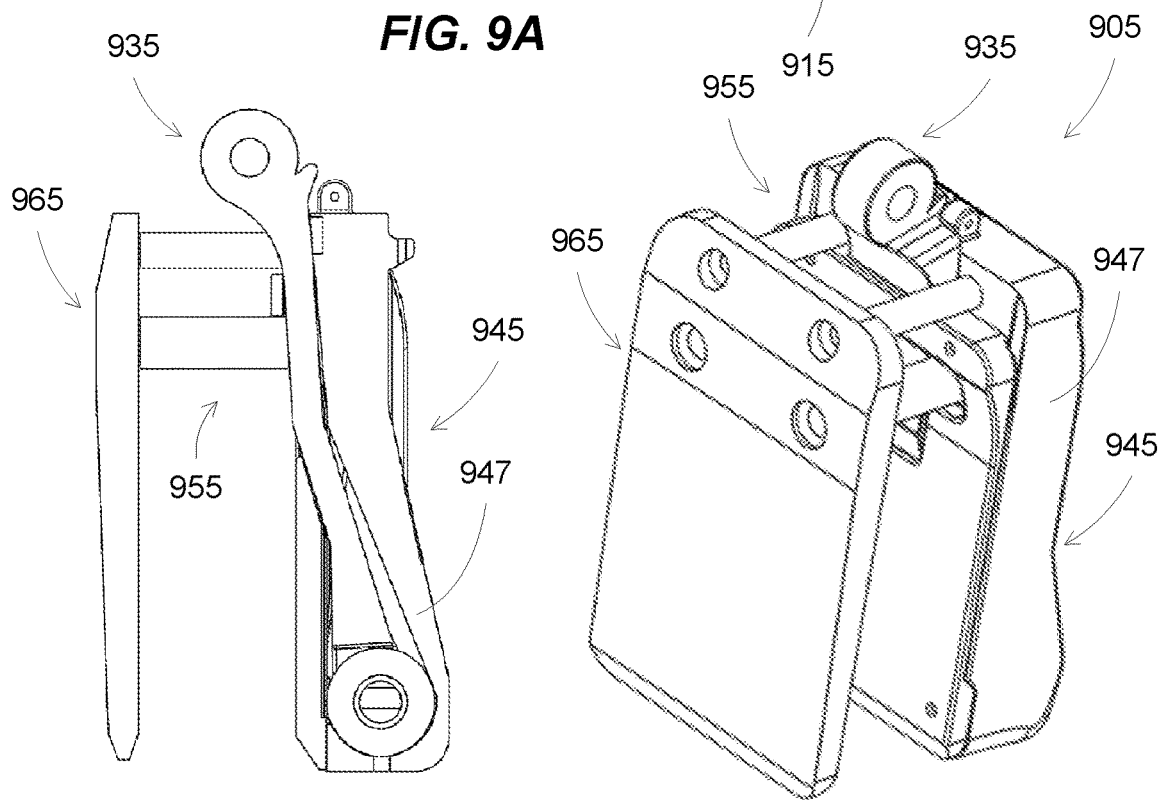
FIG. 9B     FIG. 9C

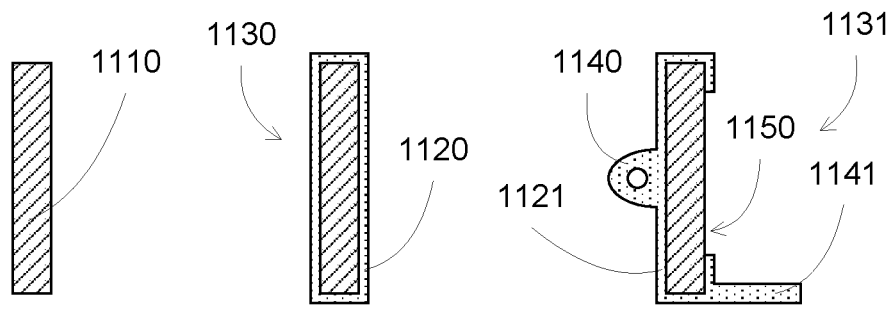
FIG. 11A
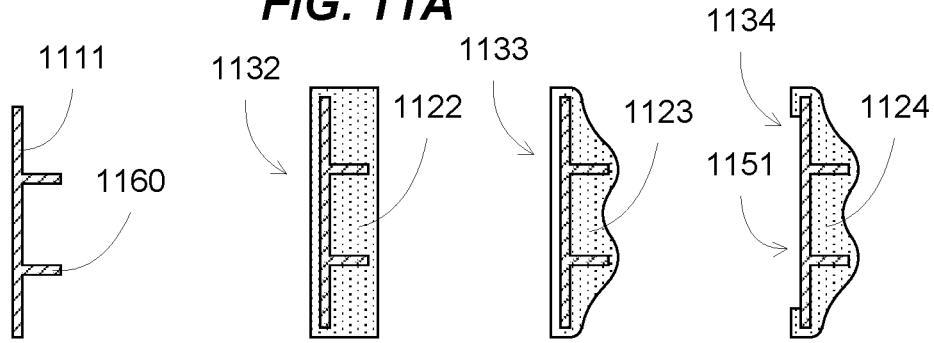
FIG. 11B
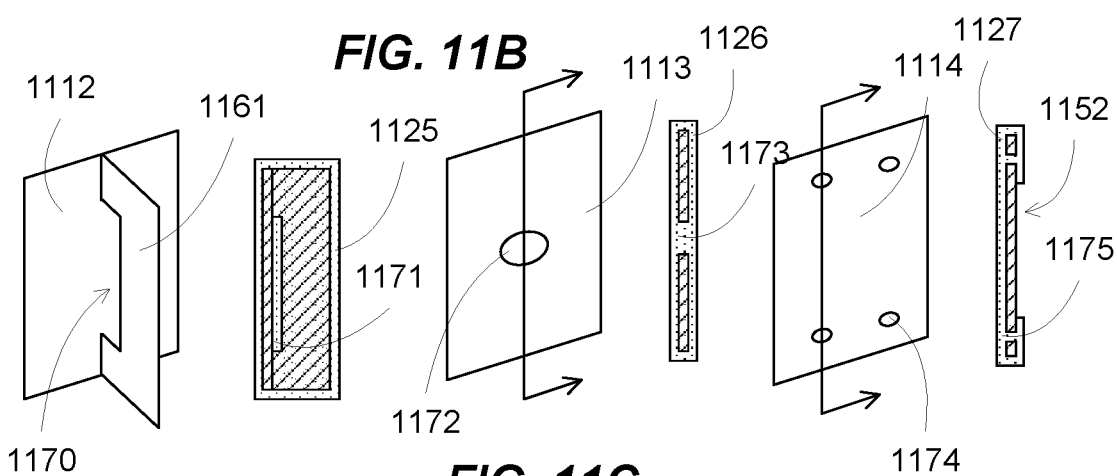
FIG. 11C
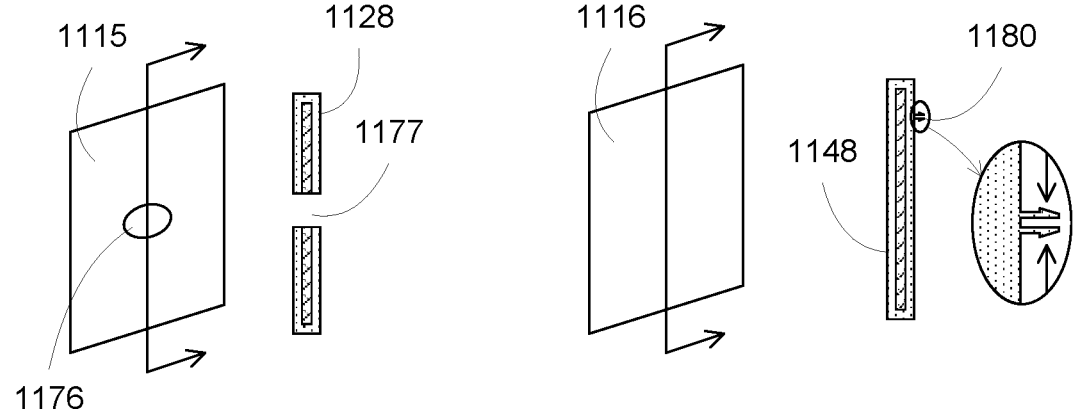
FIG. 11D  FIG. 11E

Forming a metal core, wherein the metal core optionally comprises at least one of addition features of multiple panels welded together, a hollow portion in the metal core a reinforced element for strengthening the metal core
1200

Forming a body, wherein the body is configured to be used in a clamping device, wherein the metal core is at least partially embedded in the body, wherein the body comprises at least one of
a protrusion functioning as an end stop for a first component,
a protrusion functioning as a mounting fixture for a second component,
a protrusion functioning as a flexible coupling to a third component,
an area at which the metal core is exposed,
a filling through an hollow portion of the metal core for strengthening an adhesion of the body coverage to the metal core
a hollow portion corresponded to a through hole in the metal core
1210

FIG. 12

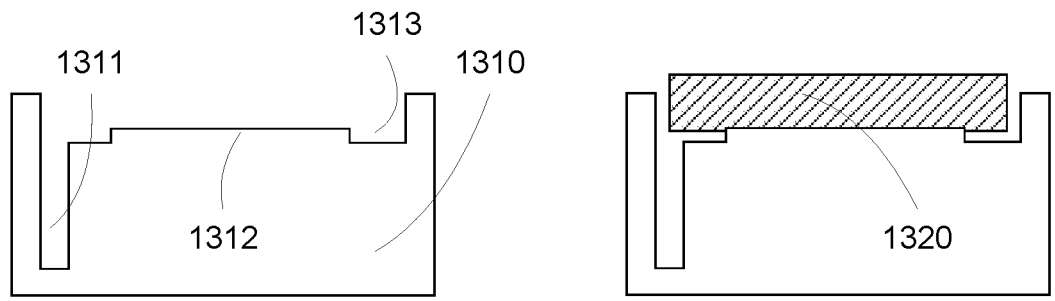
FIG. 13A  FIG. 13B
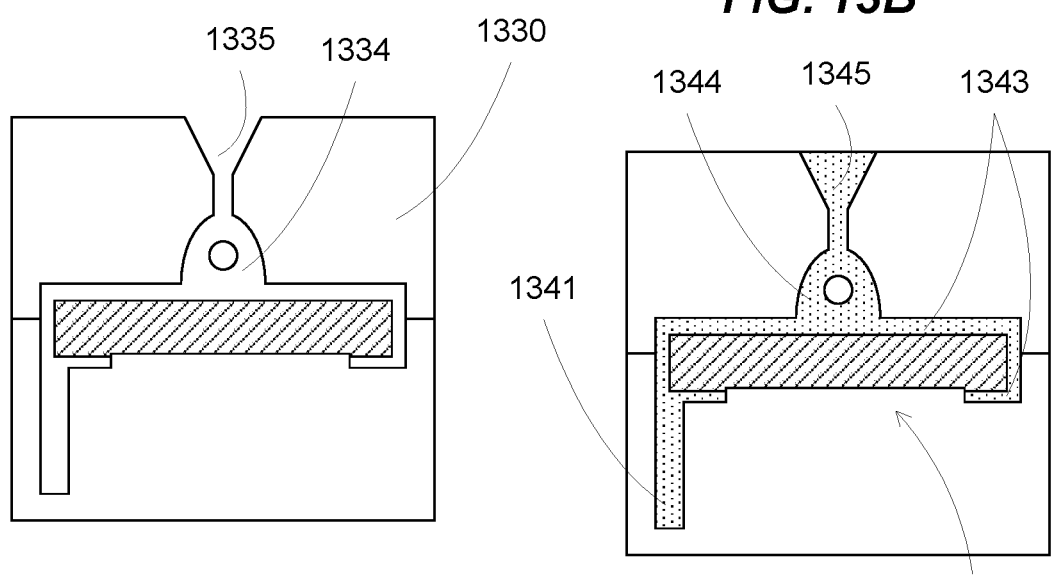
FIG. 13C  FIG. 13D
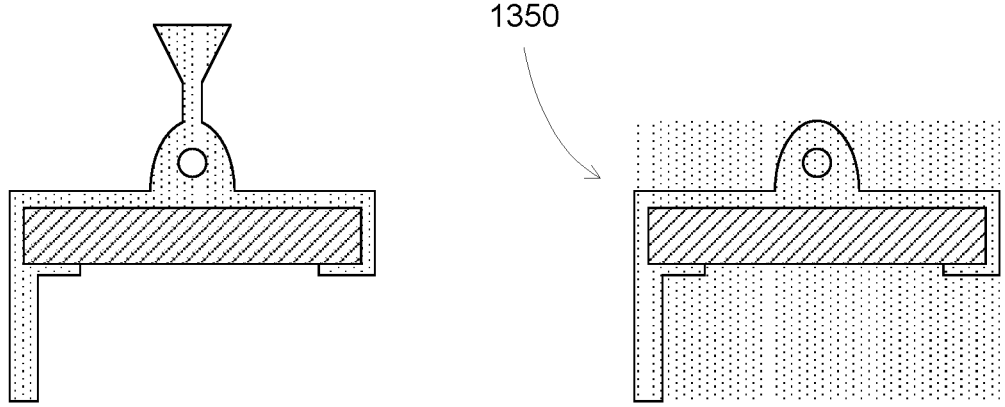
FIG. 13E  FIG. 13F

```
┌─────────────────────────────────────────────────┐
│ Forming a metal core, wherein the metal core    │
│ optionally comprises at least one of addition   │
│ features of multiple panels welded together,    │
│ a hollow portion in the metal core              │
│ a reinforced element for strengthening the      │
│ metal core                                      │
│                   1400                          │
└─────────────────────────────────────────────────┘
                        │
                        ▼
┌─────────────────────────────────────────────────┐
│ Placing the metal core in a casting mold,       │
│ wherein the casting mold is configured to       │
│ provide a body to be used in a clamping device, │
│ wherein the metal core is at least partially    │
│ embedded in the casting mold, wherein the       │
│ casting mold comprises at least one of          │
│ a protrusion functioning as an end stop for a   │
│ first component,                                │
│ a protrusion functioning as a mounting fixture  │
│ for a second component,                         │
│ a protrusion functioning as a flexible coupling │
│ to a third component,                           │
│ an area at which the metal core is exposed,     │
│ a filling through an hollow portion of the metal│
│ core for strengthening an adhesion of the body  │
│ coverage to the metal core,                     │
│ a hollow portion corresponded to a through hole │
│ in the metal core                               │
│                   1410                          │
└─────────────────────────────────────────────────┘
                        │
                        ▼
┌─────────────────────────────────────────────────┐
│ Filling the mold with a material different from │
│ that of the metal core                          │
│                   1420                          │
└─────────────────────────────────────────────────┘
                        │
                        ▼
┌─────────────────────────────────────────────────┐
│           Removing the casting mold             │
│                   1430                          │
└─────────────────────────────────────────────────┘
```

*FIG. 14*

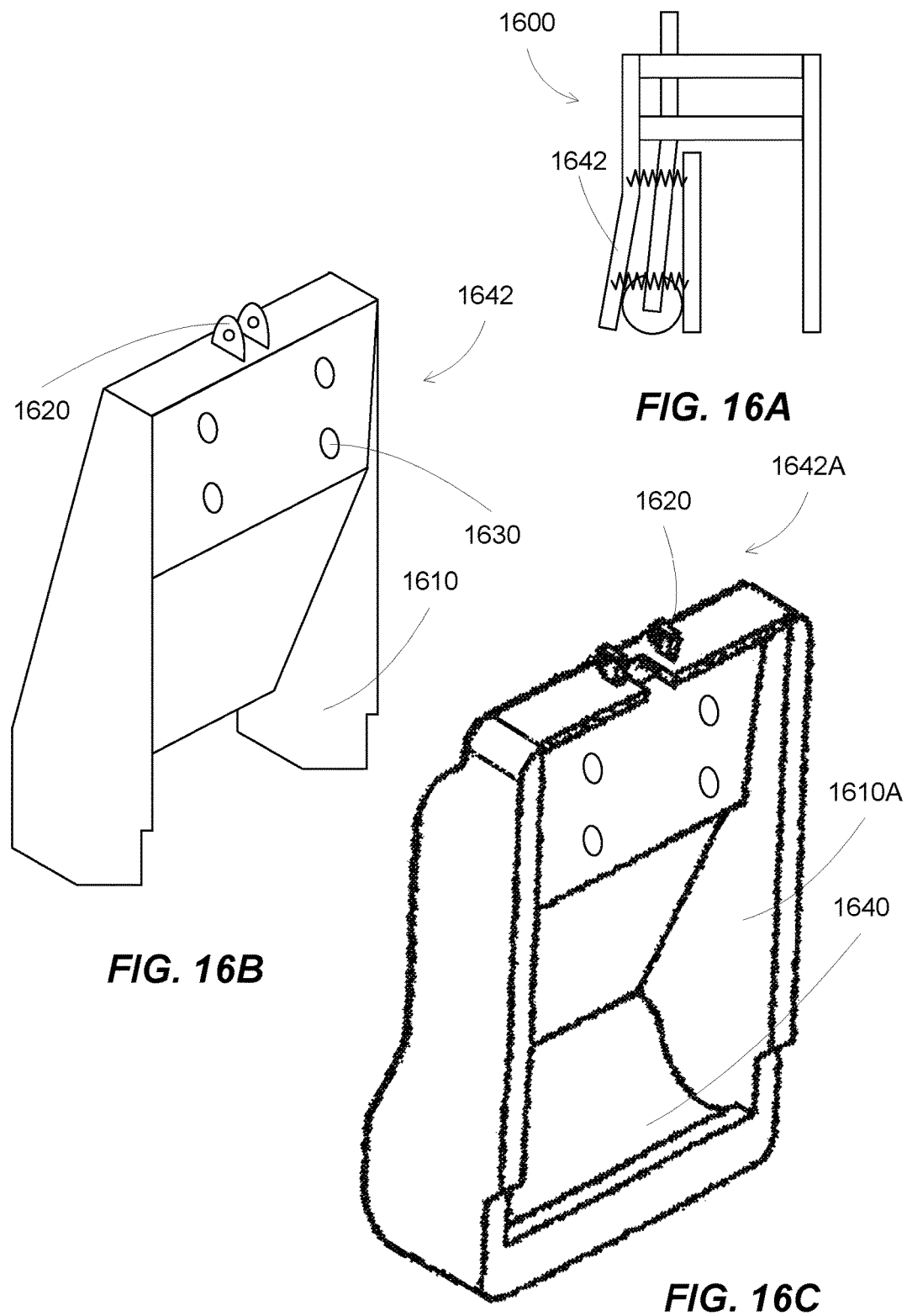

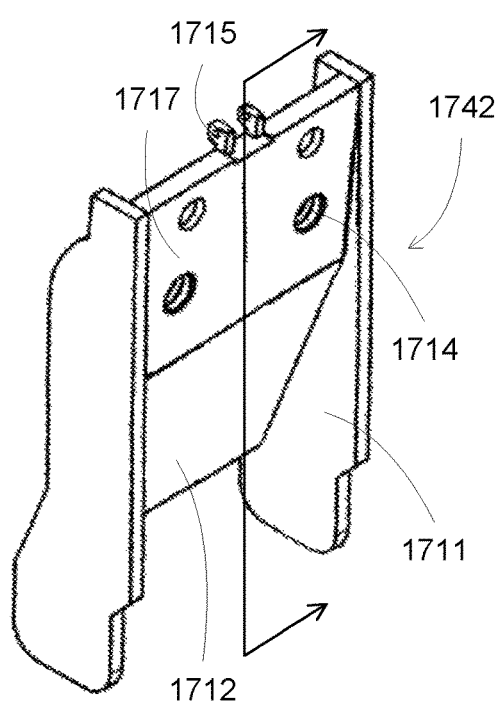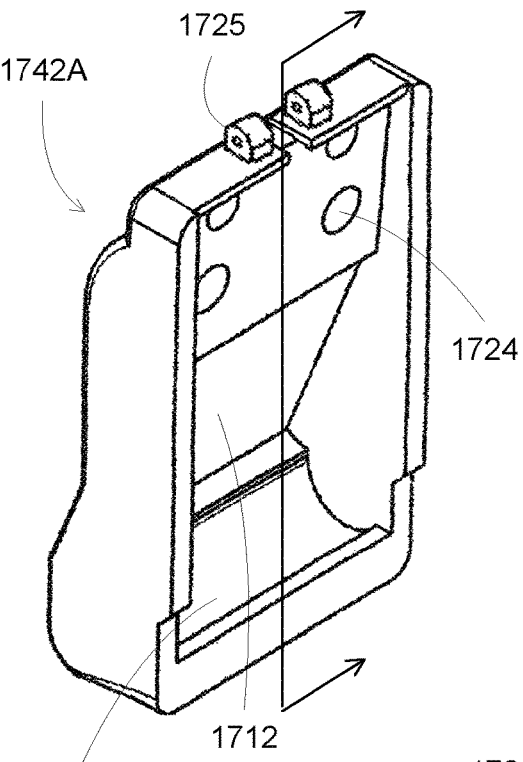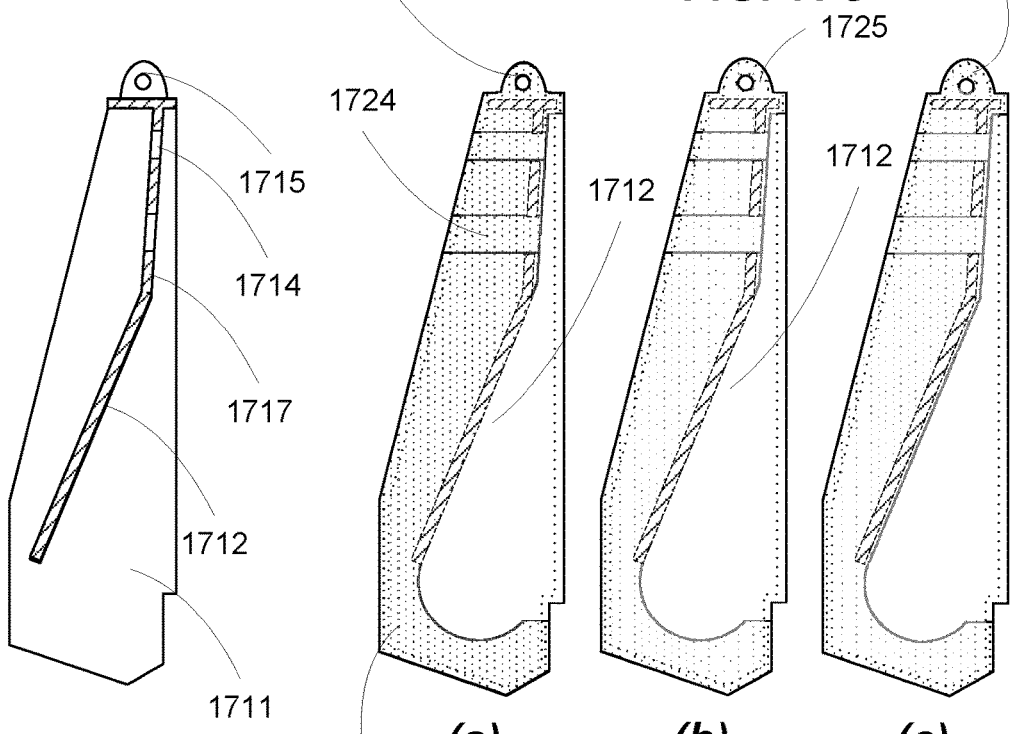
FIG. 17A
FIG. 17B
FIG. 17C
FIG. 17D

Forming a metal core of a jaw support of a jaw assembly of a clamping device, wherein the metal core comprises a first panel welded to a second panel at an angle, wherein the first and second panels are welded to two side panels, wherein a coupling is welded to the first panel, wherein through holes are formed in the first panel, and wherein the metal core optionally comprises a reinforced element for strengthening the second panel
2100

Forming a body of the jaw support, wherein the metal core is at least partially embedded in the body, wherein the body comprises a protrusion at an end of the second panel for functioning as an end stop for a pulling element of the clamping device, and a hollow portion corresponded to the through holes
2110

Assembling the jaw support to form the clamping device
2120

*FIG. 21*

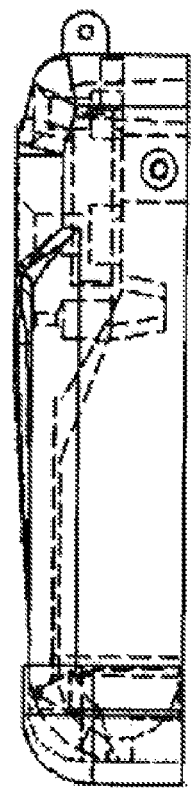
FIG. 24A  FIG. 24B
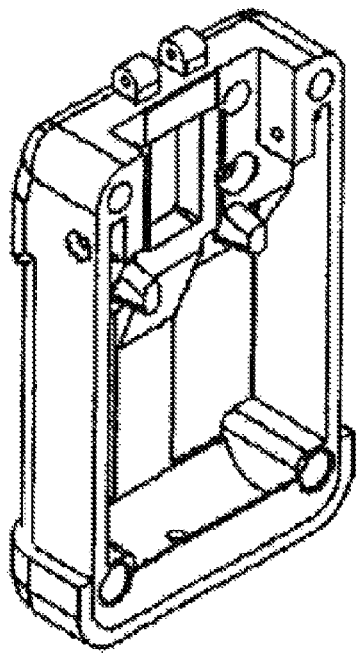
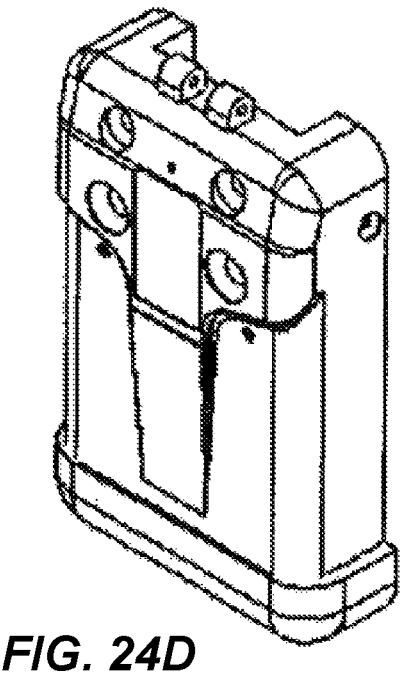
FIG. 24C  FIG. 24D

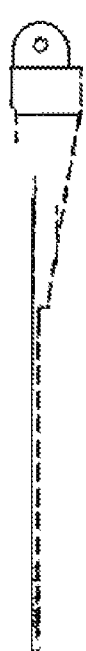
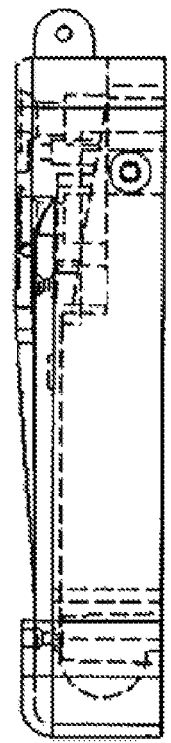
FIG. 25A  FIG. 25B
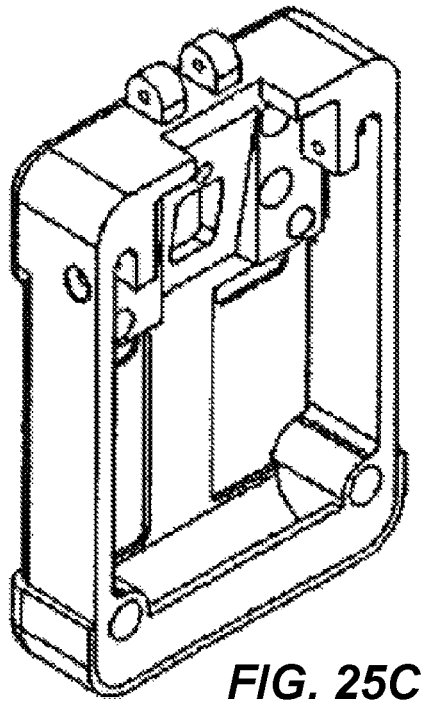
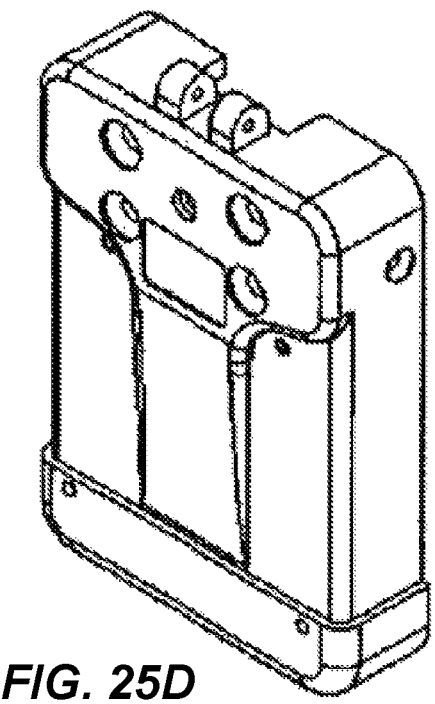
FIG. 25C  FIG. 25D

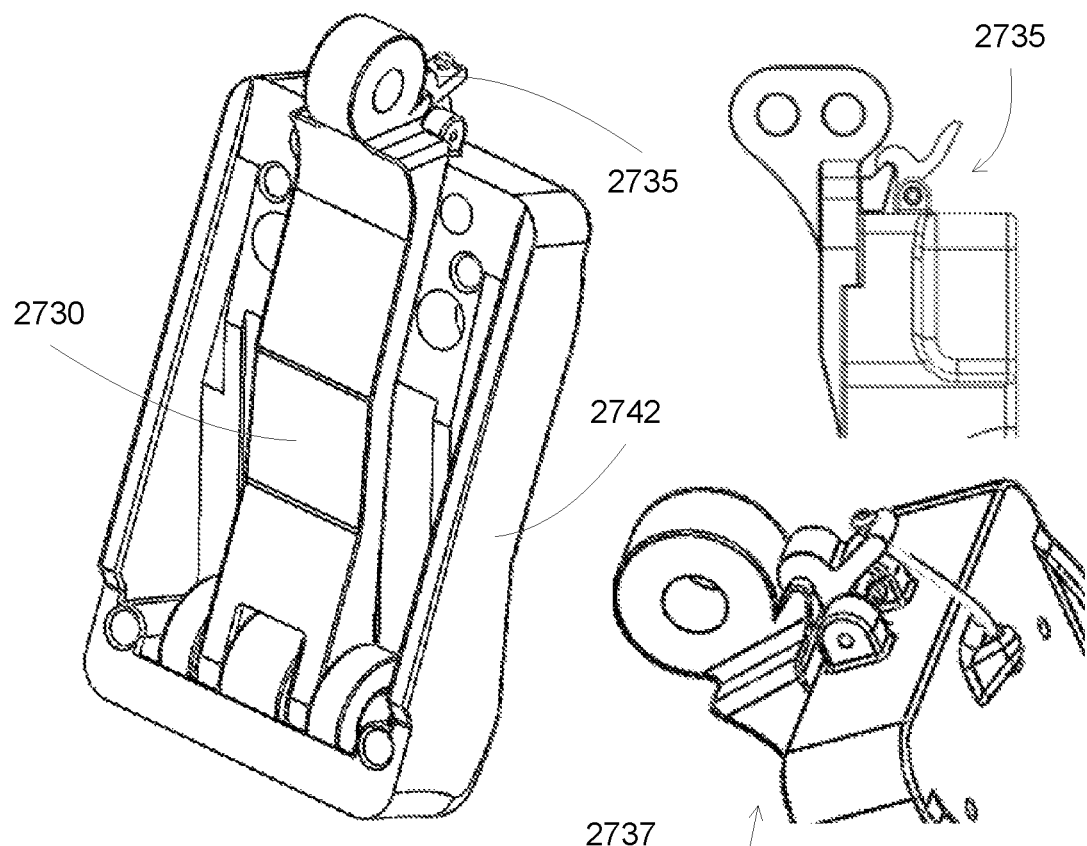
FIG. 27A
FIG. 27B
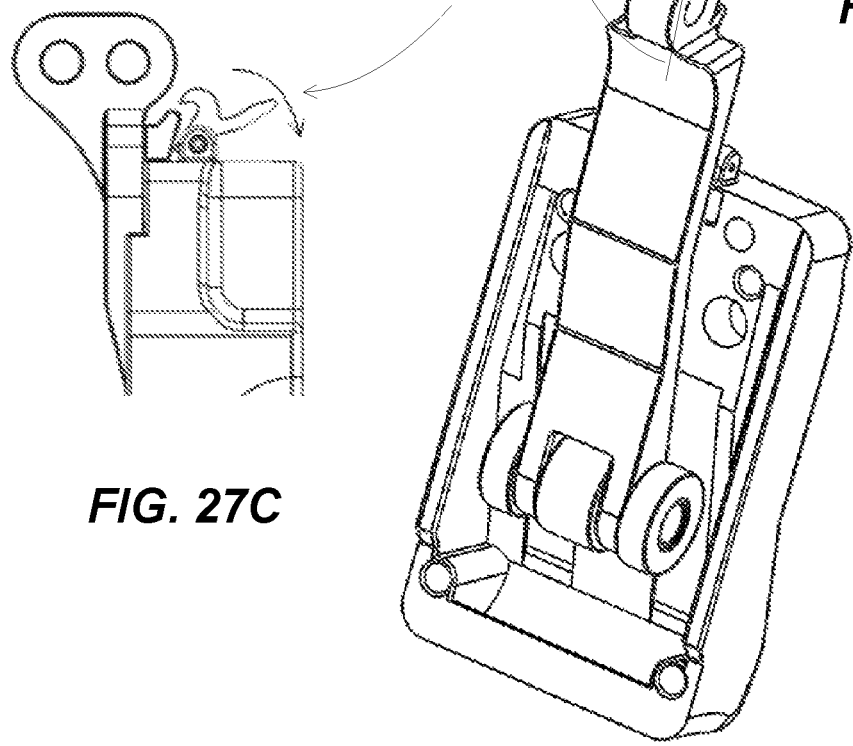
FIG. 27C
FIG. 27D

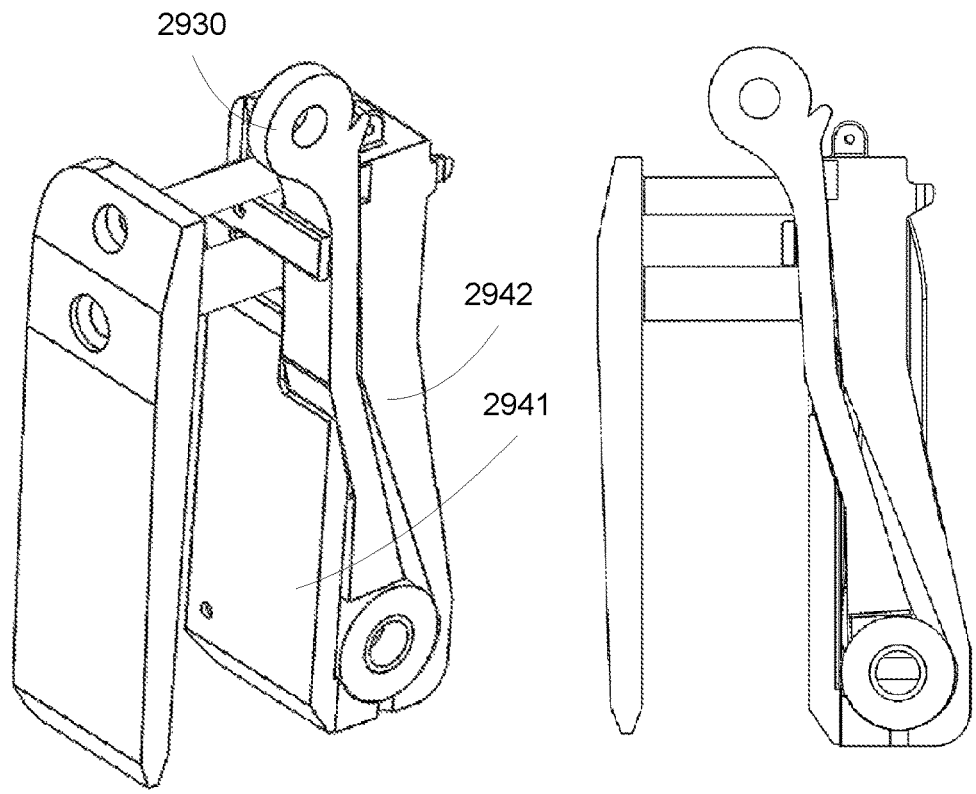
FIG. 29A
FIG. 29B
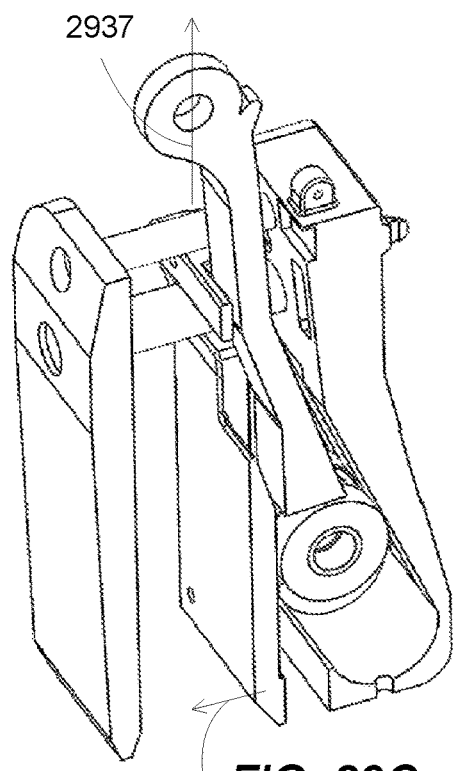
FIG. 29C
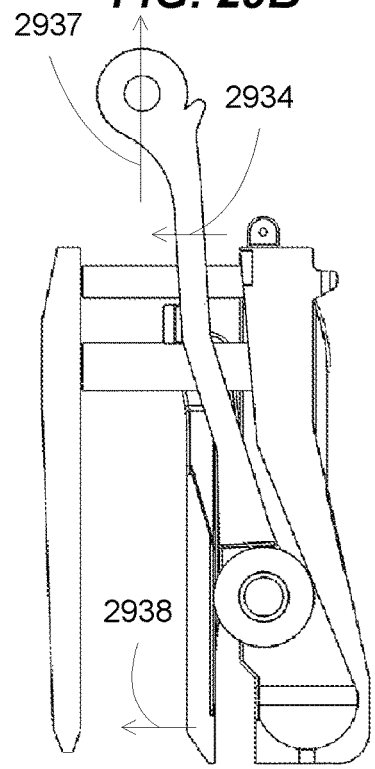
FIG. 29D

Forming a clamping device, wherein the clamping device comprises a first jaw coupled to a clamp bar, and a jaw assembly coupled to the clamp bar, wherein the jaw assembly comprises a second jaw disposed opposite the first jaw for clamping on an object,
wherein the jaw assembly comprises a jaw support,
wherein the jaw assembly comprises a hanging element disposed between the second jaw and the jaw support,
wherein at least an interface between the hanging element and the jaw support and an interface between the hanging element and the second jaw comprises a slanting surface,
wherein the slanting surface is configured so that when the clamping device is lifted up from the hanging element, the second jaw is configured to press on the object
3000

*FIG. 30A*

Forming a clamping device, wherein the clamping device comprises a clamp bar, a first jaw, and a jaw assembly,
wherein the jaw assembly comprises a jaw support, wherein at least one of the first jar or the jaw support is configured to movably couple to the clamp bar and to lockably coupled to the clamp bar at discrete positions through a locking mechanism,
wherein the jaw assembly comprises a second jaw disposed opposite the first jaw for clamping on an object, wherein the second jaw is coupled to the jaw support through a flexible component to allow the second jaw to move in multiple directions with respect to the jaw support,
wherein the jaw assembly comprises a hanging element disposed between the second jaw and the jaw support,
wherein at least an interface between the hanging element and the jaw support and an interface between the hanging element and the second jaw comprises a slanting surface, wherein the slanting surface interface comprises a rolling friction,
wherein the slanting surface is configured so that when the hanging element moves in a direction comprising a vertical direction, the second jaw moves away relative to the jaw support in a direction comprising a horizontal direction.
3020

*FIG. 30B*

Placing an object between two jaws of a clamping device
3200

Lifting a component of the clamping device, wherein the component is configured to exert a side force through a slanting surface to one of the two jaws for clamping on the object
3210

FIG. 32A

Locking a pulling element to a jaw assembly of a clamping device
3230

Placing an object between a first jaw and the jaw assembly
3240

Unlocking the pulling element from the jaw assembly
3250

Lifting the pulling element, wherein the pulling element is configured to move a second jaw of the jaw assembly toward the object through a slanting surface to narrow a gap between the jaws and the object
3260

Lifting the pulling element, wherein the pulling element is configured to exert a side force through the slanting surface to the second jaw for clamping on the object
3270

FIG. 32B

CLAMPING DEVICE WITH METAL CORES

The present invention relates to lifting devices. More particularly, it relates to clamping devices for lifting and transferring objects such as metal or ceramic plates.

The present invention relates to application Ser. No. 15/438,735, filed on Feb. 21, 2017, entitled "Clamping device for lifting and transfer objects", hereby incorporated by reference in its entirety.

BACKGROUND

In the heavy industry, large and heavy products can be difficult to handle manually. Thus, a hoist connecting to a clamping device can be used to lift and move heavy objects. A object can be clamped to a clamping device that is coupled to a hoist. The hoist can lift the object to a certain height, and then transfer to a proper location.

The clamping devices can utilize a mechanism that converts the weight of the object into a clamping force, thus the holding force on the object exerted by the clamping devices can be proportional to the weight of the object. A loading and unloading device, such as a crane or a hoist, can be coupled to the clamping device for lifting and transferring the objects.

A basic prior art clamping device can include a rotatable clamping jaw, which can rotate to change a spacing distance to a fixed clamping jaw. Rotation of the rotatable clamping jaw can enlarge or narrow the distance between the two clamp jaws. For example, an object can be placed between the two jaws from a bottom position, and the pushed upward toward the gap between the two jaws. The upward motion of the object can cause a clockwise rotation of the rotatable clamping jaw, which can make the distance between the two jaws larger, to accommodate an object. After the object is placed between the two jaws, the weight of the object can cause the object to move downward. The downward motion of the object can cause a counterclockwise rotation of the rotatable clamping jaw, which can narrow the distance between the two jaws, or to exert a clamping force on the object.

FIG. 1A illustrates a prior art rotatable clamping device according to some embodiments. A clamping device 100 can include a clamp body 110, which can house a fixed clamp jaw 130 and a rotatable clamp jaw 120. The fixed clamp jaw and the rotatable clamp jaw can be configured to clamp an object 160. The rotatable clamp jaw can have an offset center of rotation 150, thus when the rotatable clamp jaw rotates counter clockwise, it comes closer to the fixed clamp jaw 130. That way the clamping device can support a number of sizes of objects. A spring 140 can preload the rotatable clamp jaw, e.g., to push the rotatable clamp jaw toward the fixed clamp jaw.

In operation, when the clamping device 100 is empty, e.g., when there is no object in the clamping device, the spring 140 pushes the rotatable clamp jaw counterclockwise toward the fixed clamp jaw, so there is no gap between the two jaws. An object 160 can be pushed in the clamping device, for example, upward to the space between the two jaws from a bottom position. The pushing action can open the gap between the two jaws by rotating the rotatable clamp jaw clockwise.

Gravity then hold the object in place, e.g., when the object is pulling out of the clamping device, for example, in a downward direction, the rotatable clamp jaw is rotated counterclockwise due to friction between the object and the contact surface of the rotatable clamp jaw. The rotation exerts a force on the object, preventing the object from being pulled out of the clamping device.

The rotatable clamping device can be compact and simple. But there can be focused force at the rotatable clamp jaw, e.g., at the contact area of the rotatable clamp jaw with the object. Thus the rotatable clamping device is not designed to handle heavy object, since heavy object requires a large clamping force, and the focused large clamping force might cause damage to the object.

Another prior art clamping device can include a gripping device normally fabricated from structural steel components, that are designed to securely hold and lift construction materials though a scissor movement. The gripping device can use freely rotating pin connections to create a scissor configuration with two scissor arms.

A first end of the scissor arms is configured to rotate towards each other in reaction to the opposite second end of the scissor arms being lifted vertically. The first end of the scissor arms rotate inwards and generate a compression force clamping on the object to be lifted. Essentially, the weight of the object is used to generate this clamping action.

FIG. 1B illustrates a prior art gripping device according to some embodiments.

A gripping device 105 can include two scissor arms 125 and 155, which can freely rotate about a pivot point 135. The scissor arms 125 and 155 can include upper arms 121 and 151, together with lower arms 122 and 152, respectively, connected through the freely rotating pivot 135.

The upper arms 121 and 151 can be coupled to pulling elements 141 and 142, respectively. The coupling between the upper arms and the pulling elements can include freely rotating pin connections, e.g., the pulling element 141/142 can be rotated relative to the upper arm 121/151. The pulling elements 141 and 142 can be coupled to a lift 145, such as a hoist. The coupling between the pulling elements and the lift can include freely rotating pin connections, e.g., the pulling elements 141 and 142 can be rotated relative to the lift 145.

The lower arms 122 and 152 can be coupled to holding pads 111 and 112, respectively. The coupling between the lower arms and the holding pads can include freely rotating pin connections, e.g., the holding pads 111/112 can be rotated relative to the lower arm 122/152.

In operation, an object 165 is placed between the holding pads 111 and 112. The lift 145 is pulled up, which pulls on the pulling elements 141 and 142. The pulling elements 141 and 142 can in turn pull on the upper arms 121 and 151. The scissor movement between the upper arms 121/151 and the lower arms 122/152 around the pivot point 135 can turn the pulling action on the upper arm 121/151 into a pressing action of the lower arm 122/152, which presses on the object 165 through the holding pads 111 and 112.

Disadvantages of the gripper devices can include large sizes due to the long arms. For example, if the friction coefficient between the holding pads and the object is about 0.2, then a five times the weight of the object is needed to hold the object. In other words, the ratio of the upper arms and the lower arms is also about five to obtain the holding force.

SUMMARY OF THE EMBODIMENTS

In some embodiments, the present invention discloses a clamping device for lifting and transferring objects. Components of the clamping device can include a metal core embedded in a body of a different material. The embedded core construction can allow a simplified fabrication of the clamping device for high stresses, high forces, high durability and high reliability.

In some embodiments, the clamping device can employ slanting interfaces to convert a pulling action on the clamping device to a clamping action on the object.

BRIEF DESCRIPTION OF THE DRAWINGS

FIG. 1A illustrates a prior art rotatable clamping device according to some embodiments.

FIG. 1B illustrates a prior art gripping device according to some embodiments.

FIGS. 3A-3C illustrate flow charts for forming and operating a clamping device according to some embodiments.

FIG. 5A-5B illustrate flow charts for forming and operating a three-part clamping device according to some embodiments.

FIGS. 7A-7B illustrate flow charts for forming and operating clamping devices with rolling frictions according to some embodiments.

FIGS. 8A-8D illustrate a clamping device according to some embodiments.

FIGS. 9A-9C illustrate a clamping device with metal cores according to some embodiments.

FIGS. 11A-11E illustrate configurations for metal cores and bodies of a component of a clamping device according to some embodiments.

FIG. 12 illustrates a flow chart for forming a clamping device according to some embodiments.

FIGS. 13A-13F illustrate a process for casting a component having a body surrounding a metal core according to some embodiments.

FIG. 14 illustrates a flow chart for forming a component of a clamping device according to some embodiments.

FIGS. 16A-16C illustrate a jaw support configuration according to some embodiments.

FIGS. 17A-17D (a)-(c) illustrate configurations of body covering a jaw support frame according to some embodiments.

FIG. 21 illustrates a flow chart for forming a clamping device according to some embodiments.

FIGS. 24A-24D show a jaw support configuration having a slanting panel disposed in a middle portion of the jaw support.

FIGS. 25A-25D show a jaw support configuration having a slanting panel disposed in a middle portion of the jaw support.

FIGS. 27A-27D illustrate operations of a clamping device according to some embodiments.

FIGS. 29A-29D illustrate operations of a clamping device according to some embodiments.

FIGS. 30A-30B illustrate operations of a clamping device according to some embodiments.

FIGS. 32A-32B illustrate flow charts for operating a clamping device according to some embodiments.

DETAILED DESCRIPTION OF THE EMBODIMENTS

Figure 2A:
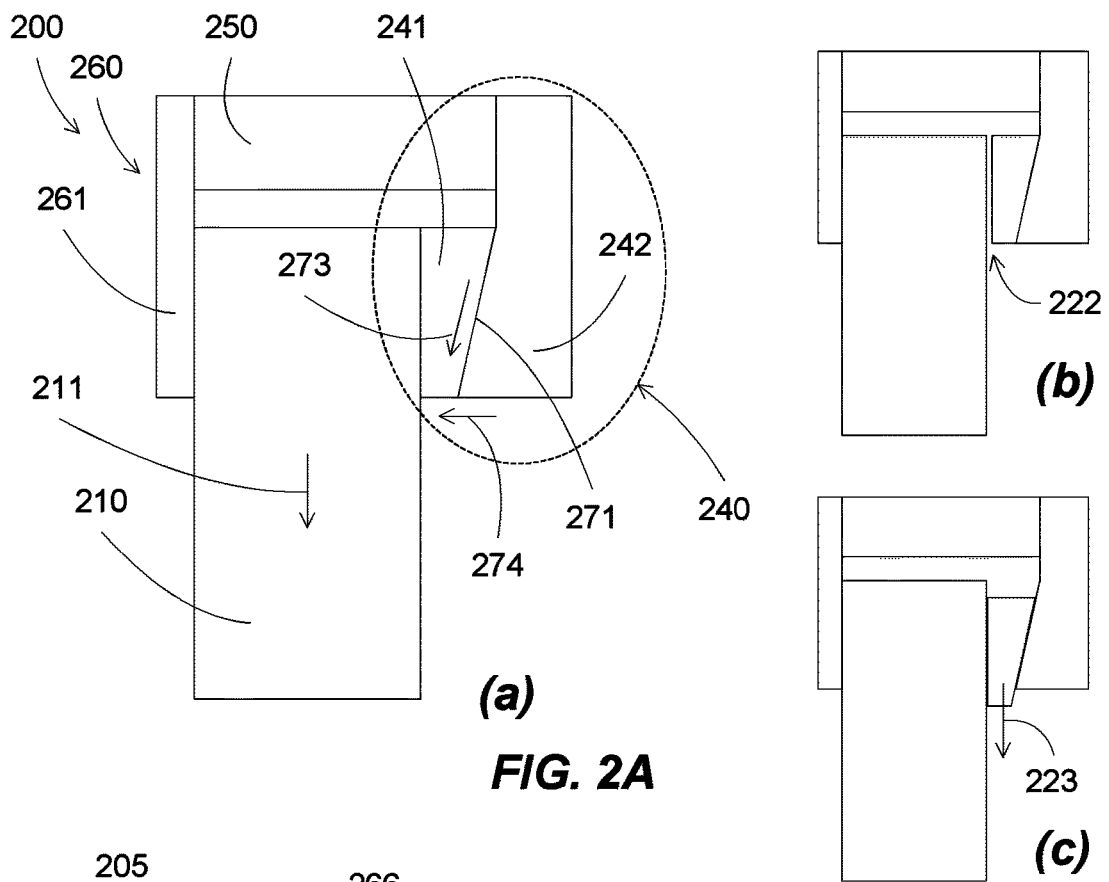
FIGS. 2A (a)-(c) and 2B illustrate clamping devices according to some embodiments.

In some embodiments, the present invention discloses a clamping device for lifting and/or transferring objects, such as metal, granite, ceramic, glass, quartz, or concrete plates. Since the clamping device can be used to lift heavy objects, e.g., heavier than hundreds or thousands kilograms, the components of the clamping device, such as the jaw assemblies, can require appropriate strength, hardness, durability, and reliability, especially at areas of high forces, high stresses, or high strain due to the handling of the heavy objects.

In some embodiments, the present invention discloses a cost effective clamping device that can satisfy the requirements of strength, hardness, durability, and reliability. For example, the clamping device can include one or more components having a metal core embedded in a body of a different material, such as a polymer material. The metal core can be designed to sustain the high forces or stresses generated during the handling of the heavy objects. The body can be designed to provide a protective cover, for example, to prevent the clamping device from being damaged by the environment ambient. The body can also function to sustain low forces or stresses on the clamping device, such as a mounting fixture for a locking mechanism that can secure a jaw assembly to a clamp bar, e.g., a connection element between the two jaw assemblies of the clamping device.

In some embodiment, the metal core can include steel or stainless steel panels, e.g., plates, that are welded together. Thus the metal core can provide the structural support for the clamping device, e.g., allowing the clamping device to handle heavy objects without damaging the clamping device, such as preventing cracking, denting, and/or deformation. In some embodiments, a force distribution analysis can be performed to determine the locations of high forces or high stresses in the components of the clamping device. The metal core can then be placed at these locations to handle these high forces or high stresses. In addition, support elements can be added to increase strength and durability of the metal core, such as an additional panel or reinforced bars at surfaces with high stresses. The metal core can provide high strength, hardness, durability and reliability with proper selection of metals, such as steel or stainless steel material.

In some embodiment, the body can include a material different from the material of the metal core. For example, the body material can include a polymer material, such as plastic, e.g., high hardness and high strength plastic. In some embodiments, the body material can include a soft metal, e.g., a metal with lower hardness or lower melting temperature than the metal used to form the metal core, such as aluminum or an aluminum alloy. The body can be cast, with the metal core inside. For example, the metal core can be placed inside a mold, and the body material can be provide to the mold, partially or completely surrounding the metal core.

The composite components of the clamping device, e.g., a jaw assembly formed with a metal core surrounded by a different and softer material, can be advantageous over components formed with one material. For example, cast aluminum components might require extensive processing with prolong heat treatment to achieve good strength and hardness. Further, the casting process might also require special equipment and processes in order to achieve uniformity, such as density and hardness, throughout the components. Aluminum components formed by machining can have good strength, hardness and uniformity, but can be costly due to the machining costs.

In some embodiments, a clamping device can include two jaw assemblies coupled to a clamp bar, e.g., a connection element. The jaw assemblies can be disposed away and facing each other. Each jaw assembly can include a jaw for clamping on an object. A jaw assembly can include other components, such as a high friction pad, e.g., a rubber pad with high surface area pattern, coupled to a surface of the jaw for holding the object. The jaw assembly can be coupled to the clamp bar through the jaw, e.g., it is the jaw that is coupled to the clamp bar, and the other components, such as the rubber pad, can be coupled to the jaw.

A jaw assembly can include a jaw support, in addition to the jaw and optionally the rubber pad. The jaw assembly can be coupled to the clamp bar through the jaw support, e.g., it is the jaw support that is coupled to the clamp bar, and the other components, such as the jaw, can be coupled to the jaw support. The other components can be coupled to the components that are coupled to the jaw support, such as the rubber pad is coupled to the jaw.

In some embodiments, there are two jaw supports coupled to the clamp bar. The clamping device thus can include a first jaw assembly having a first jaw and a first rubber pad coupled to the first jaw support, and a second jaw assembly having a second jaw and a second rubber pad coupled to the second jaw support.

In some embodiments, there are one first jaw and one jaw support coupled to the clamp bar. The clamping device thus can include a first jaw assembly having the first jaw and a first rubber pad. The clamping device can include a second jaw assembly having a second jaw and a second rubber pad coupled to the jaw support.

The jaw assemblies can be fixedly coupled to the clamp bar, or can be movably coupled to the clamp bar. If movably coupled to the clamp bar, the jaw assemblies can be secured, e.g., fixedly coupled to the clamp bar when secured, and movable when unsecured. The movable jaw assemblies can be used to adjust a distance between the jaws for accommodating different sizes of the object to be clamped and lifted. After the object is placed between the jaws, e.g., after the opening between the jaws is large enough to accommodate the object, the movable jaw assemblies can be secured, e.g., fixedly coupled to the clamp bar.

In some embodiments, there are two jaw assemblies movably and securely coupled to the clamp bar. For example, a first jaw assembly can include a first jaw having an opening in which the clamp bar can pass through. Thus the first jaw (and the first jaw assembly) can be movable along the clamp bar. A first locking mechanism can be include to secure the first jaw to the clamp bar, such as a latch or a spring-loaded latch. The locking mechanism can be engaged, e.g., securing the jaw (and the jaw assembly) to the clamp bar, and/or disengaged, e.g., releasing the jaw (and the jaw assembly) from the clamp bar so that the jaw (and the jaw assembly) can be freely movable along the clamp bar, with or without a key.

Alternatively, a first jaw assembly can include a first jaw coupled to a first jaw support which has an opening in which the clamp bar can pass through. Thus the first jaw support (and the first jaw assembly) can be movable along the clamp bar. A first locking mechanism can be include to secure the first jaw support to the clamp bar, such as a latch or a spring-loaded latch. The locking mechanism can be engaged, e.g., securing the jaw support (and the jaw assembly) to the clamp bar, and/or disengaged, e.g., releasing the jaw support (and the jaw assembly) from the clamp bar so that the jaw support (and the jaw assembly) can be freely movable along the clamp bar, with or without a key.

The second jaw assembly can be similarly constructed. For example, the second jaw assembly can include a second jaw having an opening in which the clamp bar can pass through and a second locking mechanism to secure the second jaw to the clamp bar. Alternatively, the second jaw assembly can include a second jaw coupled to a jaw support which has an opening in which the clamp bar can pass through and a second locking mechanism to secure the second jaw support to the clamp bar.

In some embodiments, there are one first jaw assembly movably and securely coupled to the clamp bar and one second jaw assembly fixedly coupled to the clamp bar. For example, a first jaw assembly can include a first jaw having an opening in which the clamp bar can pass through. Thus the first jaw (and the first jaw assembly) can be movable along the clamp bar. A first locking mechanism can be include to secure the first jaw to the clamp bar, such as a latch or a spring-loaded latch. The locking mechanism can be engaged, e.g., securing the jaw (and the jaw assembly) to the clamp bar, and/or disengaged, e.g., releasing the jaw (and the jaw assembly) from the clamp bar so that the jaw (and the jaw assembly) can be freely movable along the clamp bar, with or without a key.

Alternatively, a first jaw assembly can include a first jaw coupled to a first jaw support which has having an opening in which the clamp bar can pass through. Thus the first jaw support (and the first jaw assembly) can be movable along the clamp bar. A first locking mechanism can be include to secure the first jaw support to the clamp bar, such as a latch or a spring-loaded latch. The locking mechanism can be engaged, e.g., securing the jaw support (and the jaw assembly) to the clamp bar, and/or disengaged, e.g., releasing the jaw support (and the jaw assembly) from the clamp bar so that the jaw support (and the jaw assembly) can be freely movable along the clamp bar, with or without a key.

The second jaw assembly can be fixedly coupled to the clamp bar. For example, the second jaw assembly can include a second jaw fixedly coupled to the clamp bar. Alternatively, the second jaw assembly can include a second jaw coupled to a jaw support which is fixedly coupled to the clamp bar.

In some embodiments, there are two jaw assemblies fixedly coupled to the clamp bar. For example, a first jaw assembly can include a first jaw which is fixedly coupled to the clamp bar, such as with a bolt set. Alternatively, the first jaw assembly can include a first jaw coupled to a first jaw support which is fixedly coupled to the clamp bar. Similarly, the second jaw assembly can include a second jaw which is fixedly coupled to the clamp bar. Alternatively, the second jaw assembly can include a second jaw coupled to a second jaw support which is fixedly coupled to the clamp bar.

In some embodiments, the clamp bar can include a connection bar having a round or substantially rectangular cross section, such as a rectangular shape with rounded corners. The connection bar can be large enough so that a fixed jaw assembly can be secured to. The connection bar can also be configured to let a movable jaw assembly pass through for moving along the clamp bar.

In some embodiments, the clamp bar can include multiple connection bars, such as multiple round rods or polygon rods. Each connection bar can be secured to a fixed jaw assembly with bolts, for example, at one end of the connection bar. The multiple connection bars can be distributed to provide structural support to the jaw assemblies.

In some embodiments, the clamping device can use a slanting surface to convert the weight of the object into a compression force for clamping and holding the object. The slanting surface can provide a high ratio of force transfer. Due to the high conversion ratio, the clamping devices using slanting surface can be compact for lifting and transferring heavy objects.

A slanting interface can be included in a jaw assembly, for example, between a jaw and a jaw support, or between the jaw support (or the jaw) and another component of the clamping device. When a hoist coupled to a clamping device is pulling upward, the upward force can be converted to a side force due to the slanting interface. Alternatively, when an object is sliding down from the clamping device, the weight of the object can be converted to the side force due to the slanting interface. The side force can press on the jaw of the jaw assembly for clamping on the object, preventing the object from being released or slide or dropped from the clamping device.

The clamping device can have one slanting interface, e.g., a first jaw assembly having the slanting interface and a second jaw assembly without a slanting interface. Alternatively, the clamping device can have two slanting interfaces, e.g., a first jaw assembly having two slanting interfaces, or a first jaw assembly having a first slanting interface and a second jaw assembly having a second slanting interface.

Figure 2B:
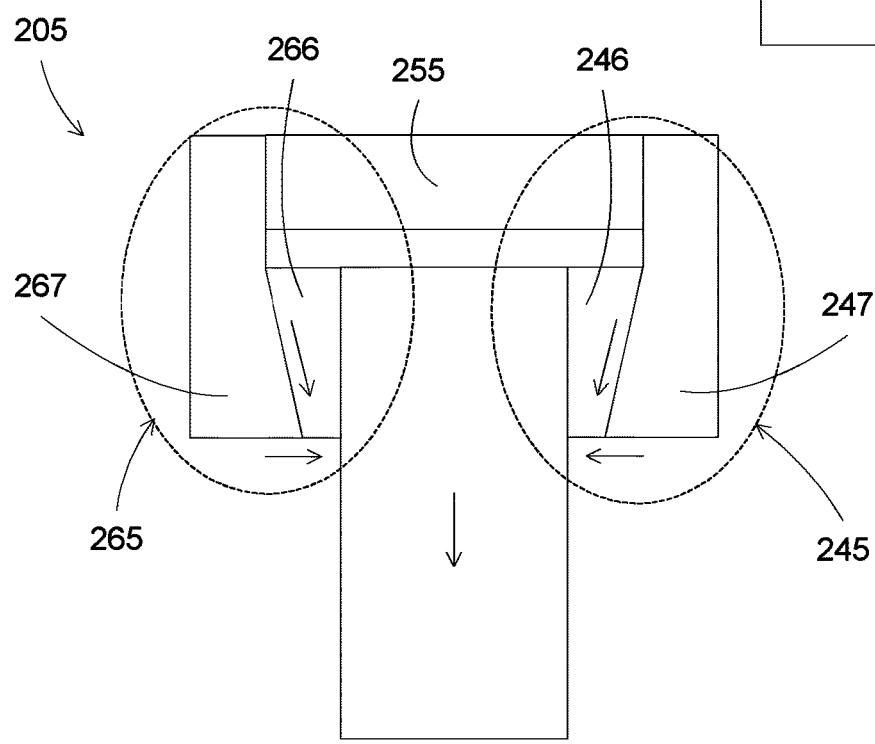

FIGS. 2A (a)-(c) and 2B illustrate clamping devices according to some embodiments. The clamping devices can have compact sizes for handle heavy objects. FIG. 2A (a)-(c) show a clamping device 200 having one slanting interface in a jaw assembly 240. FIG. 2B shows a clamping device 205 having two slanting interfaces in two jaw assemblies 245 and 265.

In FIG. 2A (a), a clamping device 200 can include two jaw assemblies 240 and 260 coupled to a clamp bar 250. The jaw assembly can include a jaw, or a jaw and a jaw support. As shown, the jaw assembly 260 includes a jaw 261. And the jaw assembly 240 includes a jaw 241 and a jaw support 242.

The jaw assembly can be fixedly coupled to the clamp bar, or can be movably and securably (or lockably) coupled to the clamp bar, using an optional locking mechanism. As shown, the jaw assemblies 260 and 240 are fixedly coupled to the clamp bar 250. Alternatively, the jaw assemblies can be movably coupled to the clamp bar, such as the jaw assembly 240 can be movably coupled to the clamp bar 250. For movable jaw assemblies, locking mechanisms, such as latch mechanisms, can be included for securing the jaw assemblies to the clamp bar.

The jaw assemblies 240 and 260 each can include a jaw for clamping on an object 210. For example, the jaw assembly 260 can include a first jaw 261. The jaw assembly 240 can include a second jaw 241, which together with the first jaw 261, pressing on the object 210 for clamping the object. The jaw assemblies can be fixedly coupled to the clamp bar. For example, the jaw assembly 260 can be fixedly coupled to the clamp bar 250 by securing the first jaw 261 with the clamp bar 250. In some embodiments, the jaw assemblies can be movable along to the clamp bar, e.g., to accommodate different sizes of the object. For a movable jaw assembly, after the movable jaw assembly is moved so that the jaw opening between the jaws is large enough to clamp on the object, the movable jaw assembly can then be fixed to the clamp bar.

The jaw assembly 240 can include a slanting interface 271, which can include a slanting surface on the second jaw 241, mating with a slanting surface on the jaw support 242. At the slanting interface 271, e.g., at the mated slanting surfaces of the second jaw 241 and the jaw support 242, the second jaw 241 can move relative to the jaw support 242 along the slanting interface.

When the object 210 starts to move down due to gravity, the object can cause the second jaw to also start to move down due to a friction between the object and the second jaw. Alternatively, when the clamping device 200 starts to move up for lifting the object 210, the clamping device starts to cause the jaw support to move up.

The slanting interface 271 can be configured so that when the second jaw 241 starts to move down 273 (or when the jaw support 242 starts to move up), the second jaw can also start to move away 274 from the jaw support since the jaw support is secured to the clamp bar. The potential side movement of the second jaw can exert a force on the object, preventing the object from moving down, e.g., to clamp the object in place.

The slanting interface can be configured so that the second jaw 241 can be moving toward the object 210 when the second jaw 241 is moving down. Thus, if there is no obstacle blocking the movement of the second jaw, e.g., the object is not present or the object is not in contact with the second jaw, the second jaw is moving toward the object when the second jaw is moving downward.

The slanting interface can be configured so that when there is a downward force 273 acting on the second jaw 241, the downward force can be converted to a sideward force 274 toward the object. The downward force can be a force in any direction having a force component in a downward direction. The conversion of the downward force can be viewed as a decomposition or a splitting of the downward force into multiple force components, in which a force component has a sideward direction. Thus, if there is no obstacle blocking the movement of the second jaw, e.g., the object is not present or the object is not in contact with the second jaw, the second jaw is moving toward the object (in addition to the second jaw moving down) when there is a downward force acting on the second jaw. If there is an obstacle blocking the movement of the second jaw, e.g., the object is in contact with the second jaw, there is a sideward force from the second jaw pressing on the object.

The slanting interface can include a slanting surface making an acute angle with a vertical plane with a top portion of the slanting surface away from the object more than a bottom portion of the slanting surface. The slanting surface can be tilted toward the object at a bottom portion, or tilted away from the object at a top portion.

The slanting interface can have a low friction surface, e.g., lower than the friction between the object 210 and the second jaw 241. For example, the second jaw 241 can include a rubber layer facing the object, which can have high friction toward the object. The first jaw 261 can also include a rubber layer facing the object.

In some embodiments, the downward direction means the direction of the gravity. An upward direction means an opposite direction of the downward direction. A top portion can mean a portion in an upward direction, in opposite direction to a bottom portion, which can mean a portion in a downward direction.

A sideward direction means a horizontal direction, e.g., a direction perpendicular to the downward direction. Since the clamping device is configured to clamp, lift and transfer objects, the object exerts a downward force on the clamping device due to gravity, or the clamping device exerts an upward force on the object for lifting the object.

In operation, the object is first clamped between the jaws 261 and 241 of the clamping device. For clamping device with a movable jaw assembly, the locking mechanism of the movable jaw assembly can be disengaged, so that the movable jaw assembly is free to move along the clamp bar. The movable jaw assembly can be moving away from the jaw assembly to enlarge the opening between the two jaws. Once the opening is large enough to accommodate the object, the object can be placed between the jaws. The movable jaw assembly can then be moving toward the object so that the object is in contact with the jaws, or so that there is a minimum gap between the object and the jaws. The movable jaw assembly then can be secured to the clamp bar, for example, by engaging the locking mechanism.

There can be a gap 222 (FIG. 2A (b)) between the object and the jaws, e.g., the opening of the jaws of the clamping device configuration can be larger than the size of the object for ease of accepting the object. For example, a clamping device with fixed jaw assemblies can be selected to meet the object sizes. Alternatively, for clamping devices with fixed jaw assemblies, a locking mechanism can secure the movable jaw assembly to the clamp bar at discrete locations, and the engagable locations for the current object do not allow the object to be in contact. The location to engage the locking mechanism can be selected to ensure a minimum gap between the object and the jaws, meaning the distance between the object and the first and second jaw is smaller than the distance between two successive locking locations of the locking mechanism. The minimum gap can be achieved by moving the movable jaw assembly in a direction of narrowing the gap until the movable jaw assembly reaches the object, e.g., until the object is in contact with the jaws. The movable jaw assembly is then backed up, e.g., moving in an opposite direction of enlarging the gap, until reaching the first engagable location for the locking mechanism.

After placing the object between the jaws and locking the jaw assembly, one or both jaws can be adjusted, e.g., moved, so that the jaws are in contact with the object. The object can be moved so that it is in contact with the first jaw 261 (e.g., the jaw of the jaw assembly that cannot be moved), leaving a gap only between the object and the second jaw 241 (e.g., the jaw of the movable jaw assembly). Then the second jaw 241 can be slide downward 223 (FIG. 2A (c)) (and moving toward the object at a same time due to the slanting interface), until the object is in contact with the second jaw.

A force can be applied to the push the second jaw downward so that there is a good friction between the jaws and the object. This is to ensure that the object will not slide out the grip of the jaws. With a good friction between the object and the jaws, the slanting interface will assist in converting the weight of the object into a clamping force, which can hold the object between the jaws.

After the jaws are adjusted, e.g., the jaws are in contact with the object, the clamping device can be slowly lifted up. The weight of the object can pull the second jaw 241 down, since the friction at the slanting interface 271 is less than the friction between the object and the first and second jaws 261 and 241. Due to the slanting interface, the downward force 211 of the object weight can be converted to a force 273 along the slanting interface, which can be converted to a sideward force 274 toward the object. The sideward force 274 can exert a force on the object, holding the object in place, preventing the object from going down, e.g., slipping out of the jaws.

Advantages of the clamping device using the slanting interface can include compact size, since the clamping device includes two opposite jaw assemblies connected by a clamp bar. Further, the force clamping on the object can be well distributed throughout the surface of the jaws, meaning no focused point.

Further, the contact surfaces of the clamping device with the object can be scalable, meaning large size jaw pads can be used to accommodate heavy objects. Together with evenly distributed force, the clamping device can be gentle on the object, meaning the clamping device can be used on heavy fragile objects, such as granite, glass or ceramic plates.

FIG. 2B shows another configuration for a clamping device. A clamping device 205 can include two jaw assemblies 245 and 265 coupled to a clamp bar 255. The jaw assembly 265 includes a jaw 266 and a jaw support 267, together with a first slanting interface there between. And the jaw assembly 245 includes a jaw 246 and a jaw support 247, together with a second slanting interface there between. Optional locking mechanisms can be used to secure the jaw assemblies to the clamp bar.

With two jaw support assemblies, the object can be symmetrically oriented, thus the two jaws 246 and 266 can be pulling down together by the weight of the object. The two jaws then can be sliding toward the object, due to the slanting interfaces, and exerting forces on the object, keeping the object in place and preventing the object from moving out of the clamp device.

In some embodiments, the components of the clamping devices 200 and 205, such as the jaw supports 242, 247 and/or 267, the jaws 241, 261, 246, and/or 267, the clamp bars 250 and/or 255, can include a metal core embedded in a different material. The construction of the components using metal cores can be simpler and more cost effective while meeting the requirements of strength, hardness, durability and reliability.

FIGS. 3A-3C illustrate flow charts for forming and operating a clamping device according to some embodiments. In FIG. 3A, operation 300 forms a clamping device, wherein the clamping device comprises a jaw and a jaw support, wherein the jaw and the jaw support is coupled with a slanting surface, wherein the slanting surface is configured so that when the jaw moves down, the jaw also moves toward an object. The slanting surface can also be configured so that when there is a force comprising a downward direction acting on the jaw, there is a force comprising a sideward direction acting toward an object to be clamped by the clamping device.

In FIG. 3B, operation 320 forms a clamping device, wherein the clamping device comprises a clamp bar, a first jaw fixedly coupled to the clamp bar, and a jaw assembly movably and securely coupled to the clamp bar, wherein the jaw assembly comprises a second jaw and a jaw support, wherein the second jaw and the jaw support is coupled with a slanting surface, wherein the slanting surface is configured so that when the second jaw moves down, the second jaw also moves toward an object supported between the first and second jaw for keeping the object in place. The slanting surface can also be configured so that when there is a force comprising a downward direction acting on the second jaw, there is a force comprising a sideward direction acting toward the object.

In some embodiments, the jaw support can include a metal core at least partially embedded in a jaw support body. The metal core can include a steel or stainless steel material. The metal core can be configured to provide a structural support for the clamping device. The metal core can include a panel for coupling to the clamp bar, e.g., a connection element such as one or more connection bars or rods. The metal core can include welded panels. The metal core can include a first panel for coupling to the clamp bar such as to a connection bar. The metal core can include a slanting panel for translating a force of object lifting to a force pushing on a jaw for clamping on the object. For example, the slanting panel can be configured to be in a direction to provide that the dimension between the second jaw and the jaw support that is larger at a location farther from the clamp bar than at a location nearer the clamp bar. The metal core can include a structural support for strengthening the slanting panel.

The jaw support body can include a material different from the material of the metal core. For example, the jaw support body can include a polymer-based material or aluminum. The jaw support body can form a protective cover for the jaw assembly. The jaw support body can include a cast body with the metal core disposed therein. The jaw support body can include a portion protruded from the metal core. The jaw support body can include exposed portion of the metal core, e.g., there can be a portion of the metal core not covered by the jaw support body. The jaw support body can include through holes corresponded to through holes of the metal core.

In FIG. 3C, operation 340 places an object between a first jaw and a second jaw of a clamping device, wherein the second jaw is coupled to a jaw support with a slanting surface, wherein the slanting interface is configured so that when the object moves down, the object makes the second jaw moving toward the object for keeping the object in place.

The first and second jaws can be directly or indirectly coupled to a clamp bar. For example, the first jaw can be directly coupled to the clamp bar. The second jaw can be indirectly coupled to the clamp bar, e.g., the second jaw is coupled to jaw support while the jaw support is directly coupled to the clamp bar.

If the opening between the first jaw and the second jaw is not enough to accommodate the object, the first jaw, the second jaw, or the jaw support can be move along the clamp bar to enlarge the opening distance.

After placing the object between the jaws, the opening can be narrowed so that the object is in contact with the jaws, or there is a minimum gap between the object and the jaws. The first jaw, the second jaw, or the jaw support then can be securely coupled to the clamp bar.

If there is a gap between the object and the jaws, one or two jaws can be adjusted, e.g., changing the positions of the jaws or moving the jaws, so that the jaws can contact the object. For example, the jaws can be pressed down along the slanting interfaces. During the downward movements of the jaws, the jaws also move sideward toward the object. The jaws can be pressed down until the jaws are in contact with the object.

Operation 350 lifts the clamping device to move the object.

In some embodiments, the clamping device can include a pulling element, which is disposed between a jaw and a jaw support of a jaw assembly. A slanting interface can be included between the pulling element and at least one of the jaw and the jaw support. For example, there can be a slanting interface between the pulling element and the jaw support. There can be a second slanting interface between the pulling element and the jaw. The pulling element can simplify the operation of the clamping device, for example, by eliminating the adjustment of the jaws, e.g., moving the jaws so that the jaws can be in contact with the object if there are gaps between the jaws and the object after the jaw assemblies are secured to the clamp bar.

By pulling on the pulling element, when there is a gap, the jaw will move toward the object to narrow the gap. After the jaws are in contact with the object, further pulling action will exert a force from the jaws to the object, clamping the object in place. The clamping force can be evenly distributed at the clamping jaws.

Further, the pulling element can improve the clamping force on the object, for example, due to the wedging configuration of the jaw and the jaw support. The high clamping force can improve the gripping action of the clamping device on the object, further preventing the object from slipping out of the jaws of the clamping device.

In some embodiments, the present invention discloses a clamping device for lifting and/or for transferring heavy objects, such as granite plates, cement blocks, metal plates, and objects of other shapes and materials. The clamping device can grip the objects by clamping on portions of the objects, such as at edges of the objects.

The present clamping device can lift an object, or multiple objects placing next to each other, such as lifting a plate or a stack of multiple plates. The clamping device can be used for lifting heavy plates with large thicknesses without damaging the lifted plates, such as without deforming or cracking the plates. The center of the clamping action can be evenly distributed to the clamping jaws, to provide an even clamping force on the objects.

Further, the clamping device can be compact and light weight, e.g., which can include two jaw assemblies coupled to a clamp bar. The small size of the clamping device can allow the clamping device to be placed in the gaps of multiple objects to clamp on the selected object. For example, multiple heavy plates can be stacked against each other in a facility with small gaps in between. The clamping device can be placed at the gaps, and enclosing the plate to be clamped.

The small size and light weight of the clamping device can allow the clamping device to easily move along the object, for example, so that the clamping device can clamp on a vertical line with the center of gravity of the object. The alignment of the clamping device with the center of gravity can prevent excessive tilting of the object when lifted.

Figure 4A:
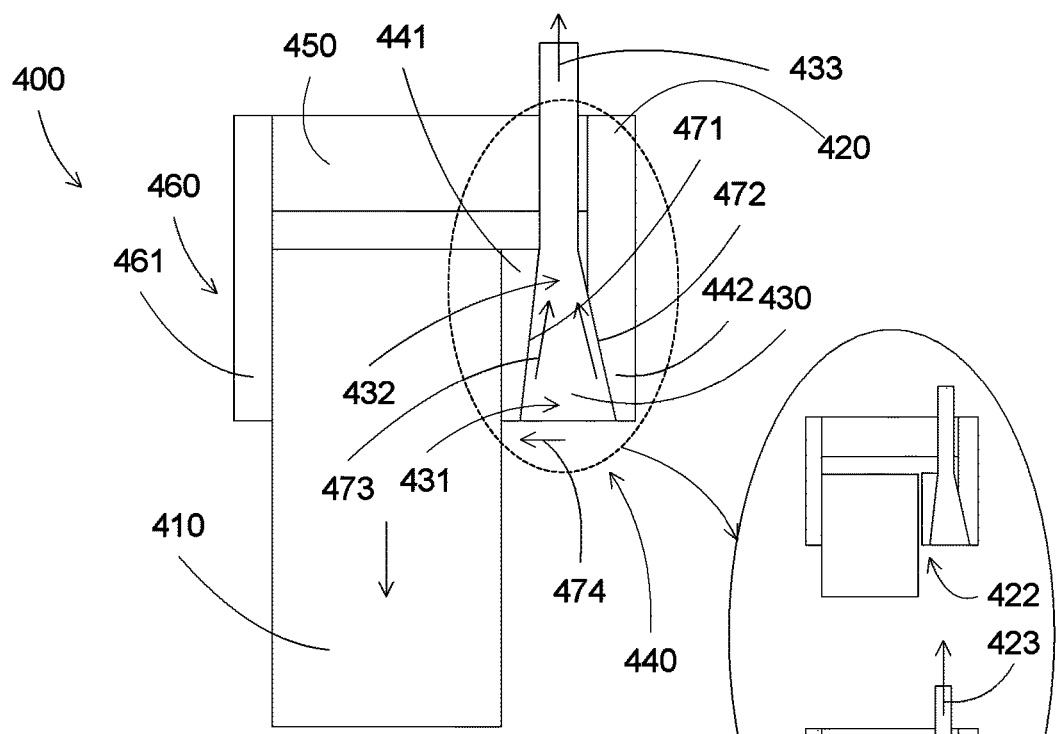
FIGS. 4A-4B illustrate clamping devices according to some embodiments.
Figure 4B:
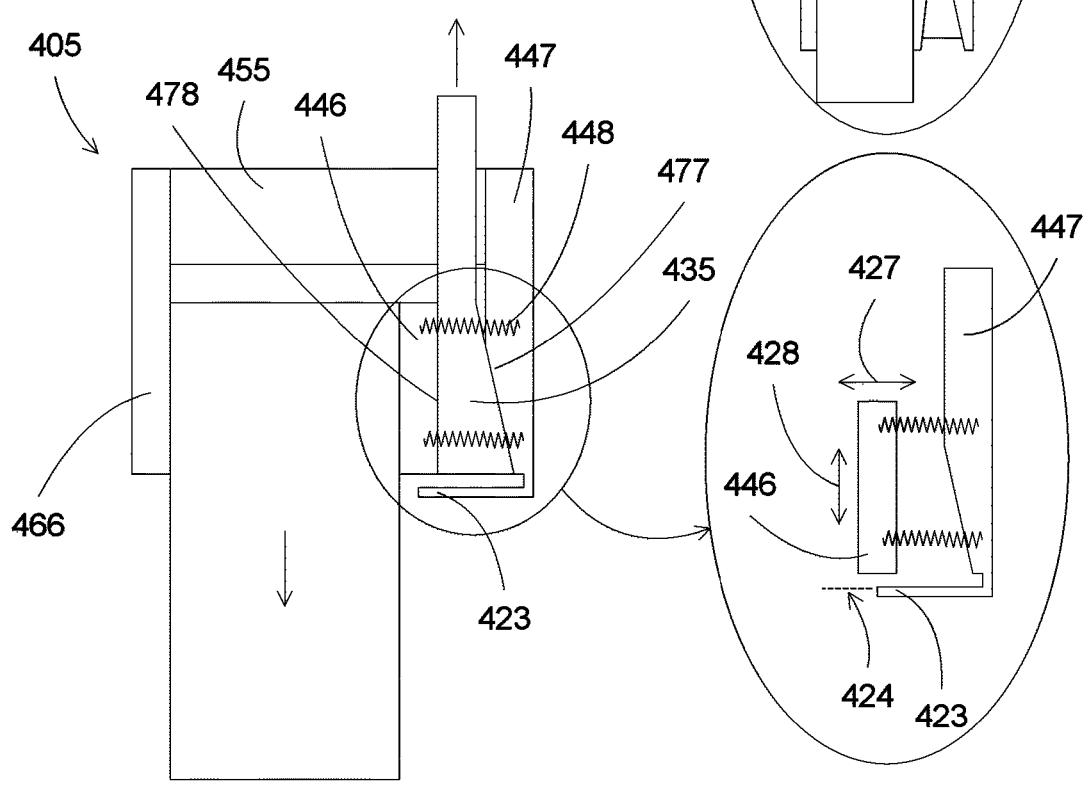

FIGS. 4A-4B illustrate clamping devices according to some embodiments. In FIG. 4A, a clamping device 400 can include two jaw assemblies 440 and 460 coupled to a clamp bar 450. The jaw assembly can include a jaw, or a jaw and a jaw support. As shown, the jaw assembly 460 includes a jaw 461. And the jaw assembly 440 includes a jaw 441 and a jaw support 442.

The jaw assembly can be fixedly coupled to the clamp bar, or can be movably and securably (or lockably) coupled to the clamp bar, using an optional locking mechanism. As shown, the jaw assemblies 440 and 460 are fixedly coupled to the clamp bar 450. Alternatively, one or both jaw assemblies can be movably coupled to the clamp bar, together with optional locking mechanism for securing the jaw assemblies to the clamp bar.

The jaw assemblies 440 and 460 each can include a jaw for clamping on an object 410. For example, the jaw assembly 460 can include a first jaw 461. The jaw assembly 440 can include a second jaw 441, which together with the first jaw 461, pressing on the object 410 for clamping the object. The jaw assemblies can be fixedly or movably coupled to the clamp bar. For example, a jaw assembly can be movably coupled to the clamp bar by having a jaw movably along the clamp bar. The movable jaw then can be secured to the clamp bar by a locking mechanism, for example, through a latching mechanism that latches the movable jaw to the clamp bar.

The jaw assemblies can be movable along to the clamp bar, e.g., to accommodate different sizes of the object. Once the jaw opening between the jaws is large enough to clamp on the object, the jaw assembly can then be fixed to the clamp bar. For example, a jaw assembly can be movable along the clamp bar by sliding the jaw support along the clamp bar. A locking mechanism can be included to lock, e.g., to secure, the jaw assembly to the clamp bar, for example, by latching the jaw support to the clamp bar.

A pulling element 430 can be disposed between the jaw 441 and the jaw support 442 of the jaw assembly 440. The pulling element can be loosely coupled to the clamp bar. For example, the pulling element can include a hollow space, such as a through hole, in which the clamp bar can pass through. The hollow space can be larger than the cross section of the clamp bar, so that the pulling element can move relative to the clamp bar.

Alternatively, the clamp bar between the two jaw assemblies, e.g., the connection element between the two jaw assemblies, can include one connection bar or multiple connection bars. The multiple connection bars can be secured to the jaw assemblies, and the pulling element can be disposed between the connection bars.

In some embodiments, the pulling element can be constrained to prevent sideward movements, e.g., the pulling element can move in the up and down directions, e.g., in the directions of gravity and in the directions along the clamp bar. Thus the hollow space of the pulling element can be larger above and below the clamping bar, to allow the pulling element to move up and down with respect to the clamp bar. The hollow space can be close to the clamp bar at sides, such as in contact or having a small gap. The closeness of the pulling element and the clamp bar in sideward directions, e.g., in directions perpendicular to the gravity directions, can constrain the pulling element from moving in the sideward directions. Similarly, the multiple clamp bar configuration with the pulling element disposed between the clamp bars can allow the pulling element to move freely in directions except the sideward directions.

There can be slanting interfaces between the pulling element and the jaw assembly in which the pulling element is disposed within. For example, slanting interface 471 can be between the pulling element 430 and the jaw 441. Slanting interface 472 can be between the pulling element 430 and the jaw support 442. There can be two slanting interfaces, or there can be one slanting interface, with the other interface being a non-slanting interface, e.g., a vertical surface or a tilted surface sloped in an opposite direction as the slanting interface. As shown, the pulling element can move up and down along the slanting interfaces 471 and 472.

The slanting interfaces can be configured so that when the pulling element moves up, e.g., in a direction 433 for lifting the object, the jaw can move in a direction that increase a separation between the jaw and the jaw support. For example, a bottom portion 431 of the pulling element, e.g., a dimension of the pulling element at the bottom portion 431 in a direction between the jaw and the jaw support, can be larger than a top portion 432 of the pulling element, e.g., a dimension of the pulling element at a top portion 432 in a direction between the jaw and the jaw support, or a dimension of the pulling element at a portion above the dimension of the pulling element at a top portion 431, in a direction between the jaw and the jaw support.

That way, when the pulling element moves up, the larger bottom portion also moves up, further separating the jaw and the jaw support. The slanting interface between the pulling element and the jaw support can provide that the corresponding bottom portion of the jaw support can be smaller than the corresponding top portion of the jaw support. The slanting interface between the pulling element and the jaw can provide that the corresponding bottom portion of the jaw can be smaller than the corresponding top portion of the jaw.

In some embodiments, the slanting interfaces can be provided at a portion of the surface that the pulling element is facing the jaw or the jaw support. Thus a bottom portion 431 or a top portion 432 of the pulling element can be only a portion of the interface between the pulling element and the jaw/jaw support.

The slanting interfaces 471 and 472 can be configured so that when the pulling element 430 starts to move up 433, the pulling element can move along the slanting interfaces. With the slanting interfaces, the jaw 441 can also start to move away 474 from the jaw support since the jaw support is secured to the clamp bar by the locking mechanism 420. The potential side movement of the second jaw can exert a force on the object, preventing the object from moving down, e.g., to clamp the object in place.

The slanting interface can be configured so that the second jaw 441 can be moving toward the object 410 when the pulling element 430 is moving up. Thus, if there is no obstacle blocking the movement of the second jaw, e.g., the object is not present or the object is not in contact with the second jaw, the second jaw is moving toward the object or away from the jaw support when the pulling element is moving upward.

The slanting interface can be configured so that when there is an upward force 433 acting on the pulling element 430, there is an upward force 473 (e.g., a force having a component in the upward direction) along the slanting interfaces. The upward force 473 can be converted to a sideward force 474 toward the object. The conversion of the upward force can be viewed as a decomposition or a splitting of the upward force into multiple force components, in which a force component has a sideward direction. Thus, if there is no obstacle blocking the movement of the jaw, e.g., the object is not present or the object is not in contact with the jaw, the jaw is moving toward the object (in addition to the jaw potentially moving down) when there is upward force acting on the pulling element. If there is an obstacle blocking the movement of the jaw, e.g., the object is in contact with the jaw, there is a sideward force from the jaw pressing on the object.

The slanting interface can include a slanting surface 471 making an acute angle with a vertical plane with a top portion of the slanting surface away from the object more than a bottom portion of the slanting surface. The slanting surface can be tilted toward the object at a bottom portion, or tilted away from the object at a top portion.

The slanting interface can include a slanting surface 472 making an acute angle with a vertical plane with a top portion of the slanting surface nearer the object more than a bottom portion of the slanting surface. The slanting surface can be tilted away from the object at a bottom portion, or tilted toward the object at a top portion.

The slanting interface can have a low friction surface, e.g., lower than the friction between the object 410 and the jaws 461 and 441. For example, the jaws 461 and 441 can include a rubber layer facing the object, which can have high friction toward the object.

There can be one or two slanting interfaces. The combination of these slanting interfaces is configured so that the jaw moves toward the object when the pulling element moves up, and that the jaw moves away from the object when the pulling element moves down. For example, there can be two slanting interfaces 471 and 472, and both of them are configured to exert a force toward the object when the pulling element experience an upward force.

There can be one slanting interface 477, for example, as shown in FIG. 4B, between a pulling element 435 and a jaw support 447. The interface 478 between the jaw 466 and the pulling element 435 can be a non-slanting surface, such as a vertical surface. Other configurations can be used, such as the surface 478 can be slanted either way (same as the slanting surface 471 or can be tilted the opposite way, as long as the combination of the two surfaces is configured to move the jaw toward the object when the pulling element moves up). Alternatively, the slanting surface 477 can be tilted oppositely or can be vertical.

In some embodiments, the components of the clamping devices 200 and 205, such as the jaw supports 242, 247 and/or 267, the jaws 241, 261, 246, and/or 267, the clamp bars 250 and/or 255, can include a metal core embedded in a different material. The construction of the components using metal cores can be simpler and more cost effective while meeting the requirements of strength, hardness, durability and reliability.

In operation, the object is first clamped between the jaws 461 and 441 of the clamping device. Optional locking mechanisms can be engaged to secure the jaws to the clamp bar. If the jaw assemblies are movable jaw assemblies with locking mechanisms, the locking mechanism can be disengaged, so that the movable jaw assembly is free to move along the clamp bar. The movable jaw assembly can be moving away from the opposite jaw assembly to enlarge the opening between the two jaws. Once the opening is large enough to accommodate the object, the object can be placed between the jaws. The movable jaw assembly can then be moving toward the object so that the object is in contact with the jaws, or so that there is a minimum gap between the object and the jaws. The movable jaw assembly then can be secured to the clamp bar, for example, by engaging the locking mechanism.

There can be a gap 422 between the object and the jaws, if the locking mechanism is a discrete locking mechanism, e.g., the locking mechanism can secure the movable jaw assembly to the clamp bar at discrete locations, and the engagable locations for the current object do not allow the object to be in contact. The location to engage the locking mechanism can be selected to ensure a minimum gap between the object and the jaws, meaning the total gap between the object and the first jaw and between the object and the second jaw is smaller than the distance between two successive locking locations of the locking mechanism.

After placing the object between the jaws and locking the jaw assemblies, the pulling element can be pulled up. For example, the pulling element can be coupled to a hoist, and the hoist can move upward. The upward movement 423 of the pulling element can push the jaw 441 toward the object, closing the gap 422 until the jaw 441 is in contact with the object. A slow upward pulling of the pulling element can be applied when the jaws are not yet in contact with the object, so that the object does not escape the clamping element.

After the jaws clamp on the object, the pulling element, e.g., the hoist, can be further pulled up to lift the object. The hoist then can move and transfer the object to a new location.

Additional advantages of the clamping device having a pulling element include that the jaw can be fixed in location with respect to the object, meaning the pulling element can move to press on the jaw without the need to move the jaw. A further advantage of the clamping device having a pulling element is a high transfer coefficient between the upward force of the pulling element and the sideward force of the jaw on the object.

In some embodiments, in a jaw assembly, the jaw and the jaw support can be flexibly coupled, e.g., there can be limited movements of the jaw relative to the jaw support. For example, the jaw can include hollow spaces, such as through holes. One or more rods or bars can pass through the hollow spaces, which constrain the movements of the jaw. The hollow spaces can be larger than the rods or bars, e.g., larger than a cross section of the rods or bars, thus the jaw can move within the constraints of the rods and bars. For example, the jaw can slide in a direction along the rods or bars. With the hollow spaces larger than the rods or bars, the jaw can also move in a direction perpendicular to the direction along the rods or bars. The rods or bars can be a part of the clamp bar, e.g., the connection element, meaning the rods and bars can be secured at both ends to the jaw support if the jaw assembly includes a jaw and a jaw support. The clamp bar can include additional rods or bars.

In addition, by shaping the hollow spaces with respect to the rods or bars, the jaw can be further constrained to move in linear directions instead of moving in a plane perpendicular to the rods or bars. For example, the hollow spaces can include elongated holes along up and down directions. The elongated hollow spaces thus can allow the rods or bars to move within the hollow spaces in the up and down directions. The elongated holes can form minimum gaps with the rods or bars in horizontal directions perpendicular to the up/down directions and to the directions along the rods or bars. Thus the rods or bars is constrained, e.g., not able to move in the horizontal directions perpendicular to the up/down directions and to the directions along the rods or bars. With the elongated hollow spaces in the jaw, the jaw can move in upward direction, downward directions, direction toward the jaw support, and direction away from the jaw support.

FIG. 4B shows a clamping device 405, including a clamp bar 455, a jaw assembly including a first jaw 466, and a jaw assembly including a second jaw 446 and a jaw support 447. The first jaw 466 can be secured to the clamp bar 455. A pulling element 435 can be disposed between the second jaw 446 and the jaw support 447. The pulling element can be movably coupled to the clamp bar, e.g., coupled to the clamp bar but can move in up and down directions.

The pulling element can form a slanting interface 477 with the jaw support 447, and a vertical plane interface 478 with the second jaw 446.

The jaw 446 can be flexibly coupled to the jaw support 447, e.g., the second jaw can be coupled to the jaw support with limited movements and/or with constrained movements. For example, the second jaw 446 can be coupled to the jaw support 447 through one or more springs 448. The spring coupling can allow the jaw to move in all directions with respect to the jaw support, such as moving in up or down directions 428, or moving in toward or away directions 427 relative to the jaw support. However, the spring coupling can constrain the second jaw to have limited movements. For example, the springs can extend when the second jaw moves away from the jaw support, but the second jaw cannot move too far away from the jaw support, or the springs 448 would break. Similarly, the springs can contract when the second jaw moves toward the jaw support. The springs can bend when the second jaw moves up or down relative to the jaw support. An advantage of the spring coupling is that when the clamping device is at rest, e.g., when the pulling element is at a lowest position, the springs can pull the second jaw back toward the jaw support. This can allow the clamping device to freely approach object for clamping, since the jaws are at positions that maximize the opening distance between the two jaws.

In some embodiments, a pulling element lock can be included to secure the pulling element to a rest position, e.g., a lowest position or a position that allows the second jaw to be closest to the jaw support. Together with the spring coupling, locking the pulling element can pull the jaws back to positions with largest jaw opening.

In some embodiments, there can be a limiter to restrict the movements of the jaw with respect to the jaw support. The limiter can be coupled to the jaw support, and include a stopper to prevent the jaw from moving pass a certain position. The limiter can be coupled to other components, such as coupled to the clamp bar, or to any component that is fixed coupled to the jaw support. For example, the jaw support 447 can include a limiter 423, which can constrain the second jaw 446 from moving down too far, e.g., stopping at the limiter limit 424. Alternatively, the rods or bars passing through the hollow spaces in the second jaw can also act as limiters for the second jaw, limiting the movements of the second jaw in directions perpendicular to the directions along the rods or bars.

In some embodiments, the slanting interfaces can have low friction, e.g., lower than the friction at the interfaces between the jaws and the object. For example, the friction at the interfaces between the jaws and the object can be increased by adding a high friction layer, such as a rubber pad, to the jaw external surfaces. Alternatively, the friction at the slanting interface can be reduced by using rolling friction, e.g., the pulling element can include rollers, which roll on a surface of the jaw, providing a rolling friction at the slanting interface between the pulling element and the jaw; or the rollers can roll on a surface of the jaw support, providing a rolling friction at the slanting interface between the pulling element and the jaw support. Inversely, the jaw or the jaw support can include rollers for rolling on surfaces of the pulling element.

FIG. 5A-5B illustrate flow charts for forming and operating a three-part clamping device according to some embodiments. In FIG. 5A, operation 500 forms a clamping device, wherein the clamping device comprises a first jaw fixedly coupled to a clamp bar, and a second jaw assembly fixedly coupled to the clamp bar, wherein the second jaw assembly comprises a second jaw and a jaw support, together with a pulling element disposed between the second jaw and the jaw support, wherein there is at least a slanting interface coupling between the pulling element and the second jaw or between the pulling element and the jaw support, wherein the slanting interface is configured so that when the pulling element moves up, the second jaw moves toward an object for keeping the object in place.

In some embodiments, the components of the clamping device, such as the jaw supports, the jaws, and the clamp bars, can include a metal core embedded in a different material. The construction of the components using metal cores can be simpler and more cost effective while meeting the requirements of strength, hardness, durability and reliability.

In FIG. 5B, operation 520 selects a clamping device suitable for clamping on an object, wherein the clamping device comprises two jaw assemblies, wherein a first jaw assembly comprises a first jaw, wherein a second jaw assembly comprises a second jaw and a jaw support facing each other, wherein a pulling element is disposed between the second jaw and the jaw support, wherein there is at least a slanting interface coupling between the pulling element and the second jaw or between the pulling element and the jaw support.

The clamping device can be selected so that the object can be placed between the jaws of the clamping device, e.g., the opening distance between the jaws is larger than a dimension of the object, especially the dimension for clamping.

Operation 530 places the object between the first jaw and the second jaw.

Operation 540 lifts the pulling element which moves the second jaw toward the object, since the slanting interface is configured so that when the pulling element moves up, the second jaw moves toward the object. The pulling element can be lifted slowly, to ensure that the object is still placed on the ground when there is a gap between the object and the jaws. After the jaws contact the object, the pulling element can be further lifted to lift the object from the ground. The pulling force, and/or the weight of the object, can be converted to a clamping force of the jaws against the object, keeping the object within the grip of the clamping device.

In some embodiments, a clamping device can be formed by forming a clamp bar, e.g., a connection element for the two jaw assemblies, forming a first jaw, and then coupling the first jaw with the clamp bar. A second jaw can be formed, which includes a jaw support and a second jaw. The jaw support can include a metal core, which can be configured to provide a structural support for the clamping device. The jaw support can include a jaw support body surrounding the metal core and protruding from the metal core. The jaw support body can include a material different from the material of the metal core. The jaw support body can include a hollow portion mating with the second jaw as a lid. The hollow portion can include a dimension between the second jaw and the jaw support that is larger at a location farther from the clamp bar than at a location nearer the clamp bar. The hollow portion can include a slanting surface. The jaw support can be coupled with the clamp bar. The second jaw can be coupled with the jaw support by a set of springs.

In some embodiments, a pulling element can be formed, which can include rollers. The rollers can be placed in a hollow portion between the jaw support and the second jaw. Some rollers can be configured to roll on a surface of the jaw support. Some rollers can be configured to roll on a surface of the second jaw.

In some embodiments, one or more slanting interfaces of the clamping device can have a low friction, such as a low coefficient of friction. The friction of the slanting interfaces can be lower than that of the gripping interfaces, e.g., the interfaces between the object and the jaws gripping the object.

The lower friction can be achieved by increasing the friction of the gripping interfaces or gripping surfaces. For example, the jaw outer surfaces, e.g., the surfaces of the jaws to be in contact with the object, can have a high friction layer disposed thereon. For example, a rubber layer can be coupled to the jaw, to increase the friction of the jaw with the object, which can prevent the object from slipping from the jaw during the handling of the object.

The lower friction can be achieved by decreasing the friction of the slanting interfaces. For example, the slanting interfaces, e.g., the mating surfaces between two parts in the jaw assembly, such as the interface between the jaw and the pulling element, or the interface between the pulling element and the jaw support, can have smoother surfaces, such as having a grease coating, or low contact area surfaces, such as rolling frictions from balls or rollers. The low friction interfaces can make it easier for the pulling element to move with respect to the jaw while the jaws grip the object.

For example, the pulling element can have rolling balls on one or two surfaces, e.g., on one surface facing the second jaw, or on one surface facing the jaw support, or on both surfaces. Alternatively, the second jaw can have rolling balls on the surface facing the pulling element, or the jaw support can have rolling balls on the surface facing the pulling element.

Figure 6A:
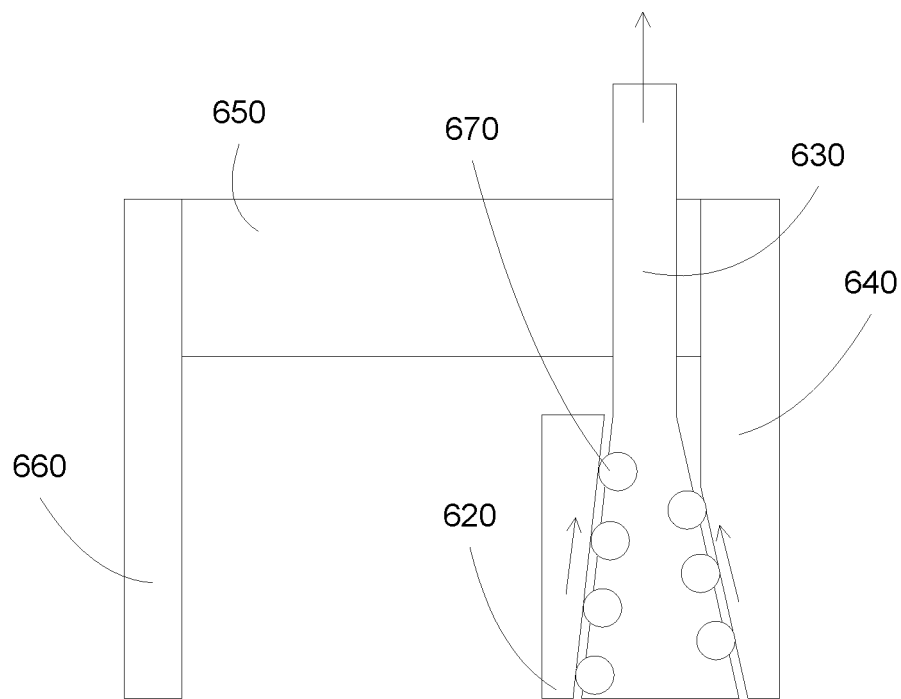
FIGS. 6A-6B illustrate configurations for clamping devices with rolling frictions according to some embodiments.
Figure 6B:
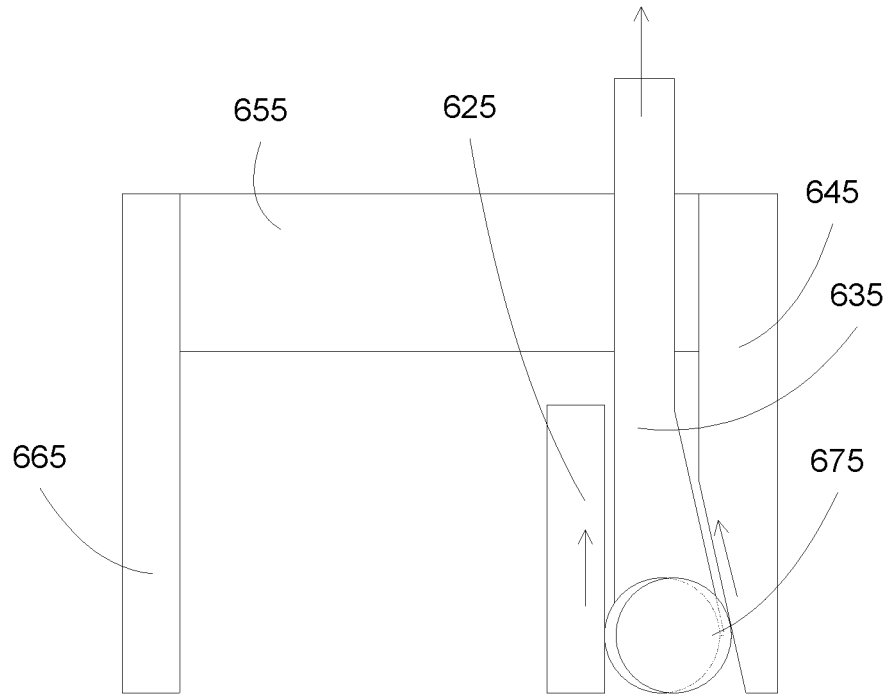

FIGS. 6A-6B illustrate configurations for clamping devices with rolling frictions according to some embodiments. In FIG. 6A, a clamping device can include a first jaw 660 fixedly coupled to a clamp bar 650; a movable and fixable (e.g., lockable) jaw support assembly that includes a second jaw 620, a jaw support 640; and a pulling element 630 disposed between the second jaw and the jaw support. The interfaces between the pulling element and the second jaw and between the pulling element and the jaw support can include slanting surfaces, for translating a vertical movement of the pulling element to a horizontal movement of the second jaw.

The pulling element can have one or more rolling balls or rollers 670 on one or both interfaces, meaning on a surface facing the second jaw and/or on a surface facing the jaw support. The rolling balls or rollers can provide a low friction interface between the pulling element and the second jaw and/or the jaw support.

In FIG. 6B, a clamping device can include a first jaw 665 fixedly coupled to a clamp bar 655, and a movable and fixable (e.g., lockable) jaw support assembly that includes a second jaw 625, a jaw support 645, and a pulling element 635 disposed between the second jaw and the jaw support. The interface between the pulling element and the second jaw can be a substantially vertical surface. The interface between the pulling element and the jaw support can include a slanting surface, for translating a vertical movement of the pulling element to a horizontal movement of the second jaw. Other interface configurations can be included for different surface configurations.

The pulling element can have rolling balls or rollers 675 on one or both interfaces, meaning on a surface facing the second jaw and/or on a surface facing the jaw support. One set of rolling balls or rollers can be used. As shown, the rolling balls or rollers have offset centers, so that the left rolling balls or rollers can roll on the surface of the jaw 625 and the right rolling balls or rollers can roll on the surface of the jaw support 645.

In some embodiments, the rolling balls or roller can have centers of rotation aligned in a horizontal line. Recesses in the jaw and/or in the jaw support can be included, so that the rolling balls or roller only contact the jaw or the jaw support. For example, a roller can contact the jaw and the surface of the jaw support facing the roller can be recessed, so that the roller does not contact the jaw support.

FIGS. 7A-7B illustrate flow charts for forming and operating clamping devices with rolling frictions according to some embodiments. In FIG. 7A, operation 700 forms a clamping device, wherein the clamping device comprises a first jaw fixedly coupled to a clamp bar, and a second jaw assembly movably and fixedly coupled to the clamp bar, wherein the second jaw assembly comprises at least two components coupled through a slanting surface interface, wherein the slanting surface is configured so that when one component moves down, it also moves toward an object disposed between the first jaw and the second jaw assembly, wherein the slanting surface comprises a rolling friction.

In some embodiments, the second jaw assembly comprises a second jaw and a jaw support, together with a pulling element disposed between the second jaw and the jaw support, wherein there is at least a slanting surface interface between the pulling element and the second jaw or between the pulling element and the jaw support, wherein the slanting interface is configured so that when the pulling element moves up, the second jaw moves toward an object for keeping the object in place, wherein the slanting surface comprises a rolling friction.

In FIG. 7B, operation 720 selects a clamping device suitable for clamping on an object, wherein the clamping device comprises two jaw assemblies, wherein a first jaw assembly comprises a first jaw, wherein a second jaw assembly comprises a second jaw and a jaw support facing each other, wherein a pulling element is disposed between the second jaw and the jaw support, wherein there is at least a slanting interface coupling between the pulling element and the second jaw or between the pulling element and the jaw support, wherein the slanting surface comprises a rolling friction.

The clamping device can be selected so that the object can be placed between the jaws of the clamping device, e.g., the opening distance between the jaws is larger than a dimension of the object, especially the dimension for clamping.

Operation 730 places the object between the first jaw and the second jaw.

Operation 740 lifts the pulling element which moves the second jaw toward the object, since the slanting surface interface comprises a rolling friction, the second jaw moves toward the object when the pulling element moves up.

In some embodiments, the components of the clamping device, such as the jaw support, can include a metal core, which can be configured to provide a structural support for the clamping device. The jaw support can include a jaw support body surrounding the metal core and protruding from the metal core. The jaw support body can include a material different from the material of the metal core.

In some embodiments, a locking mechanism can be formed to secure a movable jaw assembly to the clamp bar.

The locking mechanism can be used to secure the jaw or the jaw support of a movable jaw assembly to the clamp bar.

The jaw assembly can be fixedly coupled to the clamp bar, e.g., the jaw assembly cannot be moved. For example, a jaw or a jaw support of the fixed jaw assembly can be secured to the clamp bar, for example, with bolts.

The jaw assembly can be movable along the clamp bar to accommodate different sizes of the objects. For example, the jaw or the jaw support of the jaw assembly can have a hollow portion for the clamp bar to pass through.

The locking mechanism can secure the movable jaw assembly to the clamp bar. The locking mechanism can be continuous, meaning the jaw assembly can be moved and secured, e.g. locked, along the clamp bar until the object is placed between the two jaws, meaning there is zero or a very little gap between the object and the jaws.

The continuous locking mechanism can include a screw type, meaning a lead screw can be used to move the jaw support assembly along the clamp bar. A lock, such as a screw or a clamp to lock the lead screw or to lock the handle that turn the lead screw.

The locking mechanism can be discrete, meaning the jaw assembly can be moved continuously along the clamp bar, but can only be secured, e.g. locked, at predetermined locations along the clamp bar. Thus the jaw assembly can move from a lockable location to another lockable location, until there is minimum gaps between the object and the jaws, meaning the next lockable location would not be large enough to accommodate the object.

The discrete locking mechanism can include a peg fitting into one of multiple holes, or a cyclic pattern bar (such as a rack bar, or a bar having repeat triangle shapes)

A cyclic pattern bar and a mating pattern component can be used for securing the jaw support assembly to the clamp bar at discrete locations, meaning at locations that the pattern of the patent component fitted to one of the multiple patterns of the cyclic pattern bar. The cyclic pattern bar can include a rack bar, a tooth bar, a cog bar, or a linear gear bar, which can be fixedly coupled to the clamp bar. For example, the pattern can be a triangle. The pattern component can have a recess with the shape of the triangle. The cyclic pattern bar can have multiple mating triangles, e.g., triangles that match with the triangle of the pattern component, such as with the base of the triangles at the base of the cyclic pattern bar, and the tip of the triangle protruded from the base. Alternatively, the pattern component can have one or more triangles protruded from the pattern component. The cyclic pattern bar can have multiple recesses of triangle shapes. Thus the jaw support can be locked onto various locations of the cyclic pattern bar. For example, the jaw support can be released from the cyclic pattern bar, such as by pulling the jaw support assembly in a downward direction for disengaging with the cyclic pattern bar. In this disengaged position, the released jaw support assembly can be moved along the clamp bar (and the cyclic pattern bar), to adjust the size of the opening between the first jaw and the second jaw, to accommodate different object sizes.

At the appropriate opening size, the jaw support assembly can be engaged, such as by pushing up the mating pattern component, thus the pattern component is engaged with the cyclic pattern bar In this engaged position, the jaw assembly can be locked to the clamp bar.

In some embodiments, one way pattern locking can be used, meaning the jaw support assembly can be moved along the clamp bar to narrow the opening between the two jaws, but cannot be moved in the opposite direction to enlarge the opening. For example, the triangle pattern can have an acute angle in one side and an obtuse angle in another side. The asymmetric triangle can prevent movement against the acute side while allowing movement against the obtuse side.

In some embodiments, the pattern can be asymmetric, for example, so that the jaw assembly can be easier to move toward the object, while it is much more difficult to move back away from the object. This will provide a further security against the losing the clamping action of the clamping device.

In some embodiments, the locking mechanism can include a cyclic pattern configuration, such as a series of holes on the clamp bar. The locking mechanism can include a mating pattern component, such as a pin, a rod or a bar which can fit into the holes. The mating pattern component can be movably coupled to the jaw assembly, such as to the jaw support. For example, the mating pattern component, e.g., the pin, can be movable, such as pulling back for disengaging with the clamp bar, e.g., out of the hole. In this disengaged position, the jaw assembly can be free to move along the clamp bar. The mating pattern component, e.g., the pin, can be pushed up, entering one hole in the holes in the clamp bar. In this engaged position, the jaw assembly can be locked to the clamp bar.

The jaw support can include a pattern component, which is a peg, which can be mated to various positions of a cyclic pattern bar, which includes multiple holes. As shown, the mating is in the shape of pegs and holes, e.g., the cyclic pattern bar can have multiple holes, and the pattern component can have a peg, such as a round peg. Thus the jaw support can be locked onto various locations of the cyclic pattern bar. For example, the jaw component can be released from the cyclic pattern bar, such as by pulling the peg in a generally downward (or sideway) direction. The released jaw support assembly can be moved along the clamp bar (and the cyclic pattern bar), to adjust the size of the opening between the first jaw and the second jaw, to accommodate different object sizes. At the appropriate opening size, the jaw support assembly can be engaged, meaning the pattern component is engaged with the cyclic pattern bar, to lock the jaw support assembly in place.

FIGS. 8A-8D illustrate a clamping device according to some embodiments. FIG. 8A shows a cross section of a clamping device, which can include a first jaw 860 coupled to a clamp bar, which includes connection bars 850 and 855. The first jaw can include a rubber pad 865 to increase a friction with objects to be clamped. The first jaw can be fixedly coupled to the clamp bar. In some embodiments, the first jaw can be removably coupled to the clamp bar, together with a locking mechanism for securing the first jaw to the clamp bar. Alternatively, the first jaw can be a part of a first jaw assembly, which can also include a first jaw support. The first jaw of the first jaw support can be coupled to the clamp bar, such as fixedly coupled or removably coupled with a locking mechanism.

The clamping device can include a second jaw assembly, which can be coupled to the clamp bar. The second jaw assembly can include a second jaw 841 disposed opposite the first jaw. The second jaw can include a rubber pad 845 to increase a friction with objects to be clamped. The second jaw assembly can include a jaw support 842. The second jaw assembly can be fixedly or movably coupled to the clamp bar. For a movable jaw assembly, the movable jaw assembly can slide along the clamp bar for movably coupled to the clamp bar. As shown, the first jaw is fixedly coupled to the clamp bar, and the second jaw assembly is also fixedly coupled to the clamp bar. Other configurations can be used, such as the first jaw is movably coupled to the clamp bar, and the second jaw assembly is fixedly coupled to the clamp bar. Alternatively, the first jaw and the second jaw assembly can both be movably coupled to the clamp bar. A jaw or a jaw assembly, if movably coupled to the clamp bar, can include a locking mechanism for securing the jaw or the jaw assembly to the clamp bar.

There can be flexible couplings between the second jaw and the jaw support. The flexible couplings can allow the second jaw to move in multiple directions with respect to the jaw support, such as down and away from the jaw support. The flexible couplings can include springs 875 (FIG. 8D) having two ends fixedly coupled to the second jaw 841 and the jaw support 842. The springs can bend and flex, allowing the second jaw to move relative to the jaw support.

In addition, end point limits can be included to prevent the second jaw from moving too far from the jaw support. The second jaw can be blocked in the horizontal directions by the jaw support and the object, so there can be no need for end point limits in the horizontal directions. Support bars or connection bars 855 (FIG. 8C) can be coupled to the clamp bar and passing through the second jaw with large openings 856. Thus the second jaw can be freely moved within the confinement of the openings. For example, the second jaw cannot move too far down, since the support bar can prevent such as movement. The openings 856 can be configured to limit the movements of the second jaw. For example, the openings can be close or touching the support bars in horizontal directions, e.g., the openings can have an elongated shape in the up and down directions. The elongated openings can prevent the second jaw from moving in directions parallel to the jaw support, e.g., perpendicular to the up/down directions and perpendicular to the directions of toward to/away from the jaw support.

The clamping device can include a pulling element 830, which can be configured to be pulled on for lifting the clamped object. The pulling element can be disposed between the second jaw and the jaw support. The pulling element can also be disposed between the clamp bar, e.g., between the multiple connection bars 850 and 855 (FIG. 8B). The pulling element can be freely move in an up direction. In the down direction, the jaw support can block the pulling element. In the horizontal directions toward to/away from the jaw support, the pulling element can freely move in between the connection bars, and can be constraint by the second jaw and the jaw support. The pulling element can be constrained in directions parallel to the jaw support, e.g., in directions perpendicular to the up/down directions and also perpendicular to directions toward to/away from the jaw support, for example, by having a hollow space that the clamp bar can pass through or by passing the pulling element between the clamp bar (as shown in FIG. 8B). The hollow space can have an elongated shape along the up/down directions, and a tight fit with the clamp bar in directions parallel to the jaw support. Similar to the support bar that limits the movements of the second jaw, the elongated shape of the hollow space in the pulling element can limit the movements of the pulling element in directions parallel to the jaw support.

The pulling element can be configured to exert a clamping force on the object when being pulled, for example, through a slanting surface of the jaw support. For example, the pulling element can include a set of rollers 832, which can provide rolling friction with the second jaw and the jaw support. Thus there can be minimum friction when the pulling element is pulled up, pushing the second jaw away from the jaw support due to the slanting surface of the jaw support. The set of rollers can include first rollers contacting the second jaw surface, and second rollers contacting the jaw support surface. There can be recesses at the jaw support at location where the first rollers face the jaw support, so that the first rollers only contact the second jaw and not the jaw support. There can be recesses at the second jaw at location where the second rollers face the second jaw, so that the second rollers only contact the jaw support and not the second jaw.

The clamping device can include a locking mechanism 835, which can be coupled to either the clamp bar or to the second jaw assembly to prevent the pulling element from being pulled up. The pulling element can be constrained from going down by the jaw support, thus the locking mechanism, when engaged, when secure the pulling element to the clamp bar. The pulling element can be locked to a bottommost location, which can provide that the second jaw is closest to the jaw support. The springs can assist in pulling the second jaw toward the jaw support, which can form a largest opening between the two jaws of the clamping device.

In operation, the locking mechanism 835, e.g., the locking mechanism that locks the pulling element to the clamp bar, can be unlocked, so the pulling element can be pulled up. Due to the rollers, the pulling element can easily moved against the second jaw and the jaw support. Since a dimension of the rollers is larger than the distances between the second jaw and the jaw support at upper locations (e.g., at locations above the resting location or the locked location of the pulling element), the moving up action of the pulling bar (and the rollers) can force the second jaw to move away from the jaw support. The springs can be flex, to accommodate the movement of the second jaw away from the jaw support. The second jaw can move away from the jaw support, until the second jaw is in contact with the object. If there is a gap between the object and the first jaw, the second jaw can keep moving to narrow that gap. The second jaw then continue to move until the first and second jaws all contact the object.

In some embodiments, the second jaw can move down, in addition to moving away from the jaw support, due to gravity (FIG. 8D). The springs can bend to accommodate the downward movement of the second jaw. The support bars 855 can prevent the second jaw from going down too far, e.g., the support bars can stop the second jaw movement when the support bars contact the upper portions of the hollow spaces 856 of the second jaw.

In some embodiments, the present invention discloses methods, and clamping devices formed from the methods, for cost effective constructions of clamping devices with high strength, hardness, durability, and reliability. The clamping devices can include components having a metal core embedded in a body of different material, such as a softer and easier to form material. For example, the metal core can include a steel or stainless steel frame, which can be designed for sustain the high forces and high stresses of the clamping devices in handling heavy objects. The body can include a polymer or aluminum, which can be design for cosmetic, protection, and low forces or low stresses.

The metal core can be constructed of welded panels, after an analysis of the clamping device operations to determine the areas of high forces and stresses. The body can be cast, using the metal core disposed therein.

FIGS. 9A-9C illustrate a clamping device with metal cores according to some embodiments. In FIG. 9A, a clamping device frame 900 can include two jaw assemblies 960 and 940 coupled to a clamp bar 950. The clamp bar 950 can include multiple connection bars 951 and 952. The jaw assembly 960 can include a jaw 961, which can be fixedly coupled to the clamp bar. The jaw assembly 940 can include a jaw 941 and a jaw support 942. The jaw support can be fixedly coupled to the clamp bar. The jaw 941 can be flexibly coupled to the jaw support, for example, through a set of springs 943.

A pulling element 930 can include rollers 932 coupled to a handle 931. The rollers can be disposed between the jaw 941 and the jaw support 942. Some rollers of the rollers 932 can be configured to roll on a surface 910 of the jaw support 942. Some rollers of the rollers 932 can be configured to roll on a surface 911 of the jaw 941. Due to the low rolling friction of the rollers 932 (as compared to the sliding friction between two flat surfaces), the pulling element 930 can easily move up and down, e.g., toward the clamp bar 950 and away from the clamp bar 950. The pulling element can also be constrained by the clamp bar, in addition to the jaw and the jaw support, thus the pulling element can typically move in the up/down directions, e.g., with some small variation movements along the up/down directions.

The jaw support 942 can include a slanting surface 910. The slanting surface 910 can be configured to translate a lifting force acting on the pulling element 930 to a pushing force on the jaw 941, with the pushing force in a direction toward the other jaw 961. Thus the lifting action of the pulling element can assist in clamping an object disposed between the jaws 941 and 961.

The slanting surface can be configured so that a dimension 915 between the jaw 941 and the jaw support 942 at a location farther from the clamp bar 950 is larger than a dimension 916 between the jaw 941 and the jaw support 942 at a location nearer the clamp bar 950. In that configuration, when the rollers 932 move up, e.g., moving toward the clamp bar 950, since the distance 916 between the jaw and the jaw support is smaller (e.g., as compared to the distance 915 at the original location of the rollers), the jaw 941 can be pushed away from the jaw support 942. If there is no obstacle, e.g., no clamped object, the jaw 941 can move in a direction toward the opposite jaw 961. If there is an object clamped between the jaws 941 and 961, the pulling action of the pulling element, e.g., the moving up action of the rollers, can be translated to a pushing force for clamping the object.

The jaw 941 and the jaw support 942 can form a hollow portion 917, e.g., a space between the jaw and the jaw support. The hollow portion can be configured so that when the pulling element moves up, for example, by rolling the rollers against the surfaces of the jaw and the jaw support, the jaw and the jaw support can experience forces pushing them apart. The rollers can push on the jaw to move the jaw away from the jaw support. Or a force can be generated on the jaw or applied to the jaw to separate the jaw from the jaw support.

FIGS. 9B and 9C show a cross section view and a perspective view of a clamping device 905, which corresponded to the clamping device frame 900. For example, the clamping device frame 900, e.g., the jaw assembly 960, the jaw assembly 940, the pulling element 930, and the clamp bar 950, can form metal cores of the corresponding components, e.g., the jaw assembly 965, the jaw assembly 945, the pulling element 935, and the clamp bar 955, of the clamping device 905. For example, the jaw support 942 can form the metal core for a jaw support 947, which can further include a body. The metal core, e.g., the jaw support 942, can provide structure support for the jaw support 947, and the body can form protective cover, plus fixtures for attaching other components of the clamping device 905, such as fixtures for attaching a locking mechanism for securing the pulling element to the clamp bar, or fixtures to attach the springs, for fixtures to attach the clamp bar.

Figure 10A:
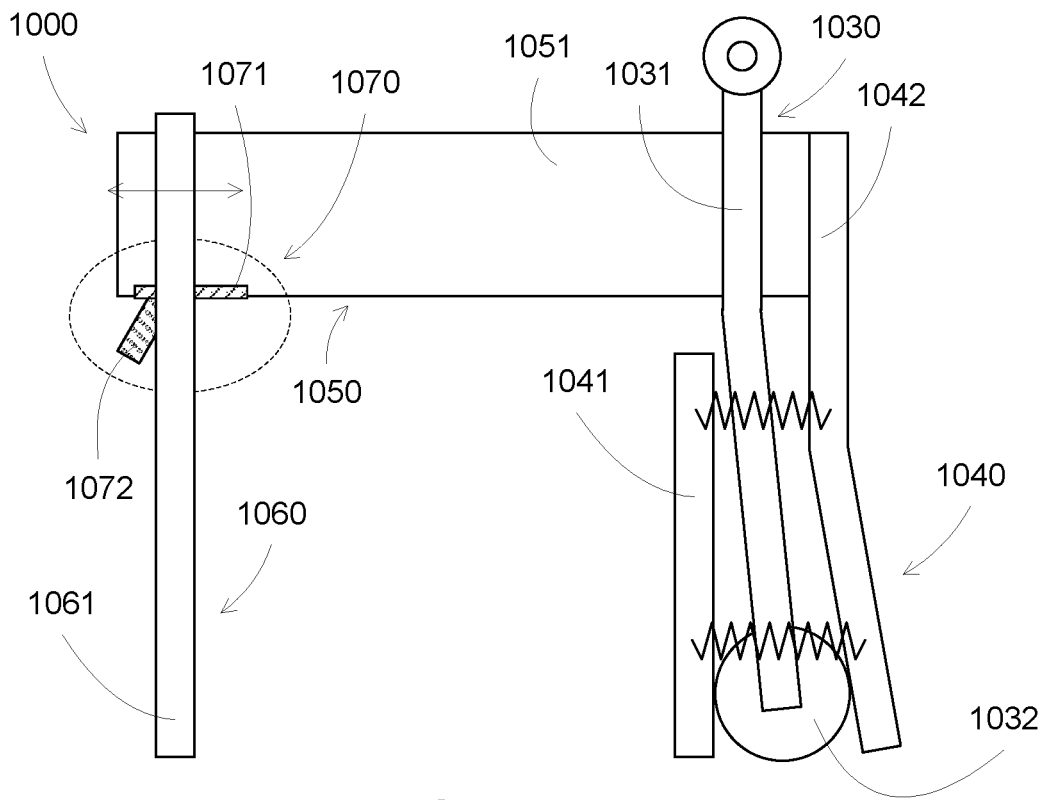
FIGS. 10A and 10B illustrate configurations for clamping device frames according to some embodiments.
Figure 10B:
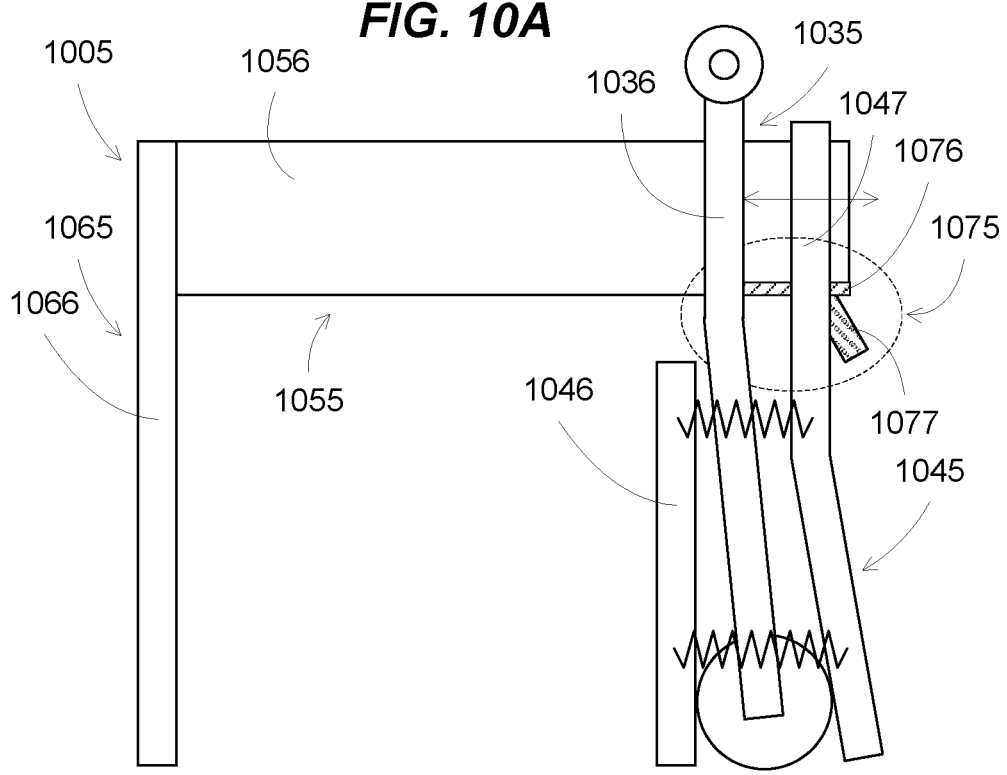

FIGS. 10A and 10B illustrate configurations for clamping device frames according to some embodiments. In FIG. 10A, a clamping device frame 1000 can include two jaw assemblies 1060 and 1040 coupled to a clamp bar 1050. The clamp bar 1050 can include one connection bar 1051. The jaw assembly 1060 can include a jaw 1061, which can be movably coupled to the clamp bar. The jaw assembly 1040 can include a jaw 1041 and a jaw support 1042. The jaw support can be fixedly coupled to the clamp bar. The jaw 1041 can be flexibly coupled to the jaw support, for example, through a set of springs. A pulling element 1030 can include rollers 1032 coupled to a handle 1031. The rollers can be disposed between the jaw 1041 and the jaw support 1042.

A locking mechanism 1070 can be included to secure the movable jaw assembly 1060 to the clamp bar 1050. For example, the locking mechanism 1060 can include a rack bar 1071 coupled to the clamp bar. A mating component 1072 can be mated at discrete locations with the rack bar. The mating component 1072 can be coupled to the jaw 1061, and thus can secure the jaw 1061 with the clamp bar when the mating component is engaged with the rack bar.

In FIG. 10B, a clamping device frame 1005 can include two jaw assemblies 1065 and 1045 coupled to a clamp bar 1055. The clamp bar 1055 can include one connection bar 1055. The jaw assembly 1065 can include a jaw 1066, which can be fixedly coupled to the clamp bar. The jaw assembly 1045 can include a jaw 1046 and a jaw support 1047. The jaw support can be movably coupled to the clamp bar. The jaw 1046 can be flexibly coupled to the jaw support, for example, through a set of springs. A pulling element 1035 can include rollers 1037 coupled to a handle 1036. The rollers can be disposed between the jaw 1046 and the jaw support 1047.

A locking mechanism 1075 can be included to secure the movable jaw assembly 1040 to the clamp bar 1055. For example, the locking mechanism 1065 can include a rack bar 1076 coupled to the clamp bar. A mating component 1077 can be mated at discrete locations with the rack bar. The mating component 1077 can be coupled to the jaw support 1047, and thus can secure the jaw support 1047 with the clamp bar when the mating component is engaged with the rack bar.

In some embodiments, the present invention discloses methods to form clamping devices and components of the clamping devices, including forming metal cores embedded in body of different materials. The metal core can be configured to sustain the high forces and high stresses acting on the clamping devices, leaving the body to handle the low forces and low stresses. The metal core can include reinforced components to handle the high forces and stresses. Also, the metal core can include other features and fixtures, such as having through holes or tap holes. The body can include protruded portions, such as fixtures for attaching a locking mechanism, or end portion for stopping the pulling element. The body can include though holes, for example, through holes corresponded to through holes of the metal core. The body can include exposed portions of the metal core.

FIGS. 11A-11E illustrate configurations for metal cores and bodies of a component of a clamping device according to some embodiments. In FIG. 11A, the body can include protrusions from the metal core and can also expose a portion of the metal core, e.g., the body not covering some parts of the metal core. A component 1130 can include a metal core 1110 totally embedded in a body 1120.

A component 1131 can include a body 1121 partially cover the metal core, e.g., leaving a portion 1150 of the metal core exposed, e.g., not covered by the body 1121. The exposed portion 1150 can allow other components to directly contact the metal core, instead of contacting the body 1121. With this configuration, high forces can be applied directly to the metal core, instead of to the softer material of the body 1121.

The body 1121 can have protruded portions 1140 and 1141. For example, the protrusion 1140 can include fixtures for coupling with other component, such as a ring for connecting to a latch, e.g., a locking mechanism. The protrusion 1141 can include an extended portion, which can be used for support other components with low forces and stresses.

In FIG. 11B, the metal core 1111 can have reinforced elements 1160, for example, to ensure a flatness of the metal core under high forces. A component 1132 can include a body 1122 covering all portion of the metal core, including the reinforced element. A component 1133 can include a body 1123 having a different body coverage. A component 1134 can include a body 1124 exposing a portion 1151 of the metal core, for example, so that a high force can contact the metal core directly.

In FIG. 11C, the metal core 1112 can have a reinforced element 1161 that can leave a gap 1170 with the main portion. A body 1125 can cover the metal core, and also filling the gap with the body material 1171. The gap can secure the body with the metal core, e.g., providing a physical glue to keep the body adhering to the metal core.

The secured gap can include a hole 1172 in a metal core 1113, which after filled with the body material 1173, can secure together two side portions of the body 1126.

The secured gap can include multiple holes 1174 in a metal core 1114, which after filled with the body material 1175, can secure together two side portions of the body 1127, especially at areas 1152 that expose the metal core.

In FIG. 11D, the metal core 1115 can have a through hole 1176. A body 1128 can cover the metal core, but leaving another through hole 1177 connecting with the through hole 1176, for example, to provide a through hole for the component.

In FIG. 11E, the body 1148 can cover a metal core 1116, and can have a protrusion 1180 (or a recess, not shown). The protrusion is formed of the body material, and thus can be softer and flexible. The protrusion can include a fixture to couple to other components, such as by snap fitting. For example, the protrusion can include two flexible prongs with a latch end. Thus a mated fixture can be pressed on the protrusion 1180, which can press the two prongs together to pass through the latch ends. after passing the latch ends, the two prongs can return to their original positions, securing the mated fixture with the body 1148.

FIG. 12 illustrates a flow chart for forming a clamping device according to some embodiments. A component of the clamping device can include a metal core embedded in a body. Operation 1200 forms the metal core. The metal core can include a structural element of the component of the clamping device. In addition, the metal core can optionally include multiple panels welded together, for example, to have uniform strength and hardness due to the stocked panels.

The metal core can include a hollow portion. The hollow portion can accept another component passing there through. For example, the hollow portion can include multiple through holes, which can be used to secure the metal core to another component of the clamping device. The hollow portion can be used to improve the adhesion of the body around the metal core. For example, the body can form two coating layers at two sides of the metal core, and the hollow portion can provide a connection between the two coating layers, which can secure the two coating layers together.

The metal core can include a reinforced element, which can be used for strengthening the metal core. For example, the metal core can include a flat panel at which a high force can be applied. The reinforced element can include an additional panel coupled to the flat panel, which can provide additional strength and hardness to the panel.

Operation 1210 forms the body completely or partially surrounding the metal core. The body can form the outer shape of the component, which can provide cosmetic and protective coverage for the clamping device. For example, the body can form a housing for other components, thus can protect the other components from being exposed to the environment.

The body can include a protrusion functioning as an end stop for another component of the clamping device. The end stop can have low stresses, since it is used to stop a movement of the components. The body can include a protrusion functioning as a mounting fixture for a second component. A locking mechanism can be mounted to the body, using the protrusion as a mounting fixture. The body can include a protrusion functioning as a flexible coupling to a component of the clamping device. For example, a cover can be pressed fit with the flexible coupling, shielding an opening of the body.

The body can include an area at which the metal core is exposed, meaning the body can partially cover the metal core. The exposed area of the metal core can be used for sustaining high forces, e.g., high forces applied to the body can be directly applied to the metal core.

The body can include a filling through an hollow portion of the metal core for strengthening an adhesion of the body coverage to the metal core. The body can include a hollow portion corresponded to a through hole in the metal core.

In some embodiments, the body can be cast, for example, by a low pressure casting process, a high pressure casting process, an atmospheric casting process, a lost wax casting process, or any other casting processes. In a casting process, a mold can be formed, then the metal core is placed within the mold. The body material can fill the mold. After the body material is hardened, the component can be removed, which includes the body surrounding the metal core.

FIGS. 13A-13F illustrate a process for casting a component having a body surrounding a metal core according to some embodiments. In FIG. 13A, a first half 1310 of a mold is prepared, including a protruding portion 1311, an exposing portion 1312 for an embedded metal core, and a cover portion 1313 surrounding the metal core. Other portions can be included, such as flexible coupling portions, and through hole portions.

In FIG. 13B, a metal core 1320 is placed in the first half 1310 of the mold. As shown, since the component includes an exposed portion of the metal core, the metal core can contact the mold portion, with the contact portion not covered by the body material in the subsequent casting process. If there is no exposed area, a support element can be included to suspend the metal cover above the mold portion. Alternatively, the support element can include the material of the body, thus can fuse with the body during the casting process. The support element can include a removable material, thus can be removed during the casting process, such as being burned in a high temperature casting process.

In FIG. 13C, a second half 1330 of the mold is mated with the first half 1310. The second half 1330 can include other elements, such as fixtures 1334 for mounting other components, and optional flues 1335 for pouring the body material.

In FIG. 13D, a body material can fill the mold portions, e.g., the mold formed by the first half 1310 and the second half 1330. For example, a liquid or molten polymer (such a plastic) or soft metal (such as aluminum) material can pour in the mold, through the opening and flue portion 1335. Other casting process can be used, such as lost wax casting, high or low pressure casting, or sand casting. The material can form a body of the component, enclosing the metal core. The body can include a protruding portion 1341, corresponded to the protruding portion 1311 in the mold, an exposing portion 1342 exposing the metal core corresponded to the exposing portion 1312, a cover portion 1343 surrounding the metal core, fixtures 1344 corresponded to fixtures 1334, and optional flue portion 1345 corresponded to the flues 1335.

In FIG. 13E, the mold can be removed. In FIG. 13F, the flues can be removed to form the component 1350, including a body surrounding a metal core.

FIG. 14 illustrates a flow chart for forming a component of a clamping device according to some embodiments. Operation 1400 forms a metal core. The metal core can optionally include multiple panels welded together, a hollow portion in the metal core, or a reinforced element for strengthening the metal core.

Operation 1410 places the metal core in a casting mold, wherein the casting mold is configured to provide a body to be used in a clamping device, wherein the metal core is at least partially embedded in the casting mold, wherein the casting mold can include a protrusion functioning as an end stop for a first component, a protrusion functioning as a mounting fixture for a second component, a protrusion functioning as a flexible coupling to a third component, an area at which the metal core is exposed, a filling through an hollow portion of the metal core for strengthening an adhesion of the body coverage to the metal core, or a hollow portion corresponded to a through hole in the metal core.

Operation 1420 fills the mold with a material different from that of the metal core. Operation 1430 removes the casting mold.

In some embodiments, the present invention discloses a clamping device, and methods to form the clamping device, which includes components having a metal core embedded in a body of different material. Stress and strain analysis can be performed on a clamping device configuration to achieve frame structures for the clamping device. The frame structures can sustain high forces and high stresses, such as using added reinforced elements. The frame structures can serve as metal cores for the components of the clamping device. Body portions can then be added to cover the frame structures to form complete components. The body portions can also include fixtures for mounting peripherals, and additional reinforced elements to further strengthen the frame structures.

Figure 15A:
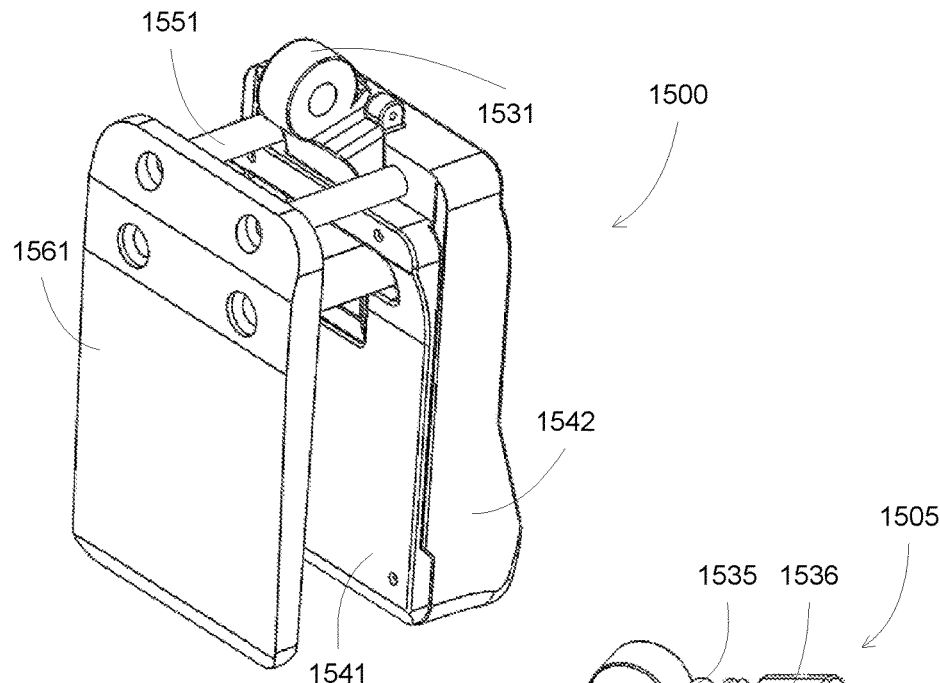
FIGS. 15A-15B illustrate a clamping device according to some embodiments.
Figure 15B:
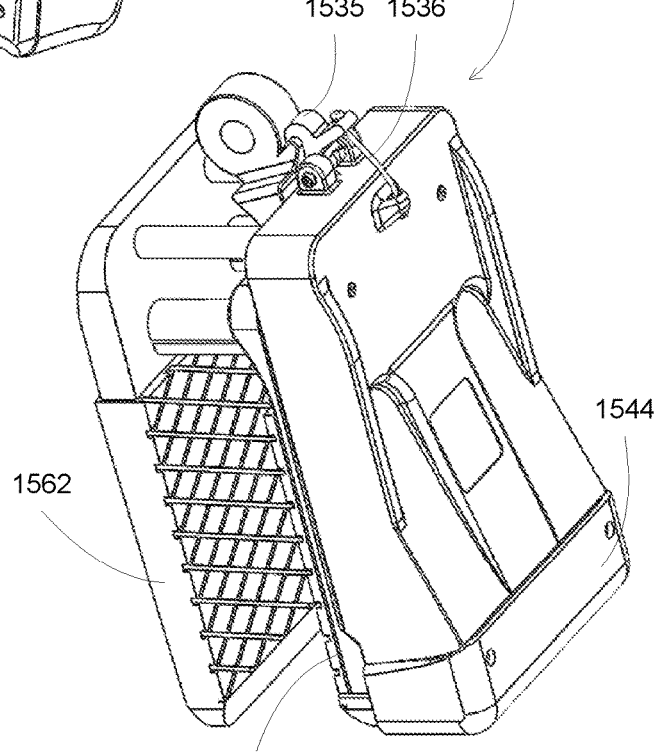

FIGS. 15A-15B illustrate a clamping device according to some embodiments. In FIG. 15A, a clamping device assembly 1500 can include major components assembled together, e.g., an assembly of components that might include a metal core embedded in a body portion.

The clamping device assembly 1500 can include a first jaw 1561 coupled to a clamp bar 1551. A second jaw 1541 can be coupled to a jaw support 1542, which also couples to the clamp bar. A pulling element 1531 can be disposed between the second jaw and the jaw support.

In some embodiments, there can be components having a metal core embedded in a body portion, and other components without the metal core or without the body portion. For example, the jaw support can be formed using a metal core embedded in a body portion. Other components, e.g., the first jaw, the second jaw, the clamp bar, and the pulling element, can include one piece construction, e.g., a body without a metal core, or a metal core without a body. Alternatively, some or all of the other components can be formed using a metal core embedded in a body portion.

In FIG. 15B, peripheral components can be installed in the clamping device assembly 1500 to form a complete clamping device 1505. For example, rubber pads 1562 and 1543 can be coupled to the first jaw 1461 and the second jaw 1541, respectively, for example, to increase a friction with an object clamped by the clamping device. A rubber support 1544 can be coupled to the jaw support 1542, for example, to protect the jaw support from collision. A locking mechanism 1535 can be assembled to the jaw support, for example, to secure the pulling element. A release mechanism 1536 can be assembled, which can release the locking mechanism 1535, so that the pulling element can be free to move.

In the following description, the construction of the jaw support is described, using a metal core embedded in a body portion. Similar construction processes can be used for other components. A jaw support can be coupled to a clamp bar, such as fixedly coupled, or removably/lockably coupled. The jaw support can be flexibly coupled to a jaw, to allow the jaw to move relative to the jaw support. The jaw support can be configured to house a pulling element, so that when the pulling element moves up, the jaw can be separated from the jaw support, for clamping on the object.

FIGS. 16A-16C illustrate a jaw support configuration according to some embodiments. In FIG. 16A, the position of a jaw support 1642 (a jaw support frame) relative to a clamping device 1600 is shown. In FIG. 16B, the jaw support frame 1642 is shown, which includes multiple panels 1610, such as steel panels or stainless steel panels, assembled together, such as welded together. The jaw support frame 1642 can be processed, such as forming holes 1630 for mounting to the clamp bar, or welding fixtures 1620 for mounting a locking mechanism for securing the pulling element.

In FIG. 16C, a complete jaw support 1642A is shown, which includes the frame 1642 as a metal core, together with a body portion covering the frame. For example, complete jaw support 1642A can include a protrusion portion 1640 for stopping the pulling element, and coverage on the panels 1610 to form body covered panels 1610A. There can be portions of the frame not covered by the body, such as the fixtures 1620.

In some embodiments, the body portion can cover low stress locations. The body portion can avoid high stress locations or can avoid areas that need to be exposed, such as for mounting other elements or components.

FIGS. 17A-17D (a)-(c) illustrate configurations of body covering a jaw support frame according to some embodiments. FIG. 17A shows a perspective view of a jaw support frame 1742 and FIG. 17B shows a cross section view of the jaw support frame 1742. The jaw support frame 1742 can include multiple panels welded together, including mounting panel 1717 for coupling with the clamp bar, slanting panel 1712 for converting a lifting force to a side force, and side panels 1711 for supporting the mounting and slanting panels. The jaw support frame 1742 can include holes 1714 for mounting to the clamp bar, and welding fixtures 1715 for mounting a locking mechanism for securing the pulling element.

FIG. 17C shows a perspective view of a complete jaw support 1742A and FIG. 17D shows different cross section views of different configurations of the complete jaw support 1742A. The complete jaw support 1742A can include a protrusion portion 1720 for stopping the pulling element, mounting fixtures 1725, through holes 1724, and coverage on the panels.

FIG. 17D (a) shows a configuration of the complete jaw support in which the slanting panel 1712 is exposed, e.g., there is no body coverage. Further, the mounting fixtures 1715 can also be exposed, e.g., the mounting fixtures on the complete jaw support is the same as the mounting fixtures 1715 on the jaw support frame, without body coverage. The holes 1714 also does not have coverage, resulting in through holes 1724 passing through the body and the frame.

FIG. 17D(b) shows a configuration of the complete jaw support in which the slanting panel 1712 is exposed, e.g., there is no body coverage. The holes 1714 also does not have coverage, resulting in through holes 1724 passing through the body and the frame. Other locations are covered with the body material. FIG. 17D(c) shows a configuration of the complete jaw support in which all areas of the jaw support frame are covered with the body material, except the through holes 1724 passing through the body and the frame.

Figure 18A:
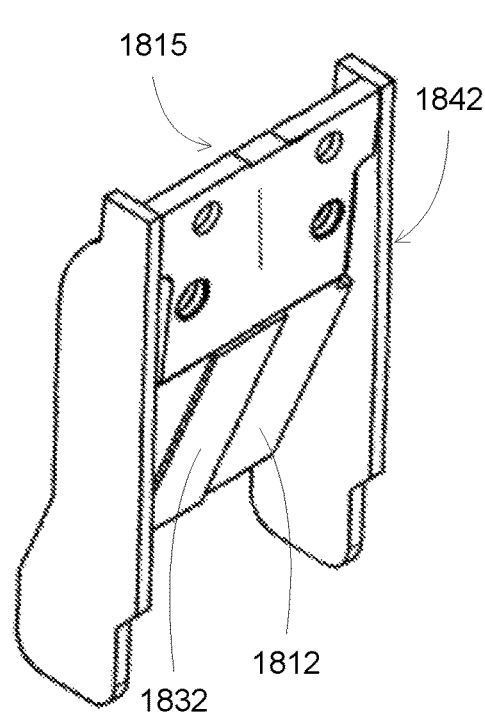
FIGS. 18A-18D (a)-(b) illustrate configurations of body covering a jaw support frame according to some embodiments.
Figure 18C:
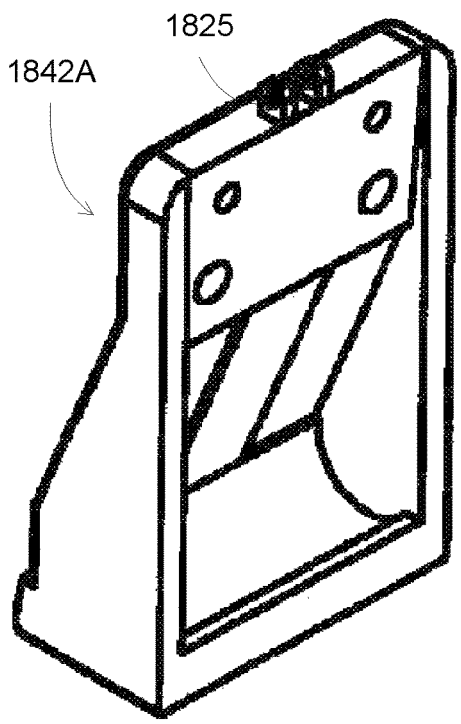
Figure 18B:
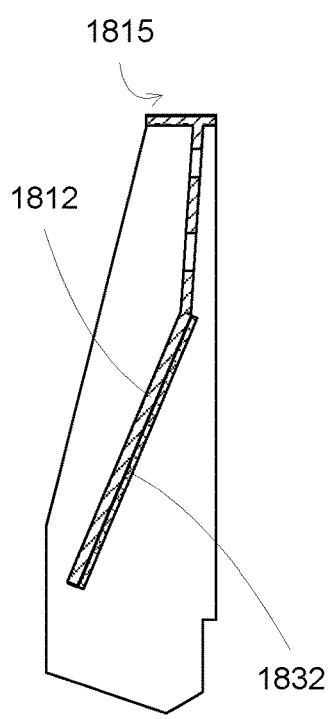

FIGS. 18A-18D (a)-(b) illustrate configurations of body covering a jaw support frame according to some embodiments. FIG. 18A shows a perspective view of a jaw support frame 1842 and FIG. 18B shows a cross section view of the jaw support frame 1842. A reinforced element such as panel 1832 can be added to a slanting panel 1812, for example, to increase the strength and hardness of the slanting surface, since a pulling element can exert high forces on the slanting panel. In addition, low forces or low stress components of the complete jaw support, such as the fixtures 1825 for mounting a locking mechanism, can be omitted from the frame structure. For example, there is an absence 1815 of a frame for fixtures 1825 for mounting a locking mechanism.

Figure 18D:
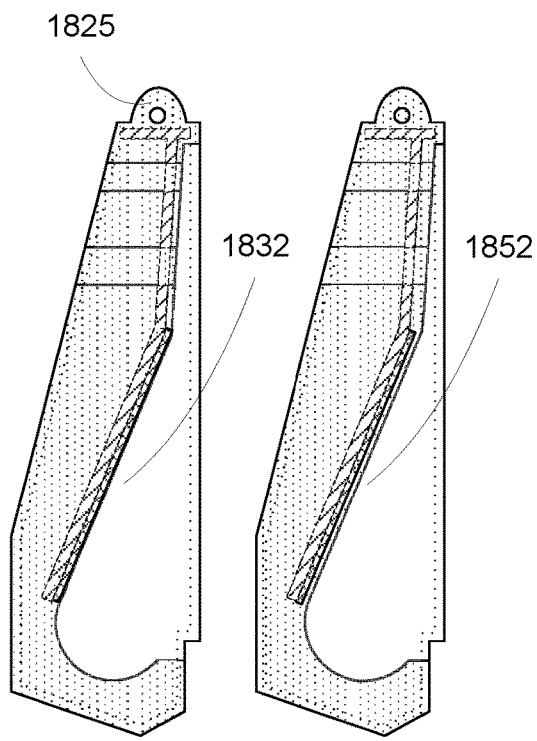

FIG. 18C shows a perspective view of a complete jaw support 1842A and FIG. 18D shows different cross section views of different configurations of the complete jaw support 1842A. In FIG. 18D(a), the reinforced panel 1832 is exposed, e.g., there is not body coverage to at least a portion of the reinforced panel. Alternatively, in FIG. 18D(b), the reinforced panel 1832 is covered with the body material 1852.

Figure 19A:
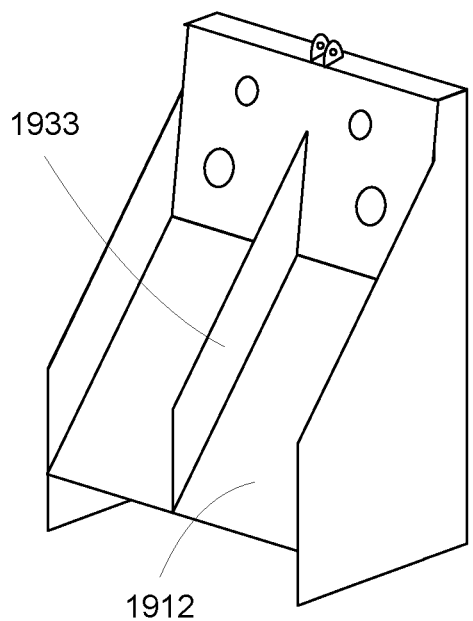
FIGS. 19A-19D illustrate configurations of body covering a jaw support frame according to some embodiments.
Figure 19B:
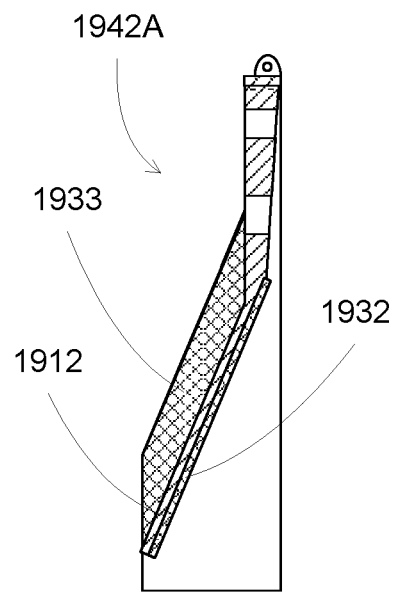

FIGS. 19A-19D illustrate configurations of body covering a jaw support frame according to some embodiments. FIG. 19A shows a perspective view of a jaw support frame 1942 and FIG. 19B shows a cross section view of the jaw support frame 1942. A reinforced element such as panel 1933 can be added to a backside of a slanting panel 1912, for example, to increase the strength and hardness of the slanting surface, since a pulling element can exert high forces on the slanting panel. In addition, a front reinforced panel 1932 can be added to a front side of the slanting panel, as discussed previously.

Figure 19C:
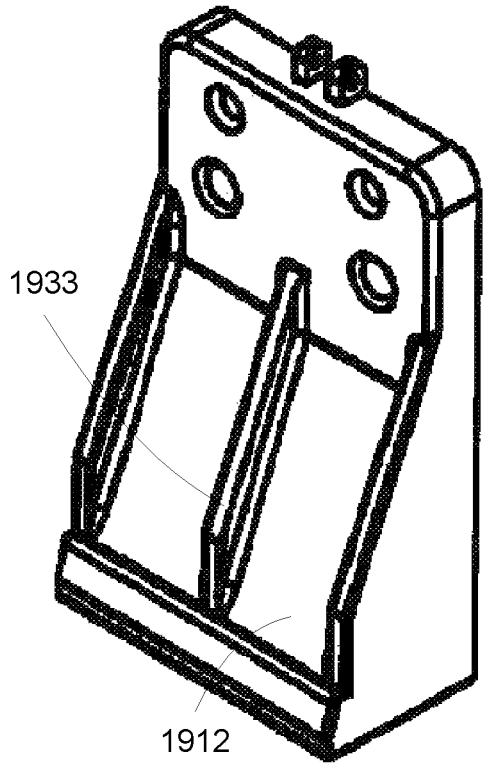
Figure 19D:
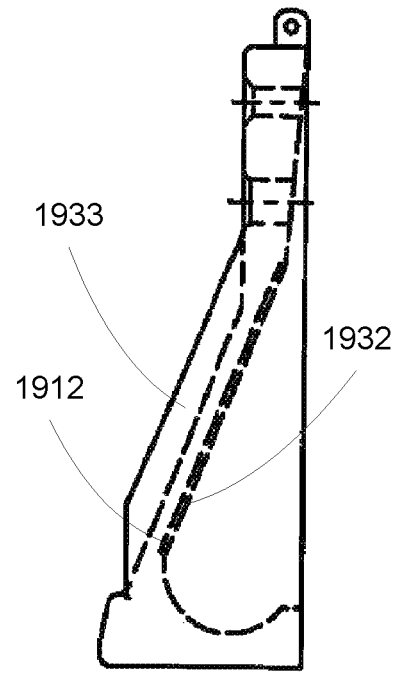

FIG. 19C shows a perspective view of a complete jaw support 1942A and FIG. 19D shows a cross section view of the complete jaw support 1942A. As shown, the reinforced panel 1932 is exposed, but other configurations can be used, such as the reinforced panel is covered with the body material.

In some embodiments, the body portion can include reinforced elements, e.g., thicker materials at high stress areas. The body portion can also include fixtures for mounting peripheral components. The body portion can also include cavities and protrusions for assembly and operation purposes.

Figure 20A:
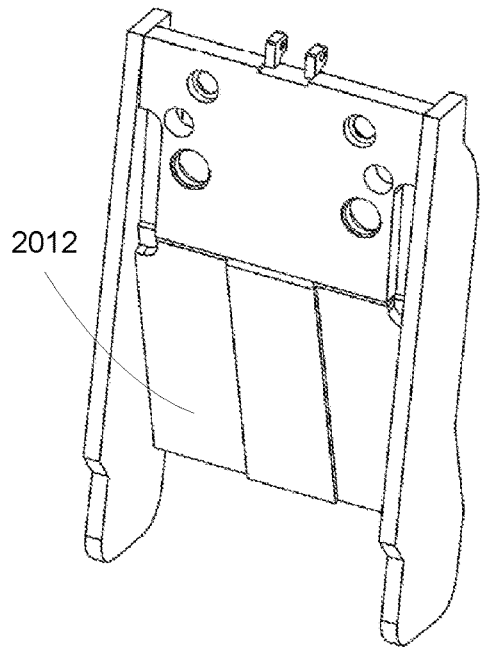
FIGS. 20A-20D illustrate perspective views of a jaw support frame and its corresponded complete jaw support according to some embodiments.
Figure 20B:
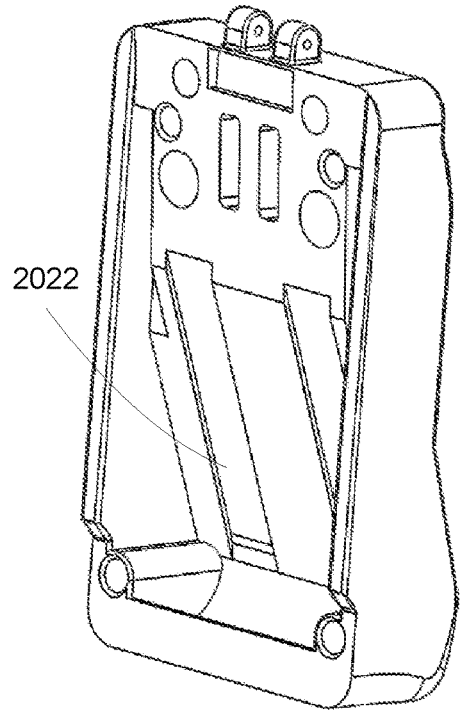

FIGS. 20A-20D illustrate perspective views of a jaw support frame and its corresponded complete jaw support according to some embodiments. In FIG. 20A, a jaw support frame can include a reinforced slanting panel 2012. In FIG. 20B, the complete jaw support can have a middle portion of the slanting panel exposed, together with side portions 2022 recessed along the slanting panel, for example, to prevent rollers of the pulling element from contacting the slanting panel, e.g., the pulling element can have middle rollers for contacting the slanting panel, and side rollers for contacting the jaw disposed facing the jaw support (and not contacting the jaw support).

Figure 20C:
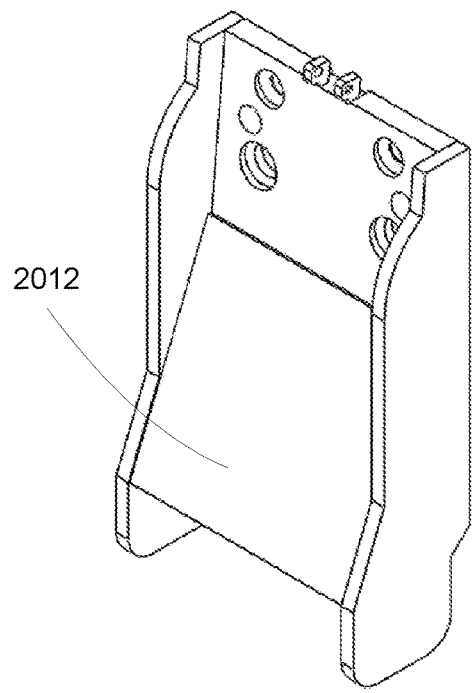
Figure 20D:
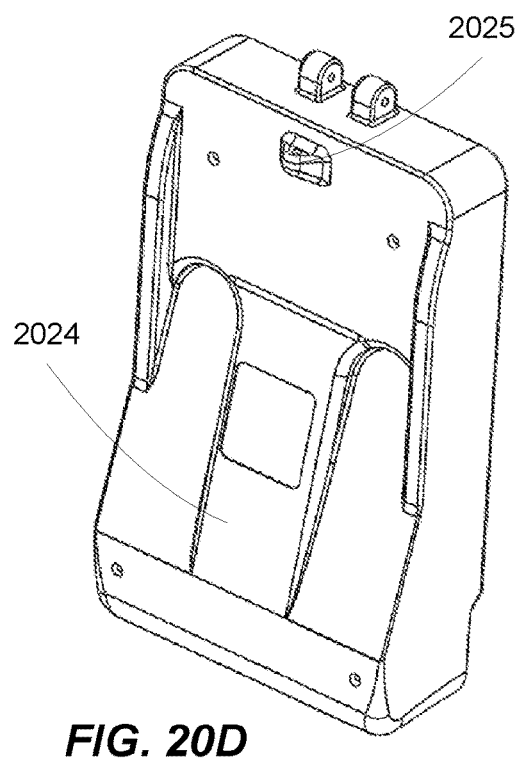
Figure 22A:
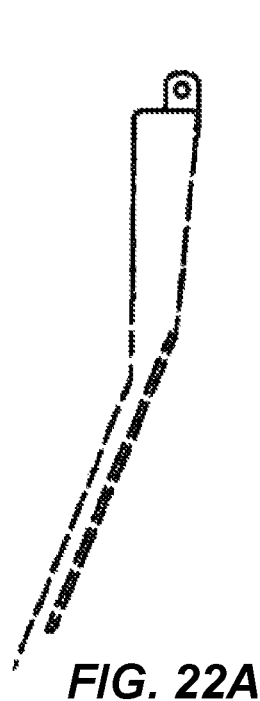
FIGS. 22A-22D show a jaw support configuration having a slanting panel disposed from a bottom portion to a top portion.
Figure 22B:
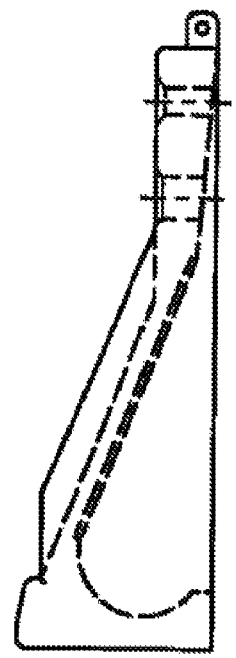
Figure 22C:
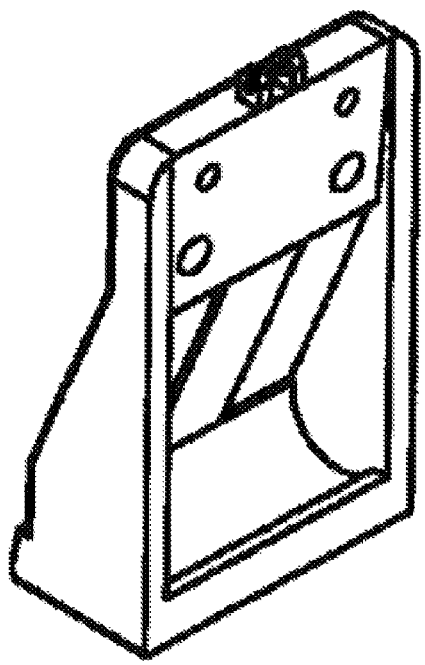
Figure 22D:
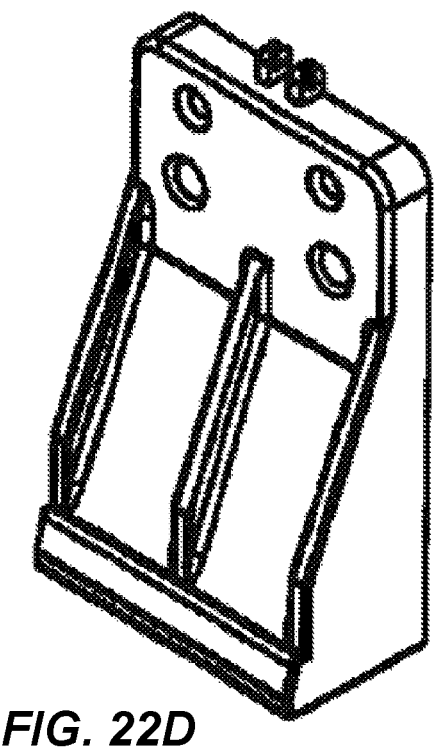
Figure 23A:
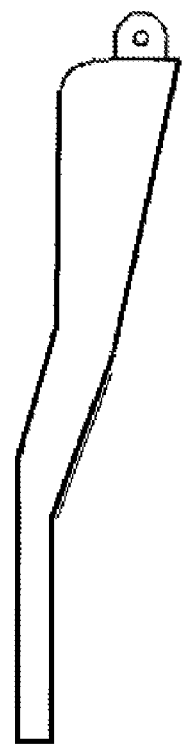
FIGS. 23A-23D show a jaw support configuration having a slanting panel disposed in a middle portion of the jaw support.
Figure 23B:
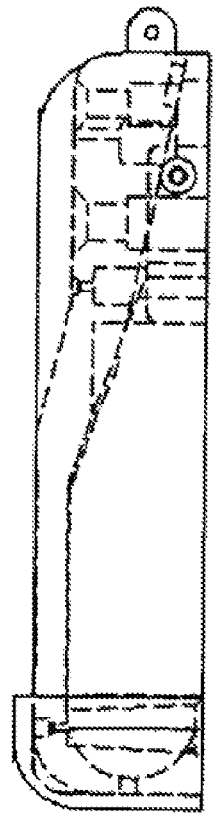
Figure 23C:
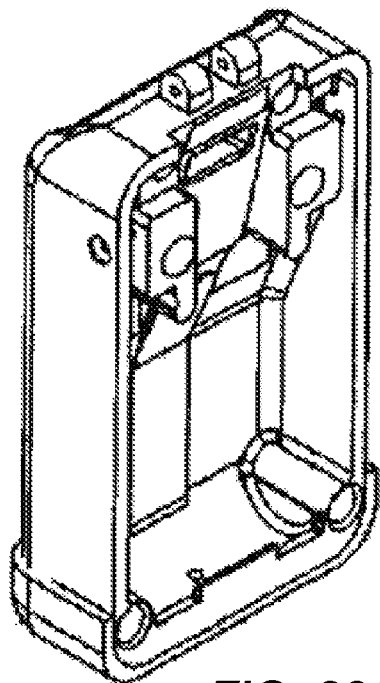
Figure 23D:
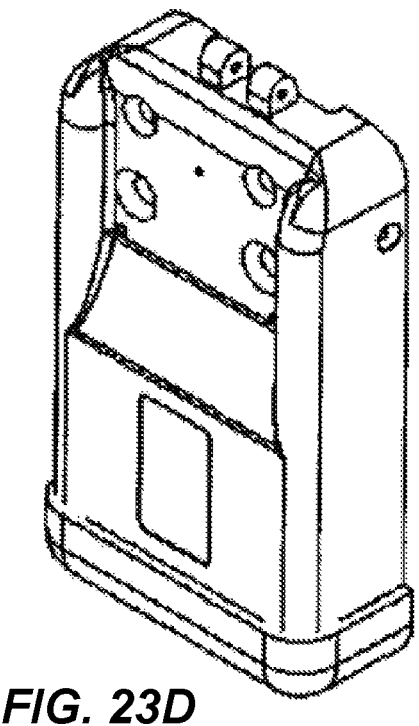

In FIG. 20C, a back side of the reinforced slanting panel 2012 is shown. In FIG. 20D, reinforced element 2024 of the body, e.g., patterned surfaces of the complete jaw support, can be formed, for example, to increase the strength and hardness of the jaw support due to the body material, in addition to reinforced elements on the frame. Further, mounting fixtures 2025 can be added on the body portion, for example, for mounting a release element for the locking mechanism.

FIG. 21 illustrates a flow chart for forming a clamping device according to some embodiments. A jaw support can include a metal core, e.g., a jaw support frame, embedded in a body portion. The jaw support is then assembled with other components to form the clamping device. Some or all of the other components can be constructed using a body portion surrounding a metal core. Operation 2100 forms Forming a metal core of a jaw support of a jaw assembly of a clamping device, wherein the metal core comprises a first panel welded to a second panel at an angle, wherein the first and second panels are welded to two side panels, wherein a coupling is welded to the first panel, wherein through holes are formed in the first panel, and wherein the metal core optionally comprises a reinforced element for strengthening the second panel. Operation 2110 forms a body of the jaw support, wherein the metal core is at least partially embedded in the body, wherein the body comprises a protrusion at an end of the second panel for functioning as an end stop for a pulling element of the clamping device, a hollow portion corresponded to the through holes. Operation 2120 assembles the jaw support to form the clamping device.

In some embodiments, the jaw support can include different configurations for different applications. The jaw support typically includes a slanting panel, which is configured so that when there is a pulling force acting on the pulling element, a side force is generated pushing the jaw coupled to the jaw support toward the object for increasing a clamping force.

FIGS. 22-25 illustrate configurations for jaw supports according to some embodiments. FIGS. 22A-22D show a jaw support configuration having a slanting panel disposed from a bottom portion to a top portion. Thus when the pulling element starts moving up, the pulling element also moves outward away from the jaw support due to the slanting panel. Front and back reinforced panels can be included for strengthening the slanting panel.

FIGS. 23A-23D show a jaw support configuration having a slanting panel disposed in a middle portion of the jaw support. Thus the pulling element can move straight up for a first portion until reaching the slanting panel. After reaching the slanting panel, the pulling element can also move outward when moving upward. There can be two slanting panels, disposed at different slanting angles. The pulling element can move away at a higher rate at the lower slanting panel as compared to at the upper slanting panel.

FIGS. 24A-24D show a jaw support configuration having a slanting panel disposed in a middle portion of the jaw support. Thus the pulling element can move straight up for a first portion until reaching the slanting panel. After reaching the slanting panel, the pulling element can also move outward when moving upward. There can be large slanting angle, so the pulling element can move outward at a faster rate. The upper panel can be straight, e.g., the pulling element can move straight upward after passing the slanting panel.

FIGS. 25A-25D show a jaw support configuration having a slanting panel disposed in a middle portion of the jaw support. Thus the pulling element can move straight up for a first portion until reaching the slanting panel. After reaching the slanting panel, the pulling element can also move outward when moving upward.

Figure 26A:
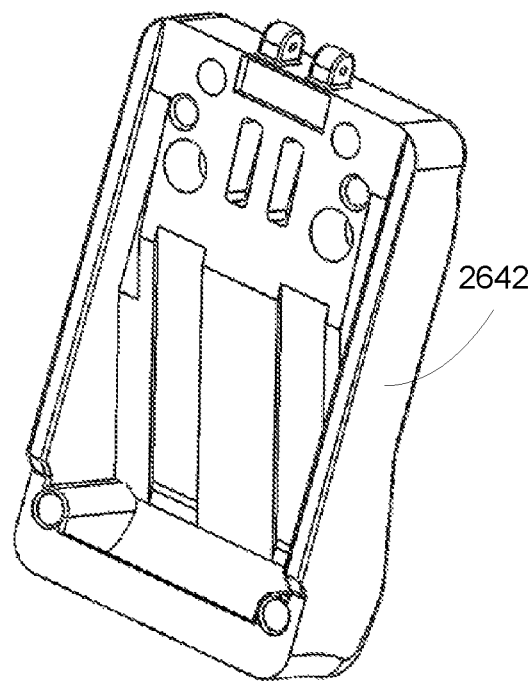
FIGS. 26A-26E illustrate an assembling process for a clamping device according to some embodiments.
Figure 26B:
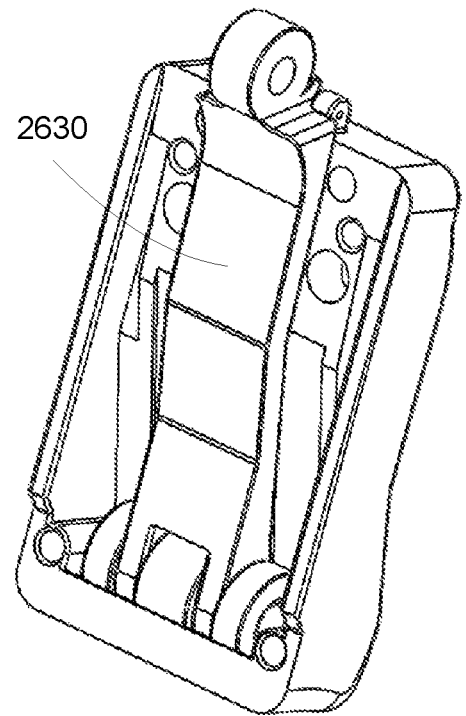
Figure 26C:
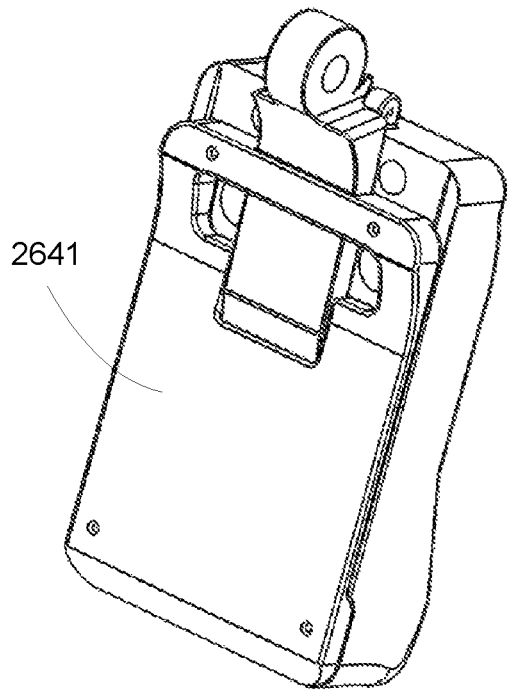
Figure 26D:
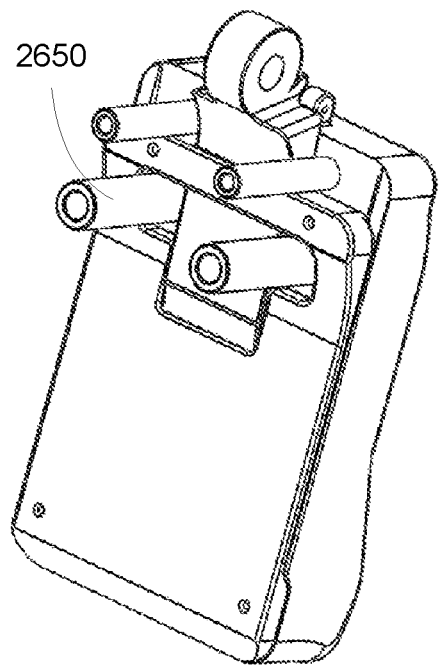
Figure 26E:
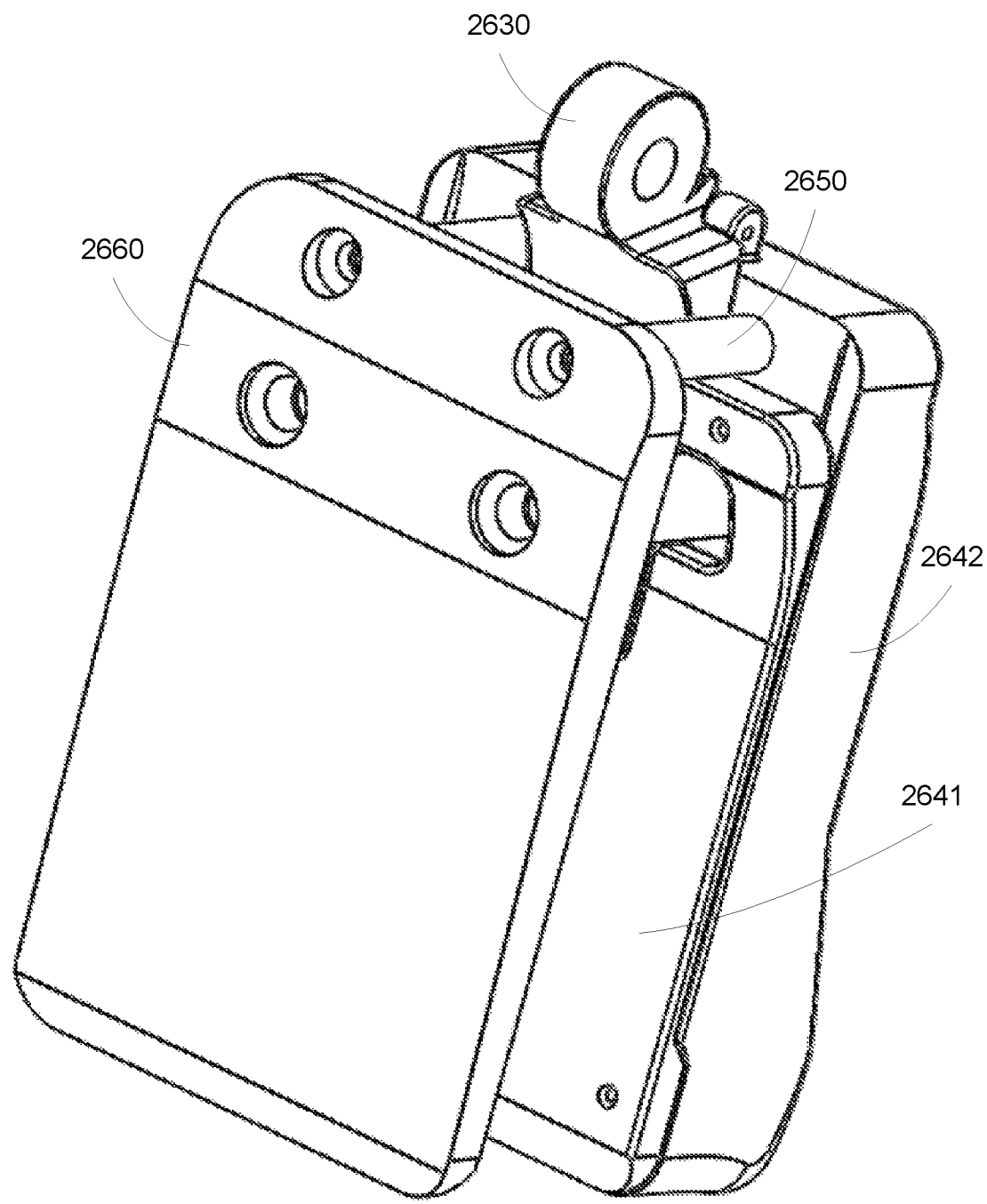

FIGS. 26A-26E illustrate an assembling process for a clamping device according to some embodiments. In FIG. 26A, a jaw support 2642 can be formed, including a metal core or frame embedded in a body portion. In FIG. 26B, a pulling element 2630 can be placed in a hollow portion of the jaw support. In FIG. 26C, a jaw 2641 can be coupled to the jaw support, closing the hollow portion. In FIG. 26D, clamp bar 2650 can be installed, e.g., multiple connection bars can be secured to the jaw support. The pulling element can be disposed between the connection bars, for example, to constrain the pulling element in a side direction of the jaw support. In FIG. 26E, an opposite jaw 2660 can be installed, which is coupled to the connection bars 2650.

FIGS. 27-30 illustrate operations of a clamping device according to some embodiments. FIGS. 27A-27D show a locking mechanism 2735 to secure a pulling element 2730 to a jaw support 2742. At a rest position, the pulling element is disposed against a bottom portion of the jaw support (FIG. 27A). The locking mechanism 2735 can be used to secure the pulling element to the jaw support (FIG. 27B).

The locking mechanism can lock the pulling element to a downward most position, e.g., a position that minimizes the gap distance between the jaw and the jaw support, or a position that makes the jaw closest to the jaw support. Together with springs pulling on the jaw toward the jaw support, the locking mechanism can keep the jaw of the jaw assembly away from the opposite jaw in the clamping device, e.g., making sure that the opening between the jaws of the clamping device is largest possible so that it can be easier to put the object into the jaws.

The locking mechanism can include a latch, which can be rotated around a center or rotation on the jaw support. Rotating forward in one direction, the latch can engage with a hook in the pulling element, preventing the pulling element from moving upward. Rotating backward 2736, the latch can disengage from the hook, allowing the pulling element to move upward (FIG. 27C).

The latch can be configured for automatic lock, e.g., from the unlocked or disengaged position, the pulling element can be pushed down, and the hook can push on a level of the latch, swinging the latch counterclockwise to lock or engage with the hook. A spring can be included, to keep the latch in engaged position. The pulling element, when pushed down, can swing the latch clockwise to open the latch. When the pulling element is at the lowest position, the latch can swing back to lock with the hook.

When the pulling element moves upward 2737, for example, by a force applied to the pulling element, the rollers can roll on a slanting surface of the jaw support (FIG. 27D). Some rollers can roll on a surface of the jaw (not shown).

Figure 28A:
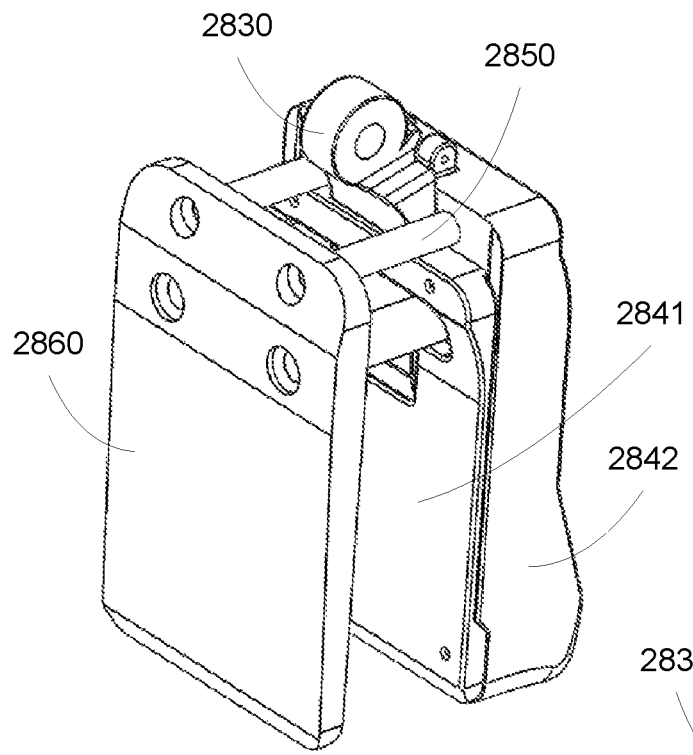
FIGS. 28A-28B illustrate operations of a clamping device according to some embodiments.
Figure 28B:
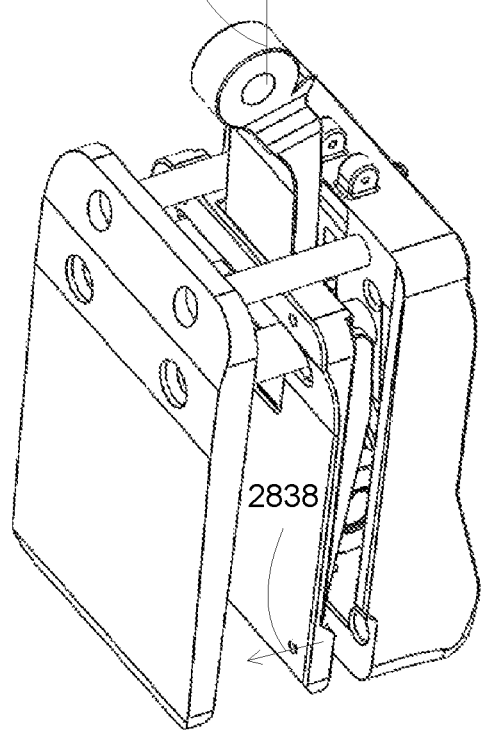

FIGS. 28A-28B show movements of the pulling element 2830, and corresponding movements of the jaw 2841 coupled to the jaw support 2842. In FIG. 28A, the pulling element is at rest, e.g., at a bottom most position. In FIG. 28B, the pulling element moves upward 2837, which results in the jaw 2841 moving outward 2838 toward the other jaw 2860. The pulling element can be disposed between the connection bars of the clamp bar 2850, which can allow the pulling element to move upward and forward, and can constrain the pulling element from moving sideward, e.g., perpendicular to upward and forward directions.

FIGS. 29A-29B show cross section views of the movements of the pulling element 2930, and corresponding movements of the jaw 2941 coupled to the jaw support 2942. At rest, the pulling element is at the down most position (FIGS. 29A and 29B). When a force is applied to the pulling element, the pulling element can move upward 2937 and forward 2934, for example, due to the slanting surface of the jaw support. The forward movement of the pulling element can generate a forward movement 2938 of the jaw 2941.

If the jaw 2941 is blocked, for example, by the object, a force lifting the pulling element can generate a forward pushing the jaw toward the object.

FIGS. 30A-30B illustrate flow charts for forming a clamping device according to some embodiments. In FIG. 30A, operation 3000 forms a clamping device, wherein the clamping device comprises a first jaw coupled to a clamp bar, and a jaw assembly coupled to the clamp bar, wherein the jaw assembly comprises a second jaw disposed opposite the first jaw for clamping on an object, wherein the jaw assembly comprises a jaw support, wherein the jaw assembly comprises a hanging element disposed between the second jaw and the jaw support, wherein at least an interface between the hanging element and the jaw support and an interface between the hanging element and the second jaw comprises a slanting surface, wherein the slanting surface is configured so that when the clamping device is lifted up from the hanging element, the second jaw is configured to press on the object.

In FIG. 30B, operation 3020 forms a clamping device, wherein the clamping device comprises a clamp bar, a first jaw, and a jaw assembly, wherein the jaw assembly comprises a jaw support, wherein at least one of the first jar or the jaw support is configured to movably couple to the clamp bar and to lockably coupled to the clamp bar at discrete positions through a locking mechanism, wherein the jaw assembly comprises a second jaw disposed opposite the first jaw for clamping on an object, wherein the second jaw is coupled to the jaw support through a flexible component to allow the second jaw to move in multiple directions with respect to the jaw support, wherein the jaw assembly comprises a hanging element disposed between the second jaw and the jaw support, wherein at least an interface between the hanging element and the jaw support and an interface between the hanging element and the second jaw comprises a slanting surface, wherein the slanting surface interface comprises a rolling friction, wherein the slanting surface is configured so that when the hanging element moves in a direction comprising a vertical direction, the second jaw moves away relative to the jaw support in a direction comprising a horizontal direction.

Figure 31A:
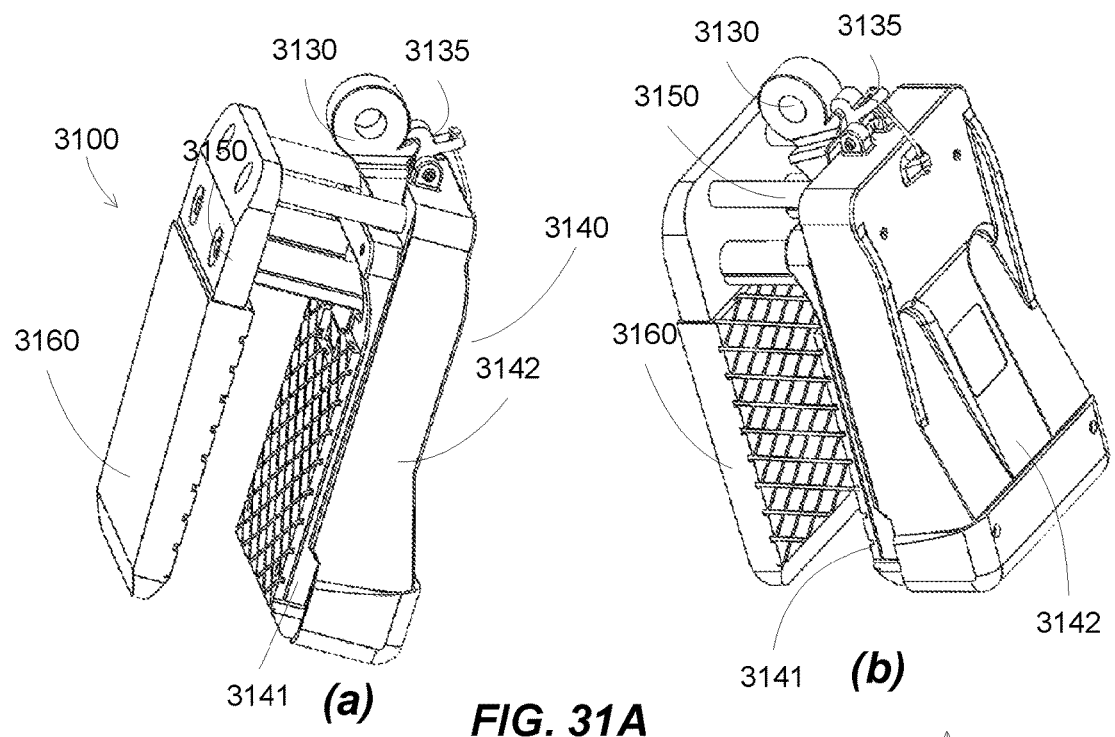
FIGS. 31A (a)-(b)-31B (a)-(c) illustrate an operation of a clamping device according to some embodiments.

FIGS. 31A (a)-(b)-31B (a)-(c) illustrate an operation of a clamping device according to some embodiments. FIG. 31A (a)-(b) show perspective views of a clamping device 3100 configured for lifting heavy objects. The clamping device can include a first jaw 3160 fixedly coupled to a clamp bar 3150. The clamping device can include a second jaw assembly 3140, which can also be fixedly coupled to the clamp bar. The second jaw assembly can include a second jaw 3141 disposed opposite the first jaw. The second jaw assembly can include a jaw support 3142, which can fixedly coupled to the clamp bar. The second jaw assembly can include stretchable elements, such as springs (not shown), which can be coupled to the second jaw and the jaw support, for pulling the second jaw toward the jaw support. The stretchable elements can allow the second jaw to move away from the jaw support, for a limited distance, such as a distance equal or smaller than a distance between the discrete locking locations of the discrete locking mechanism.

The clamp bar can include connection bars that serve as end point limits to prevent the second jaw from moving too far from the jaw support.

The clamping device can include a pulling element 3130, which can be configured to be pulled on for lifting the clamped object. The pulling element can be freely move in an up direction. The pulling element can be configured to exert a clamping force on the object when being pulled, for example, through slanting surfaces of the components of the second jaw assembly, such as a slanting interface between the pulling element and the jaw support.

A locking mechanism 3135 can be coupled to the second jaw assembly to prevent the pulling element from being pulled up.

Figure 31B:
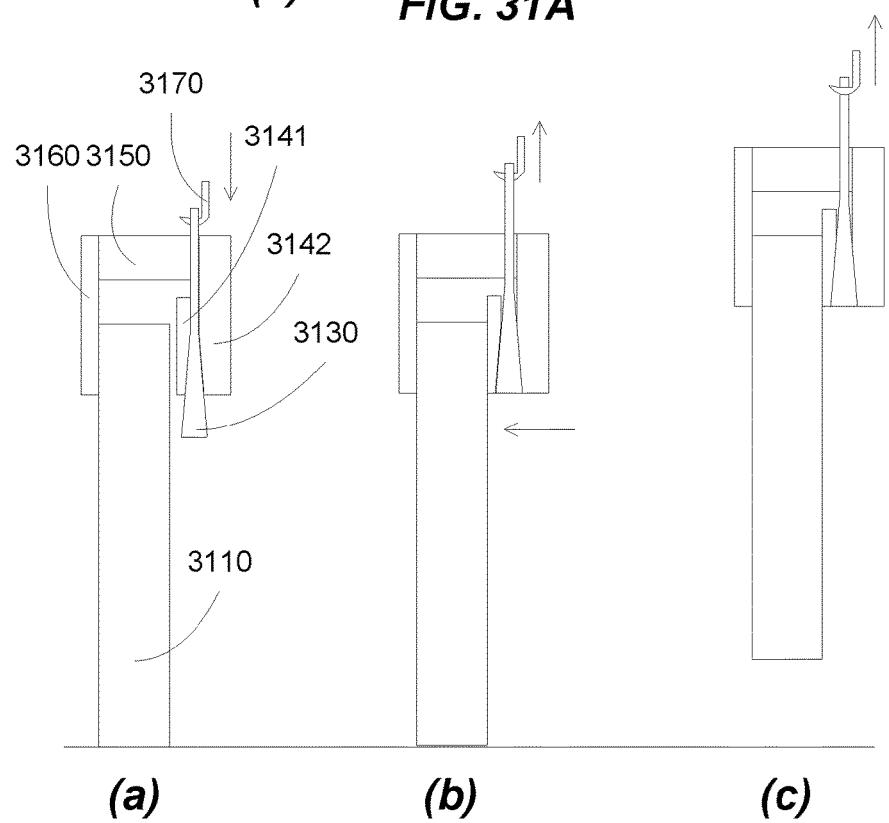

FIG. 31B (a)-(c) show an operation of the clamping device. In FIG. 31B (a), the pulling element 3130 can be in a down most position, and locked by the locking mechanism. Due to the stretchable elements, the second jaw 3141 can be pulled toward the jaw support 3142.

In FIG. 31B (b), the pulling element can be pulled up, for example, by a hoist 3170 hooking to the pulling element. The pulling on the pulling element can push the second jaw toward the object for clamping the object. In FIG. 31B (c), further pulling on the pulling element can lift the object above the ground to move to a new location.

FIGS. 32A-32B illustrate flow charts for operating a clamping device according to some embodiments. In FIG. 32A, operation 3200 places an object between two jaws of a clamping device. Operation 3210 lifts a component of the clamping device, wherein the component is configured to exert a side force through a slanting surface to one of the two jaws for clamping on the object.

In FIG. 32B, operation 3230 locks a pulling element to a jaw assembly of a clamping device. Operation 3240 places an object between a first jaw and the jaw assembly. Operation 3250 unlocks the pulling element from the jaw assembly. Operation 3260 lifts the pulling element, wherein the pulling element is configured to move a second jaw of the jaw assembly toward the object through a slanting surface to narrow a gap between the jaws and the object. Operation 3270 lifts the pulling element, wherein the pulling element is configured to exert a side force through the slanting surface to the second jaw for clamping on the object.

In some embodiments, other configurations for a clamping device can be used, which can include a first jaw assembly and a second jaw assembly coupled to a clamp bar. For example, a pulling element can be disposed between the jaw and the jaw support of a jaw assembly that is fixedly coupled to the clamp bar, e.g., the jaw can be flexibly coupled to the jaw support while the jaw support is fixedly coupled to the clamp bar. The other jaw assembly can be movably coupled to the clamp bar. The other jaw assembly can include only a jaw, which is movably coupled to the clamp bar together with a locking mechanism to lock the jaw to the clamp bar. The other jaw assembly can include a jaw and a jaw support, with the jaw flexibly coupled to the jaw support and the jaw support movably coupled to the clamp bar together with a locking mechanism to lock the jaw support to the clamp bar.

In some embodiments, there can be two pulling elements, one for each jaw assembly.

What is claimed is:

1. A clamping device comprising
a connection element;
a first jaw coupled to the connection element;
a jaw assembly,
    wherein the jaw assembly comprises a second jaw and a jaw support,
    wherein the first jaw and the second jaw are configured for clamping on an object,
    wherein the jaw support is coupled to the connection element,
    wherein the second jaw is movably coupled to the jaw support at least in a direction away from the jaw support toward the first jaw,
    wherein the jaw support comprises a metal core at least partially embedded in a jaw support body,
    wherein the metal core is configured to provide a structural support for the clamping device,
    wherein the jaw support body comprises a material different from the material of the metal core,
    wherein the jaw support body comprises a hollow portion mating with the second jaw as a lid,
    wherein the hollow portion comprises a dimension between the second jaw and the jaw support that is larger at a location farther from the connection element than at a location nearer the connection element;
a pulling element,
    wherein the pulling element is partially disposed in the hollow portion formed between the second jaw and the jaw support,
    wherein the pulling element comprises rollers, wherein one or more first rollers of the rollers are configured to roll on a first surface of the jaw support, wherein one or more second rollers of the rollers are configured to roll on a second surface of the second jaw.

2. A clamping device as in claim 1
wherein the metal core comprises a steel or stainless steel material,
wherein the jaw support body comprises a polymer-based material or aluminum.

3. A clamping device as in claim 1
wherein the metal core comprises a panel for coupling to the connection element,
wherein the metal core comprises a slanting panel in a direction to provide that the dimension between the second jaw and the jaw support that is larger at a location farther from the connection element than at a location nearer the connection element.

4. A clamping device as in claim 1
wherein the first surface comprises a slanting surface formed by a slanting panel of the metal core, wherein the metal core further comprises a structural support for strengthening the slanting panel.

5. A clamping device as in claim 1 wherein the first surface comprises an exposed portion of the metal core so that the one or more first rollers of the rollers are configured to roll on a surface of the metal core.

6. A clamping device as in claim 1 wherein the jaw support body comprises first through holes corresponded to second through holes of the metal core.

7. A clamping device as in claim 1 wherein the jaw support body comprises a portion protruded from the metal core.

8. A clamping device as in claim 1 wherein there is a portion of the metal core not covered by the jaw support body.

9. A clamping device as in claim 1 wherein at least one of the first jaw, the second jaw, and the pulling element comprises a metal core at least partially embedded in a body of a different material.

10. A clamping device as in claim 1 wherein the connection element comprises at least two bars, wherein the at least two bars are fixedly coupling at one end to the first jaw, and fixedly coupling at an opposite end to the jaw support, wherein the pulling element is disposed between the two bars.

11. A clamping device as in claim 1 wherein the jaw support is movably coupled to the connection element, wherein the jaw support is configured to be secured to the connection element through a locking mechanism.

12. A clamping device as in claim 1 further comprising a second locking mechanism configured to secure the pulling element to the jaw assembly.

13. A clamping device as in claim 1 wherein the hollow portion is configured so that when the rollers roll toward the connection element against the first and second surfaces, the rollers push on the second jaw to move the second jaw toward the first jaw.

14. A clamping device as in claim 1 wherein the hollow portion is configured so that when a first force is applied to the pulling element to lift the clamping device, a second force is generated on the second jaw toward the first jaw.

15. A clamping device as in claim 1 wherein the pulling element disposed in the cavity is configured so that when the pulling element moves up, a force is applied to the second jaw toward the first jaw.

16. A method to form a clamping device, the method comprising
forming a connection element;
forming a first jaw;
coupling the first jaw with the connection element;
forming a second jaw;
forming a jaw support;
  wherein the jaw support comprises a metal core,
  wherein the metal core is configured to provide a structural support for the clamping device,
  wherein the jaw support comprises a jaw support body surrounding the metal core and protruding from the metal core,
  wherein the jaw support body comprises a material different from the material of the metal core,
  wherein the jaw support body comprises a hollow portion mating with the second jaw as a lid,
  wherein the hollow portion comprises a dimension between the second jaw and the jaw support that is larger at a location farther from the connection element than at a location nearer the connection element;
coupling the jaw support with the connection element;
coupling the second jaw with the jaw support with springs;
forming a pulling element,
  wherein the pulling element comprises rollers;
placing the rollers in the hollow portion between the jaw support and the second jaw,
  wherein one or more first rollers of the rollers are configured to roll on a first surface of the jaw support, wherein one or more second rollers of the rollers are configured to roll on a second surface of the second jaw.

* * * * *